US007853121B2

(12) United States Patent
Yahata

(10) Patent No.: US 7,853,121 B2
(45) Date of Patent: Dec. 14, 2010

(54) RECORDING MEDIUM, REPRODUCTION DEVICE, PROGRAM, AND REPRODUCTION METHOD

(75) Inventor: Hiroshi Yahata, Kadoma (JP)

(73) Assignee: Panasonic Corporation, Osaka (JP)

( * ) Notice: Subject to any disclaimer, the term of this patent is extended or adjusted under 35 U.S.C. 154(b) by 775 days.

(21) Appl. No.: 10/586,417

(22) PCT Filed: Jan. 28, 2005

(86) PCT No.: PCT/JP2005/001266

§ 371 (c)(1), (2), (4) Date: Apr. 13, 2007

(87) PCT Pub. No.: WO2005/073862

PCT Pub. Date: Aug. 11, 2005

(65) Prior Publication Data

US 2007/0217762 A1 Sep. 20, 2007

(30) Foreign Application Priority Data

Jan. 30, 2004 (JP) ............................ 2004-022909

(51) Int. Cl.
*H04N 5/91* (2006.01)

(52) U.S. Cl. ......................... 386/94; 386/124; 386/109; 386/112; 386/125; 360/60; 380/201; 380/202; 380/203; 380/204; 380/205; 380/206; 380/207; 380/208; 380/209; 705/57; 369/53.21; 369/47.12; 369/30.05; 725/42

(58) Field of Classification Search ................... 386/94, 386/124; 725/42; 360/60; 380/201–209; 705/57; 369/53.21, 47.12, 30.05
See application file for complete search history.

(56) References Cited

U.S. PATENT DOCUMENTS

| | | | | |
|---|---|---|---|---|
| 5,729,516 | A * | 3/1998 | Tozaki et al. | 369/53.21 |
| 5,923,627 | A | 7/1999 | Miwa et al. | |
| 6,553,179 | B1 | 4/2003 | Miwa et al. | |
| 6,950,804 | B2 * | 9/2005 | Strietzel | 705/26 |

(Continued)

FOREIGN PATENT DOCUMENTS

JP 10-161937 6/1998

(Continued)

OTHER PUBLICATIONS

Itaru Hosomi et al., "Digital Information Logistics Architecture "Media Shell" And It's Billing and Utilizing Management", NEC Corporation, Sep. 19, 1998, pp. 49-56, English Abstract Only.

(Continued)

*Primary Examiner*—Thai Tran
*Assistant Examiner*—Helen Shibru

(57) ABSTRACT

A BD-ROM stores a video stream and a plurality of pieces of copy control information. The plurality of pieces of copy control information include "CCIforHD with CM", "CCIforSD with CM", "CCIforHD without CM", and "CCIforSD without CM". The video stream constitutes video composed of a plurality of video streams. Among the plurality of pieces of copy control information, "CCIforHD with CM" and "CCIforSD with CM" indicate whether recording is permitted of a video signal converted from the video stream and output with addition of supplemental information. On the other hand, "CCIforHD without CM" and "CCIforSD without CM" indicate whether recording is permitted of the video output without addition of the supplemental information.

5 Claims, 53 Drawing Sheets

U.S. PATENT DOCUMENTS

| | | | | |
|---|---|---|---|---|
| 2001/0012440 | A1 * | 8/2001 | Itoi | 386/94 |
| 2003/0110132 | A1 | 6/2003 | Sako | |
| 2008/0037948 | A1 * | 2/2008 | Yahata | 386/46 |
| 2010/0122174 | A1 * | 5/2010 | Snibbe et al. | 715/733 |

FOREIGN PATENT DOCUMENTS

| | | |
|---|---|---|
| JP | 11-096258 | 4/1999 |
| JP | 2001-292341 | 10/2001 |
| JP | 2002-203071 | 7/2002 |
| JP | 2003-234999 | 8/2003 |
| WO | WO 97/07511 | 2/1997 |
| WO | WO 02/37492 | 5/2002 |

OTHER PUBLICATIONS

"Tada' de Iijanai Kokoku de Shueki ga Agarebane," Nikkei Electronics, vol. 780, pp. 140, Oct. 9, 2000.

* cited by examiner

FIG.28

CCI for SD with CM
- Copy Free … Copies of SD Video Recording with CM may be made Freely
- Only One Copy … One Generation of Copies of SD Video Recording with CM may be made
- Never Copy … No Copies of SD Video Recording with CM may be made
- EPN Copy Free … Copies of SD Video Recording with CM may be made Freely with Encryption Asserted CCI for SD without CM
- Copy Free … Copies of SD Video Recording without CM may be made Freely
- Only One Copy … One Generation of Copies of SD Video Recording without CM may be made
- Never Copy … No Copies of SD Video Recording without CM may be made
- EPN Copy Free … Copies of HD Video Recording without CM may be made Freely with Encryption Plus Non-Assertion

RECORDING MEDIUM, REPRODUCTION DEVICE, PROGRAM, AND REPRODUCTION METHOD

TECHNICAL FIELD

The present invention relates to a playback technique of digitized movies. More particularly, the present invention relates to an improvement made on incorporation of the playback technique into a recording medium, such as a BD-ROM, and a playback device.

BACKGROUND ART

Today, movies in digitized form are dominant and yet movie-distributing companies spend great expense for advertising their movies to viewers. In other words, in order to gain wide publicity for some kind of information, it is required to invest a considerable amount of advertising expense to mass media. In the case of movie distribution via recording media, it is a common practice that the recording media stores, in addition to a main feature movie, a preview of another movie generally called a "trailer" for users to watch.

The patent literature 1 listed below discloses a technique for prohibiting trick play, such as fast-forwarding, during playback of the main feature and the advertising video in order to ensure viewing of the advertisement video by the users.

Patent Literature 1: PCT publication No. WO 97/07511

DISCLOSURE OF THE INVENTION

Problems the Invention is Attempting to Solve

However, the following point should be noted in users point of view. Different from broadcasting, which is generally supplied free of charge and presented with advertisement of the broadcasting sponsors, the users of a disc medium pay an adequate price to view the disc content. The prior art technique disclosed in the above patent literature is an attempt to force viewing of advertisement to the users who have paid a reasonable price. Such arrangement may be offensive to some users and may create an opposite effect of keeping such users away from purchasing the advertised products.

The present invention aims to provide a recording medium used for conveying some kind of information to widely to users, without harming the relationship with the users.

Means for Solving the Problems

In an attempt to achieve the above aim, the present invention provides a recording medium having recorded thereon a video stream and copy control information. The video stream contains video composed of a plurality of frame images. The copy control information defines different restrictions on recording of a video signal that is converted from the frame images. The restrictions differ depending on whether the video signal is output with or without addition of supplemental information.

EFFECTS OF THE INVENTION

With the above structure, on condition that a video signal is output with addition of supplemental information, copy control information indicating that the movie carried by the video signal is permitted to be recorded. That is, by accepting that the supplemental information is added, users are permitted to freely copy a digitized movie film.

Such a copy of the movie may be stored on a HD recorder or home server. Playback of the copy is presented with the supplemental information. Thus, whenever watching the movie, the users have no choice but to watch playback with the supplemental information added thereto. Consequently, a certain level of advertising effect is expected.

Since the users are offered the right to make personal copies of a movie in exchange for watching supplemental information, this form of advertising works with the users' consent. In other words, since the users are offered the choices as to whether or not to accept such advertising via a copy of original content, the advertising effect can be increased without offending the users.

This form of advertising is implemented through the processing performed by the playback device for generating a copy containing pictures attached the supplemental information. In other words, this form of advertising is not possible without actively making various arrangements to the playback device. In view of the time and effort taken to make such arrangements, the makers of playback devices have the right to ask the film-production company for reward for the advertising effect achieved.

The advertising revenue would encourage the makers for further revitalization of research and development.

Note that the scope of "supplemental information" covers not only advertisement but also information other than advertisement. For example, images and audio representing private messages or slogans may be the content of supplemental information. In addition, the advertisement or commercial messages include any form of information (including video and/or audio) for announcing products, events, organizations, and groups (including public and commercial institutions) widely to the public.

The content of additional information may be an opinion of an individual or a slogan of a national or local government reading, for example, "Clean Your Neighborhood". The present invention achieves a significant effect that such an opinion and slogan are conveyed widely to the public via copies of copyrighted material.

BRIEF DESCRIPTION OF THE DRAWINGS

FIG. 28 illustrates an example setting of "CCIforSD with CM" and "CCIforSD without CM";

BEST MODE FOR CARRYING OUT THE INVENTION

First Embodiment

Figure 1:
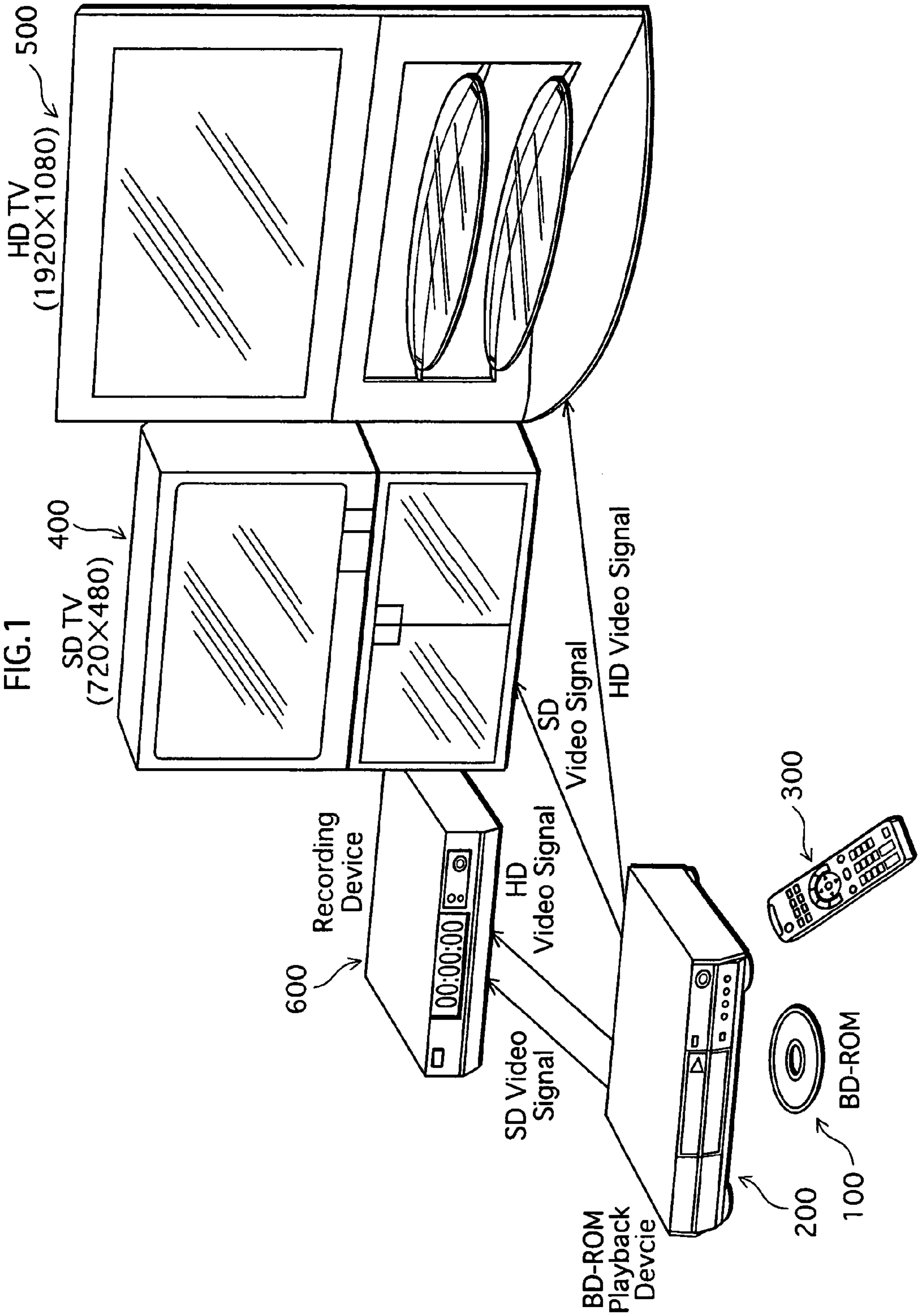
FIG. 1 illustrates a form of using the recording medium according to the present invention.

The following describes an embodiment of a recording medium according to the present invention. First of all, among various acts of practicing the recording medium of the present invention, an act of using is described. FIG. 1 illustrates a form of using the recording medium according to the present invention. In FIG. 1, a BD-ROM 100 is the recording medium according to the present invention. The BD-ROM 100 is used to supply copyrighted material to a home theater system composed of a playback device 200, a remote controller 300, an SDTV 400, an HDTV 500, and a recording device 600.

The playback device 200 is used to play back a movie recorded on the BD-ROM. More specifically, the playback device 200 decodes elementary streams (video, PG, and IG streams) carrying the movie recorded on the BD-ROM to output a video signal obtained by the decoding. The video signal may be an SD video signal or an HD video signal. The playback device has a composite terminal, analog output terminals, such as D3, D4, and D5, and a digital output terminal, such as HDMI. Via those terminals, the playback device is connected to the SDTV 400 and HDTV 500. The video signal output to the HDTV is also output to the recording device 600.

The recording device 600 is used to record SD and HD video signals output from the playback device. The recording is carried out by receiving and encoding the SD and HD video signals and recording the encoded signals on a portable recording medium, such as BD-RE, DVD-RAM, DVD-R, DVD+R, SD card, and removable HDD. In order that the recording device is permitted to record the video signal, the following requirement needs to be met. That is, copy generation management information, such as CGMS or any other form of information, embedded in the SD and HD video signals indicates that recording of the content is permitted. In the case where CGMS is set to the "Never Copy" status prohibiting any recording, the recording device 600 does not perform the recording operation described above. If the CGMS is set to the "Only One Copy" status, recording of the movie is permitted but no further generation of copying is possible. If the CGMS is set to "Copy Free" status, a copy of the content recorded on the potable media can be copied for unlimited number of times.

Figure 2:
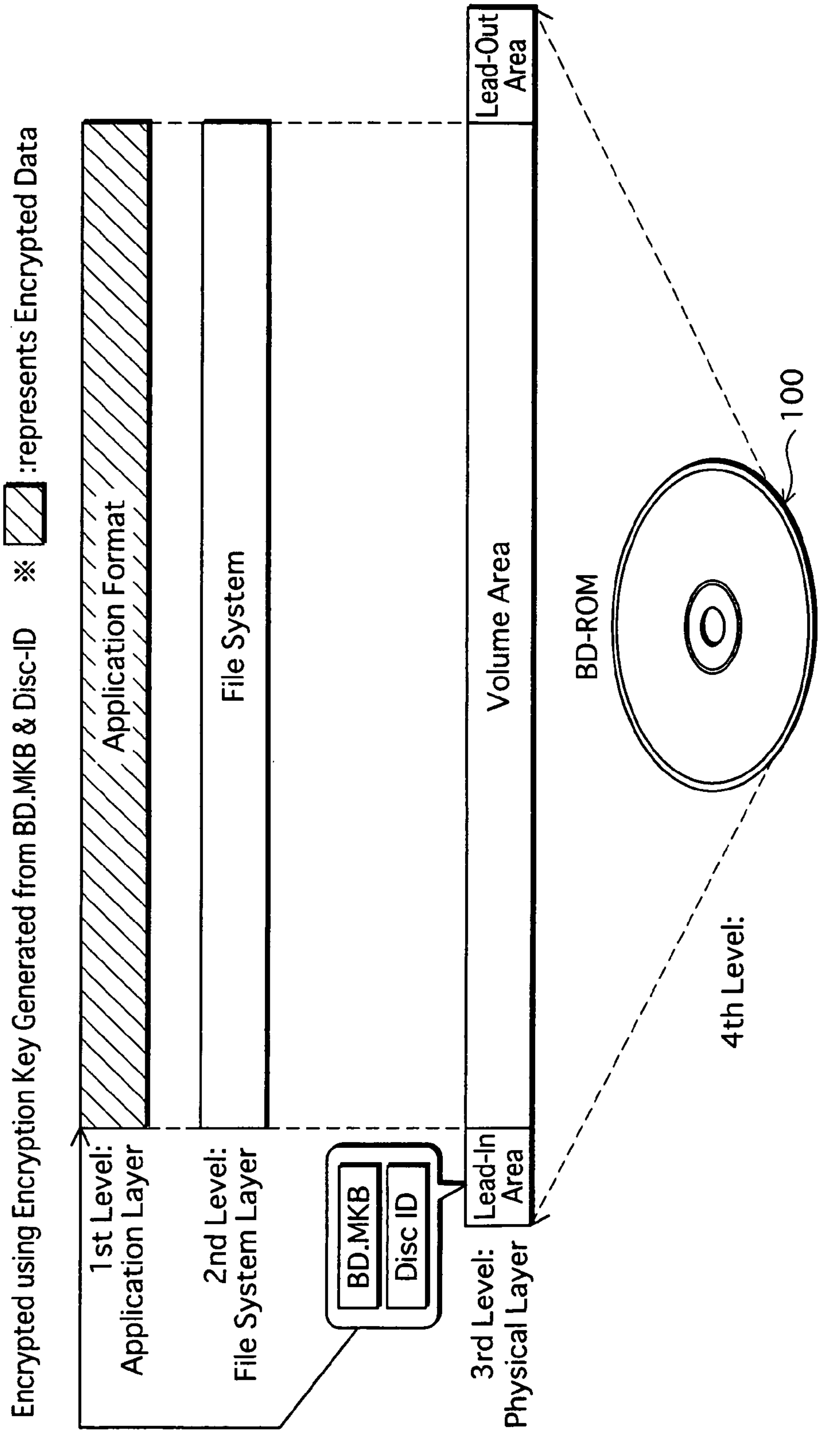
FIG. 2 illustrates the structure of a BD-ROM that is a recording media according to the present invention.

Next, the following describes an act of manufacturing the recording media according to the present invention. FIG. 2 illustrates the structure of the BD-ROM that is the recording media according to the present invention. In the figure, the BD-ROM is illustrated on the fourth level, and the track of the BD-ROM is illustrated on the third level. In the figure, the track is laterally stretched out, although the track in practice spirals outwards from the center of the BD-ROM. The track is composed of a lead-in area, a volume area, and a lead-out area. The volume area has a layer model of a physical layer, a file system layer, and an application layer. Data on the application layer constitutes the movie and is encrypted. A decryption key for decrypting the encrypted data is generated from a Disc ID and BD.MKB recorded in the lead-in area that is not copiable by users. Yet, any detailed description thereof is not given here. Since the data on the application layer is encrypted using a key stored on the lead-in area, unauthorized copying of the data on the BD-ROM to another recording medium will be of no use.

Figure 3:
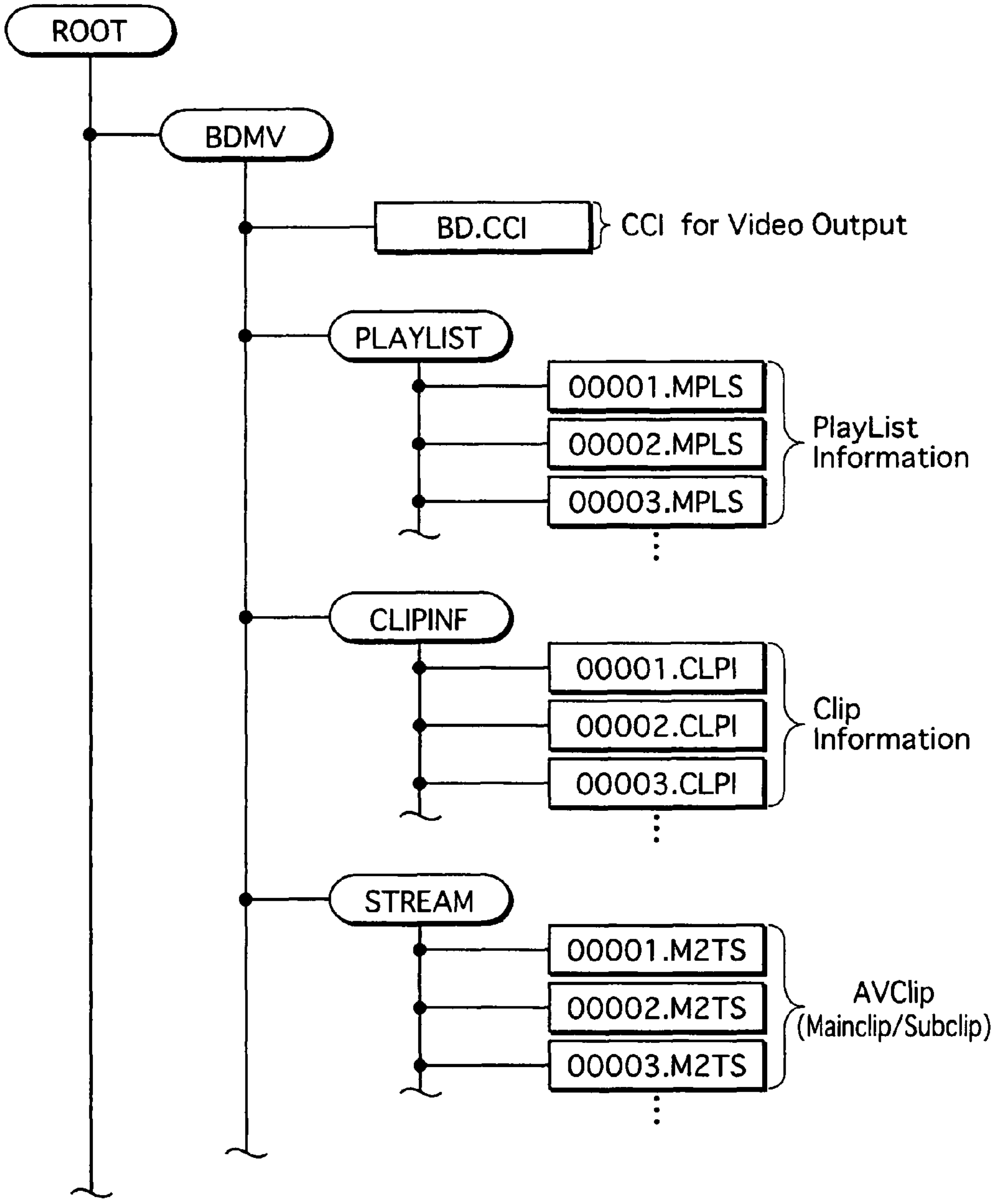
FIG. 3 illustrates the structure of an application layer the recording medium according to the present invention.

FIG. 3 illustrates the application layer format (application format) of the BD-ROM expressed using a directory structure. FIG. 3 illustrates the structure of the application layer of the recording medium according to the present invention. As illustrated in the figure, the BD-ROM has a Root directory, and the Root directly has a BDMV directory.

The BDMV directory stores a file with the extension "CCI" (a file called "BD.CCI"). In addition, the BDMV directory has three subdirectories called "PLAYLIST", "CLIPINF", and "STREAM".

The PLAYLIST directory stores files with the extension "mpls" (files called "00001.MPLS", "00002.MPLS", and "00003.MPLS").

The CLIPINF directory stores files with the extension "CLIP" (files called "00001.CLPI", "00002.CLPI", and "00003.CLPI").

The STREAM directory stores files with the extension "M2TS" (files called "00001.M2TS", "00002.M2TS", and "00003.M2TS").

The following sequentially describes files stored in each directory.

<Internal Structure of BD.CCI>

Figure 4A:
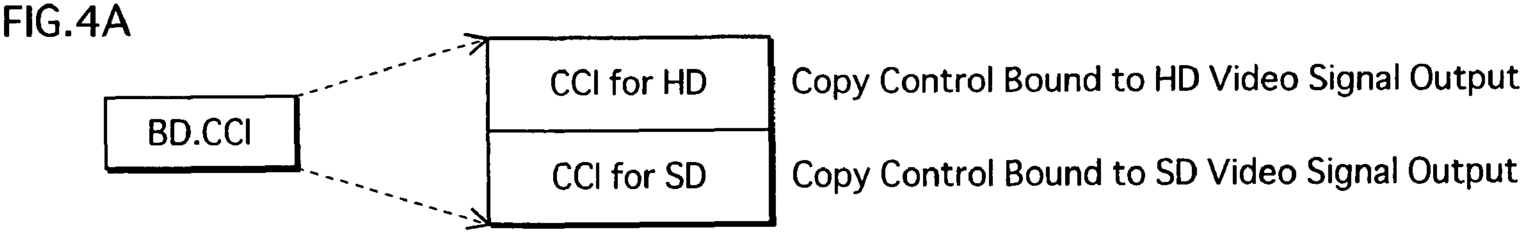
FIG. 4A illustrates the internal structure of BD.CCI.
Figure 4B:
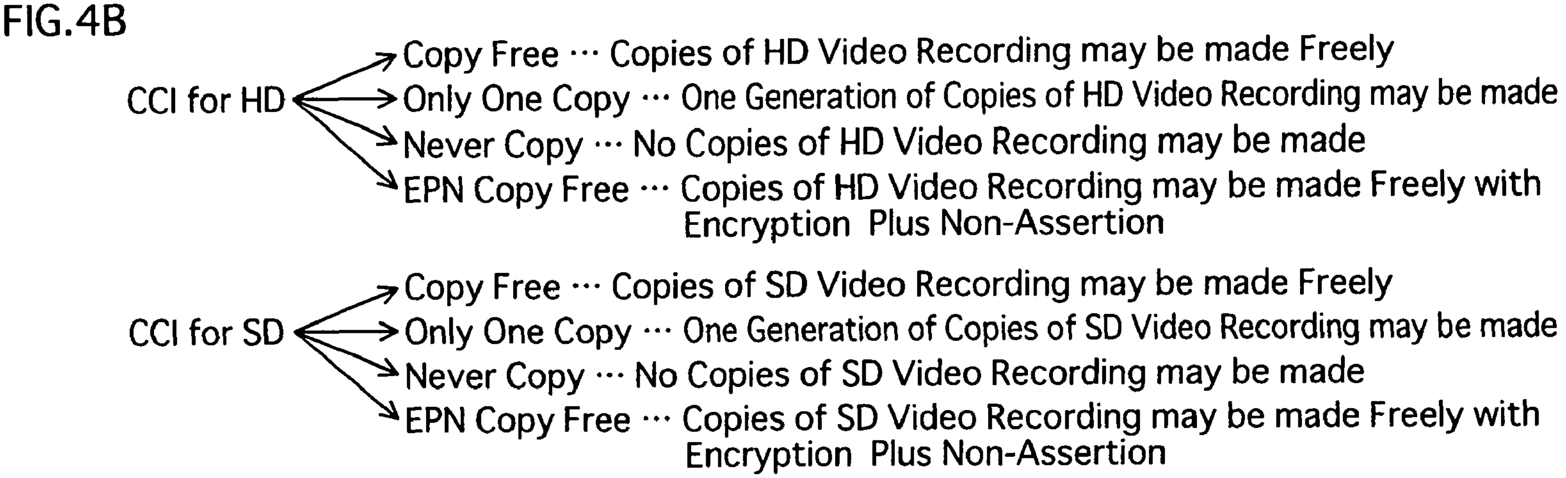
FIG. 4B illustrates one possible setting of CCIforHD and CCIforSD.

FIG. 4A illustrates the internal structure of BD.CCI. The BD-CCI contains information indicating, for each of a plurality of image quality levels, whether it is permitted to record a video signal output for playback at a respective image quality level. As illustrated in the figure, the BD-CCI includes CCIforHD defining a copy restriction of an HD video signal output and CCIforSD defining a copy restriction on an SD video signal output. FIG. 4B illustrates one possible setting of CCIforHD.

The CCIforHD is set to indicate one of the following statuses: "Copy Free", "Only One Copy", "Never Copy", and "EPN Copy Free".

The "Copy Free" status indicates that it is permitted to record an HD video signal on a portable recording medium and also permitted to freely copy the recorded content.

The "Only One Copy" status indicates that it is permitted to record an HD video signal on a portable recording medium. However, no further copying of the recorded content is permitted since the CCI is changed to indicate the "No More Copy" status upon the recording.

The "Never Copy" status indicates that recording of an HD video signal is totally prohibited.

The "EPN Copy Free (Copy Free+Encryption Plus Non-Assertion)" status indicates that it is permitted to freely copy an HD video signal on condition that encryption is applied. The encryption is applied in a manner that the content is decryptable only within a single home network. Since such encryption is required, the content is protected from unauthorized distribution via the Internet, while ensuring user's right to freely use the content within the home network.

Similarly to the CCIforHD, the CCIforSD is set to indicate one of the following statuses: "Copy Free", "Only One Copy", "Never Copy", and "EPN Copy Free".

Since the CCIforSD is provided separately from the CCIforHD, different levels of restrictions can be imposed on output signals of the playback device, depending on whether the signals are HD or SD signals.

Figure 4C:
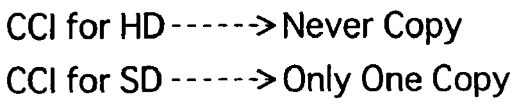
FIG. 4C illustrates an example in which different levels of restrictions are imposed on recording of a video signal.

FIG. 4C illustrates an example in which different levels of restrictions are imposed on recording of the respective levels of video signals. The copy control illustrated in the figure is such that an HD video signal is bound to the Never Copy status and an SD signal is bound to the Only One Copy status. Thus, it is permitted to record playback of the BD-ROM, provided that the playback device outputs the SD video signal. In this example, CCIforBD is set to indicate a relatively flexible copy restriction with CCIforSD set to the Only One Copy status. Yet, this is simply an example, and the CCIforSD may be set to the EPN Copy Free status.

This concludes the description of the BD.CCI.

<Structure of AV Clip>

Figure 5:
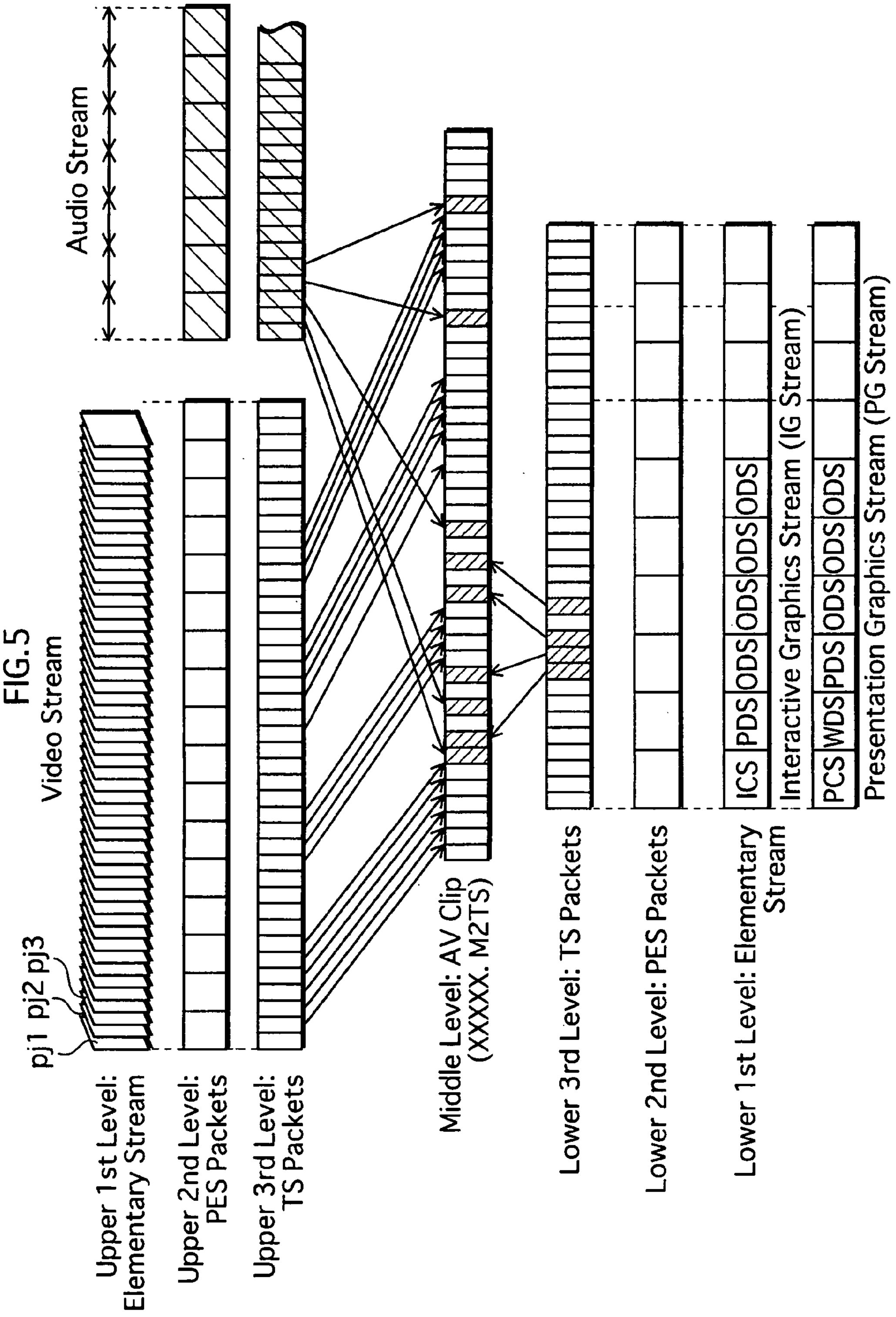
FIG. 5 schematically illustrates the structure of a file with the extension ".M2TS"

Next, a description is given of files with the extension ".M2TS" (files called "00001.M2TS", "00002.M2TS", "00003.M2TS", . . . ). FIG. 5 schematically illustrates the structure of a file with the extension ".M2TS". Each file with the extension ".M2TS" contains an AV clip. The AV clip (illustrated on the middle level) is created as follows. A video stream containing a plurality of video frames (pictures pj1, pj2, pj3, . . . ) and an audio stream containing a plurality of audio frames (both illustrated on the first level) are separately converted to PES packets (illustrated on the second level), and further converted to TS packets (illustrated on the third level). Similarly, a presentation graphics stream (hereinafter "PG stream") for presenting subtitles and an interactive graphics stream (hereinafter "IG stream") for presenting interactive composition (both illustrated on the first level from the bottom) are converted into PES packets (illustrated on the second level from the bottom) and further into TS packets (illustrated on the third level from the bottom). These TS packets of the video, audio, PG, and IG streams are multiplexed to form the AV clip.

Before the AV clip is recorded onto the BD-ROM, an extension header is attached to each TS packet multiplexed in the AV clip. The extension header is 4-byte data called "TP_extra_header" and contains "arrival_time_stamp" and "copy_permission_indicator". The TS packets each attached with a TP_extra_header are divided into groups of 32 packets, and each group of packets is recorded into three sectors of the BD-ROM track. The size of one group composed of 32 packets with headers amounts to 6,144 (=32×192) bytes, which is equal to the total size of three sectors (=2048×3). Each group of 32 TS packets with headers stored in three sectors of the BD-ROM track is referred to as an "Aligned Unit".

This concludes the description of AV clips. Apart from the above-described AV clip composed of a plurality of elementary streams as described above, there is an AV clip composed of an elementary stream to be played back in synchronism with another elementary stream. Such an AV clip is referred to as a SubClip. For example, a SubClip may be a file containing only one of IG stream, an audio stream, and a text subtitle stream. This concludes the description of the internal structure of the AV clip. Next, individual elementary streams multiplexed in AV clips are sequentially described.

<Video Stream>

A video stream is an elementary stream generated by encoding video material into an MPEG2-Video format.

There are different types of video material, such as "film-based material", "NTSC material", and "PAL material", depending on the frame interval and the resolution.

The "film-based material" refers to video of which frame interval is 3750 (alternatively 3753 or 3754) clocks in time accuracy of 90,000 Hz. The resolution of each frame is typically 1920×1080, 1440×1080, or 1280×720. A video stream generated from film-based material of 24 Hz is provided with PTS values set at the 3750-clock intervals. Similarly, a video stream carrying film-based material of 24 Hz is provided with PTS values at 3750-clock intervals. Similarly, a video stream carrying film-based material of 23.976 Hz is provided with PTS values at 3753- or 3754-clock intervals.

The "NTSC material" refers to video of which frame interval is 1501 clocks (or 1502 clocks). The resolution of each frame is typically 720×480 or 704×480. A video stream generated from NTSC material is provided with PTS values set at the 1501-clock (or 1502-clock) intervals.

The "PAL material" refers to video of which frame interval is 1800 clocks. The resolution of each frame is typically 720×576 or 704×576. A video stream generated from PAL material is provided with PTS values set at the 1800-clock intervals. This concludes the description of video streams.

Because of its resolution, film-based material is generally referred to as HD material. In addition, material having the same frequency as that of NTSC or PAL may be referred to as HD material if the resolution is 1280×720 or higher. On the other hand, NTSC and PAL material is often referred to as SD material. Video signals representing HD material is what is referred to as an HD video signal above, whereas video signals representing NTSC or PAD material is what is referred to as an SD video signal above.

<Audio Stream>

An audio stream is digital audio data encoded using the Dolby-AC3 or Linear-PCM codec.

<PG Stream>

A PG stream is a graphics stream carrying graphics data used for presenting subtitles in a specific language. There is a plurality of PG streams for a plurality of languages, such as English, Japanese, and French. A PG stream is composed of a sequence of functional segments, namely PCS (Presentation Control Segment), PDS (Pallet Definition Segment), WDS (Window Definition Segment), ODS (Object Definition Segment), and END (END of Display Set Segment). The ODS defines a graphics object used for presenting text subtitles.

The WDS defines a rendering area for the display of graphics data on a screen. The PDS defines output colors for rendering the graphics object. The PCS defines page control for presentation of text subtitles. The page control includes Cut-In/Out, Fade-In/Out, Color Change, Scroll, and Wipe-In/Out. Under the page control defined by the PCS, it is possible to realize such a display effect that a set of text subtitles gradually disappears, while the next set of text subtitles starting to appear on the screen.

A description of PG streams is found for example in the following PCT publication: WO 2004/068854 A1.

<IG Stream>

An IG stream is a graphics stream used for implementing interactive control. The interactive control defined by an IG stream is compatible with interactive control performed by a DVD playback device. An IG stream is composed of a sequence of functional segments, namely ICS (Interactive Control Segment), PDS (Pallet Definition Segment), ODS (Object Definition Segment), and END (END of Display Set Segment). The ODS defines a graphics object. A plurality of such graphics objects is used to render a button presented on an interactive display. The PDS defines output colors for rendering the graphics objects. The ICS defines control for changing the button state in response to a user operation. The ICs includes a button command to be executed upon receipt of a user operation for activating the button.

A description of IG streams is found for example in the following PCT publication No. WO 2004/098193 A2.

This concludes the description of Main Clips. Next, a description of SubClips will be given. A SubClip contains a digital stream to be played back in synchronism with a Main Clip. Examples of such a digital stream include an audio stream, a graphics stream, and a text subtitle stream. This concludes the description of elementary streams.

<Clip Information>

Figure 6:
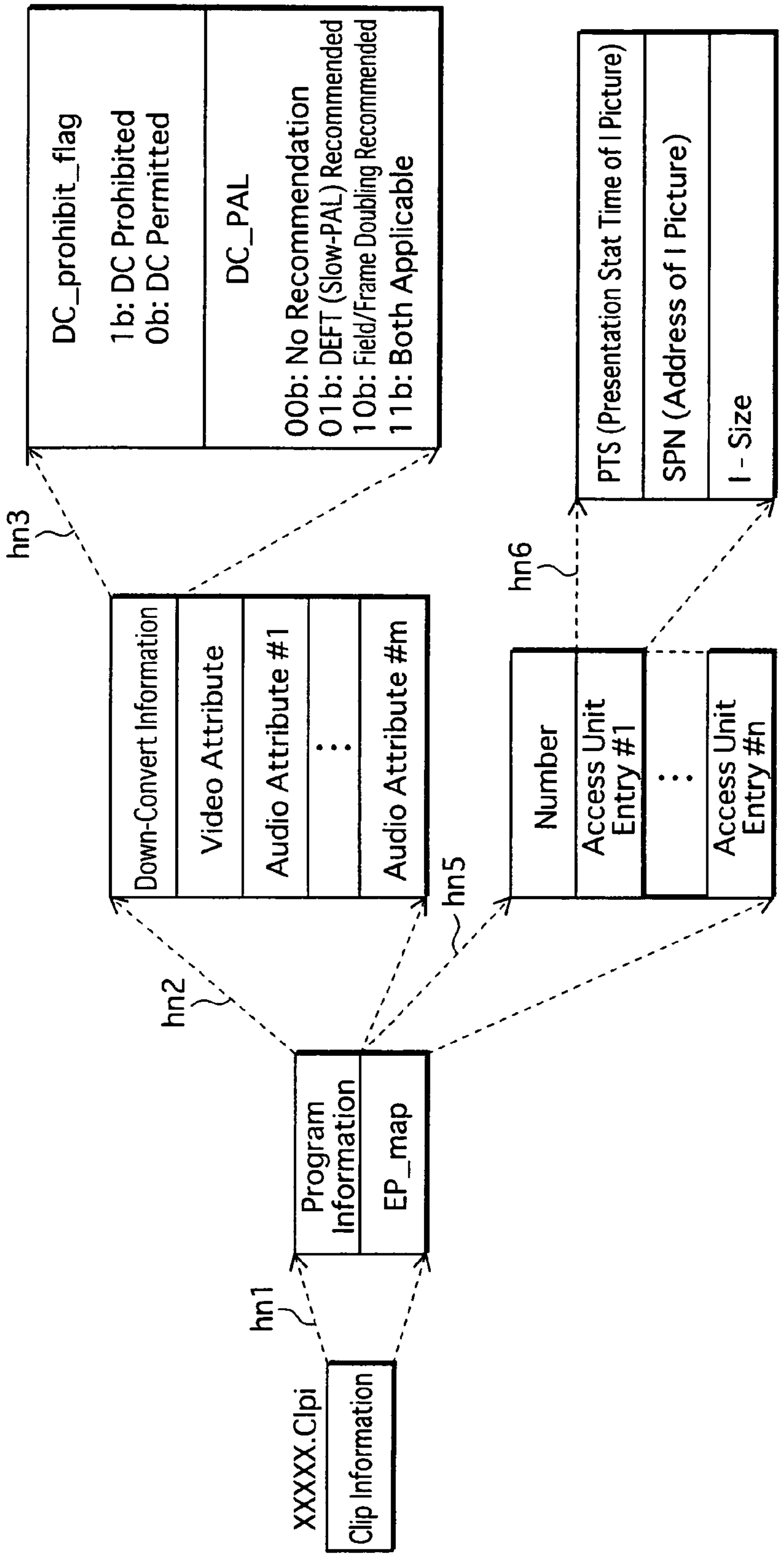
FIG. 6 illustrates the internal structure of Clip information.

Next, the following describes files with the extension ".CLPI". Each file with the extension ".CLPI" (files called "00001.CLPI", "00002.CLPI", "00003.CLPI", . . . ) contains Clip information. The clip information is management information of an individual AV clip. FIG. 6 illustrates the internal structure of Clip information. In the figure, leader lines indicate that the internal structure of the Clip information is illustrated in greater detail. As indicated by the leader lines hn1, the clip information includes “program information” and “EP_map”. The “EP_map” is used to access the address of an I picture.

The “program information” indicates attributes of an individual elementary stream multiplexed in the AV clip. The attributes include a video attribute, an audio attribute, and a graphics attribute. The video attribute includes material information indicating whether the video stream of the associated AV clip is of film-based material, NTSC material, or PAL material.

The “EP_map” is a reference table used for indirect referencing to the address of a skip position specified by time information. As indicated by leader lines hn5, the EP_map is composed of a plurality of entries (Access Unit #1 Entry-Access Unit #n Entry) and the number of entries (Number).

As indicated by leader lines hn6, each entry includes the playback start time, the address (SPN), and the size of the I picture associated with the entry. More specifically, the playback start time of the I picture is shown by the time stamp attached to the I picture (Presentation Time Stamp). The address of the I picture is expressed by a serially assigned SPN (Source Packet Number). Note that the file name “XXX.CLPI” contains “XXX” that is in common with the name of the AV clip associated with the Clip information. In the example illustrated in the figure, since the file name of the AV clip is “XXX”, it is known that the Clip information is associated with the AV clip (XXX.M2TS). This concludes the description of Clip information.

Regarding video signal output, the program information includes “DC (Down Convert) information”. The term “downconvert” refers to a conversion of HD material into an SD video signal. Leader lines hn3 in FIG. 6 indicates that the internal structure of DC information included in Clip information is illustrated in greater detail. As indicated by dotted arrows in the figure, the DC information includes “DC_Prohibit_Flag” and “DC_PAL”. The “DC_Prohibit_Flag” indicates whether it is permitted to downconvert the associated AV clip. The “DC_PAL” indicates a recommended conversion system for downconverting to PAL, provided that downconversion is permitted. This concludes the description of the Clip information.

<Playlist Information>

Figure 7:
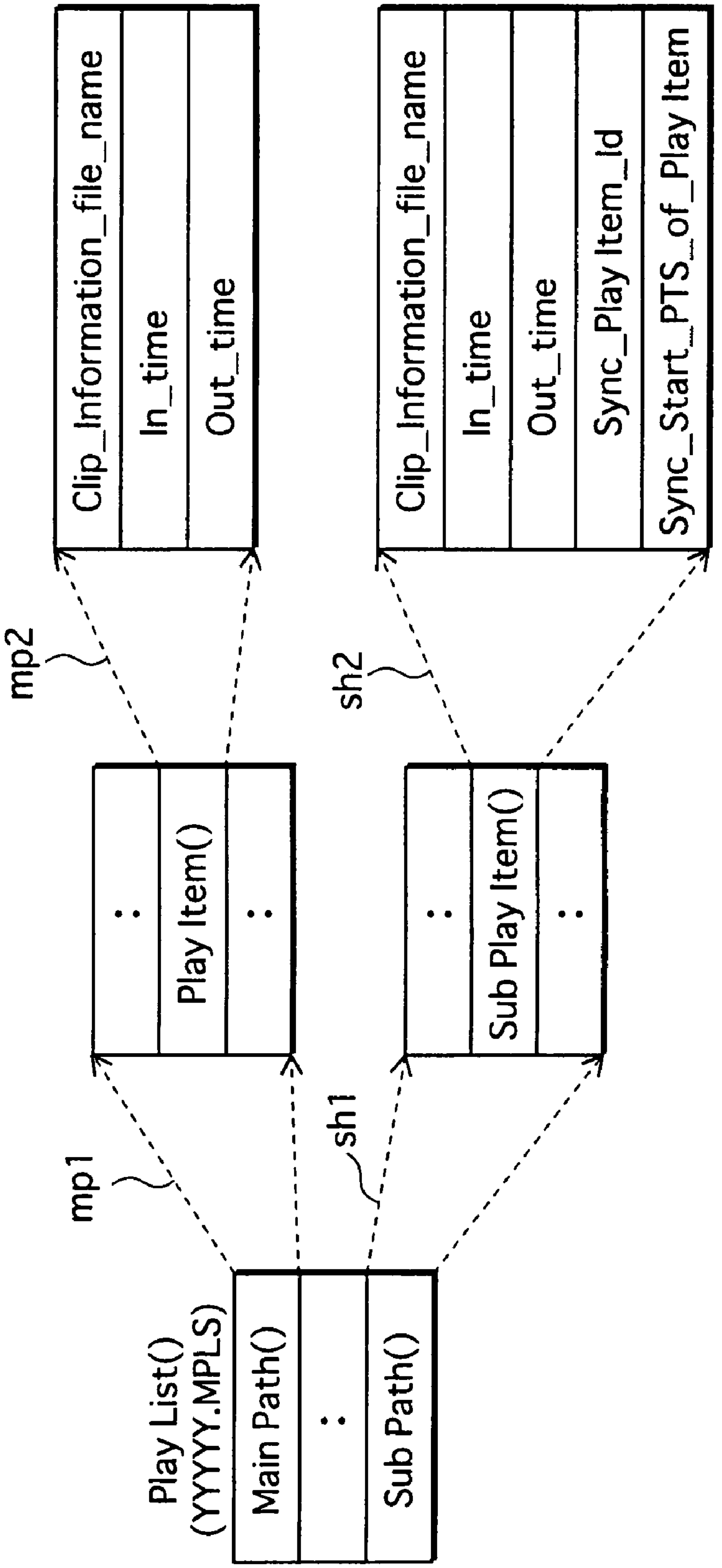
FIG. 7 illustrates the structure of PL information.

Next, the following describes files with the extension “.mpls” (files called “0001.MPLS”, “0002.MPLS”, “0003.MPLS” . . . ). A file with the extension “.mpls” contains playList information. The playalist information defines a playlist using references to AV Clips. FIG. 7 illustrates the structure of PL information. As the leftmost block of the figure indicates, the playlist information includes “MainPath information” and “SubPath information”.

Figure 8:
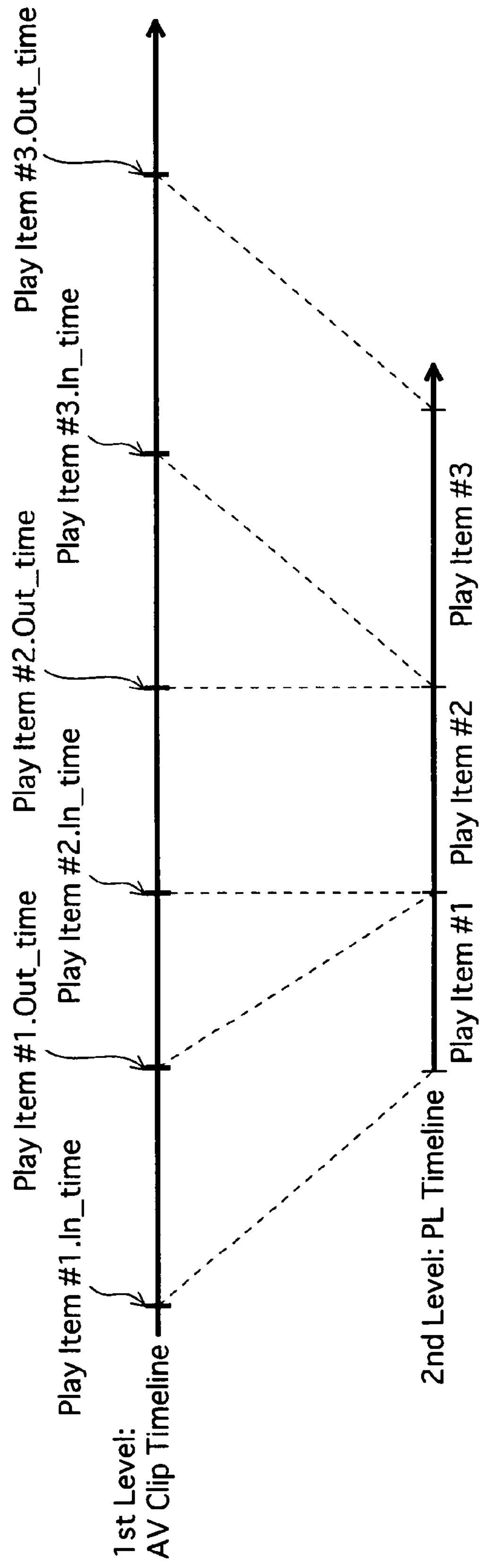
FIG. 8 illustrates the relationship between an AV clip and PlayList information.

As indicated by dashed arrows mp1, the MainPath information (MainPath( )) is composed of a plurality of pieces of PlayItem information (PlayItem ( )). Each piece of PlayItem information defines a playback section by specifying In_time and Out_time on one continuous AV Clip timeline. With the plurality of pieces of PlayItem information, a PlayList (hereinafter also referred to as “PL”) composed of a plurality of playback sections is defined. In FIG. 7, dashed arrows mp2 indicate that the internal structure of PlayItem information is illustrated in greater detail. As illustrated, the PlayItem information is composed of the following fields: “Clip_information_file_name” indicating the name of the associated AV clip; “In_time”; and “Out_time”. FIG. 8 illustrates the relationship between the AV clip and the PlayList information. The first level illustrates the timeline of the AV clip, and the second level illustrates the timeline of the PL. The PL information includes PlayItem #1, #2, and #3. The In_time and the Out_time of PlayItem #1, #2, and #3 define three playback sections. A linear sequence of the three playback sections defines a timeline that is different from the AV clip timeline. This timeline of the three playback sections is the PL timeline illustrated on the second level in the figure. As stated above, by defining the PlayItem information, a timeline different from the AV clip timeline is defined. A playback section of the AV clip defined by the PlayItem information is referred to as a “MainPath”.

The SubPath information (SubPath( )) defines one continuous playback section by specifying In_time and Out_time on the time line of the SubClip. FIG. 7 illustrates, as leader lines sh1 indicate, the internal structure of SubPath information in detail. As illustrated, the SubPath information is composed of a plurality of pieces of SubPlayItem information (SubPlayItem ( )). Further, as indicated by leader lines sh2, the SubPlayItem information is composed of the following fields: “Clip_information_file_name”, “In_time”, “Out_time”, “sync_PlayItem_id”, and “sync_start_PTS_of_PlayItem”. The “Clip_information_file_name”, “In_time”, and “Out_time” fields define a playback section on the SubClip timeline. The “sync_PlayItem_id” and “sync_start_PTS_of_PlayItem” fields define synchronous playback of the playback section defined on the SubClip timeline with the PL timeline. According to the defined synchronous playback, playback proceeds synchronously on the PL timeline and the Subclip timeline. The playback section defined on the SubClip is referred to as “SubPath”.

Figure 9:
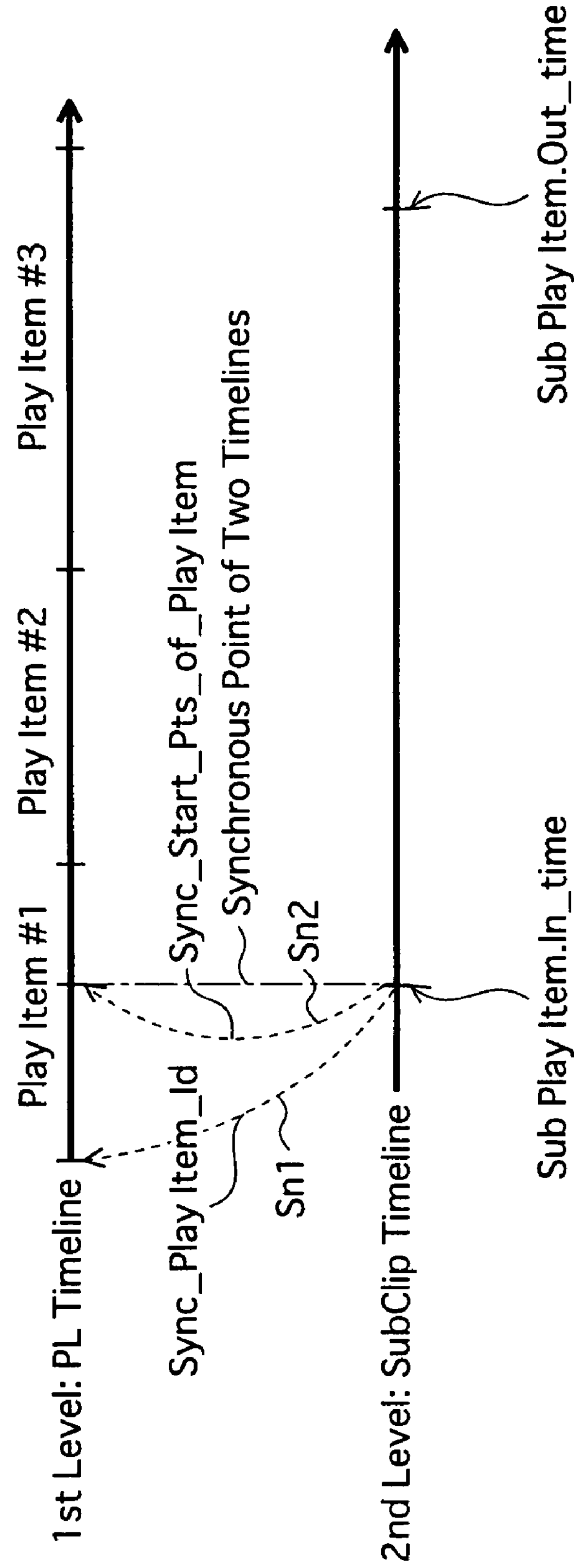
FIG. 9 illustrates a playback section defined on a SubClip timeline and control defined for synchronous playback of the playback section.

FIG. 9 illustrates a playback section defined on the SubClip timeline and playback control defined for synchronous playback. In the figure, the first level illustrates the PL timeline, and the second level illustrates the SubClip timeline. The SubPlayItem.In_time and the SubPlayItem.Out_time indicate the start point and end point of the playback section, respectively. It is thus shown that the playback section is defined also on the SubClip timeline. An arrow Sn1 indicates that the Sync_PlayItem_id specifies a PlayItem to be synchronously played with the playback section. An arrow Sn2 indicates that Sync_start_PTS_of_PlayItem specifies a specific point on the PlayItem (PlayItem #1) specified by the Sync_PlayItem_id.

The playback information on a BD-ROM can define a multi-angle section and a synchronous section. During playback of a multi-angle section, an angle change is possible among a plurality of AV clips. During playback of a synchronous section, an AV clip and a SubClip are synchronously played back. The Clip information and PlayList information described above is classified as “static scenario”, because they define a PL, which is a statically defined playback unit. This concludes the description of the BD-ROM.

Next, a description of a playback device according to the present invention is given.

<Internal Structure of Playback Device>

Figure 10:
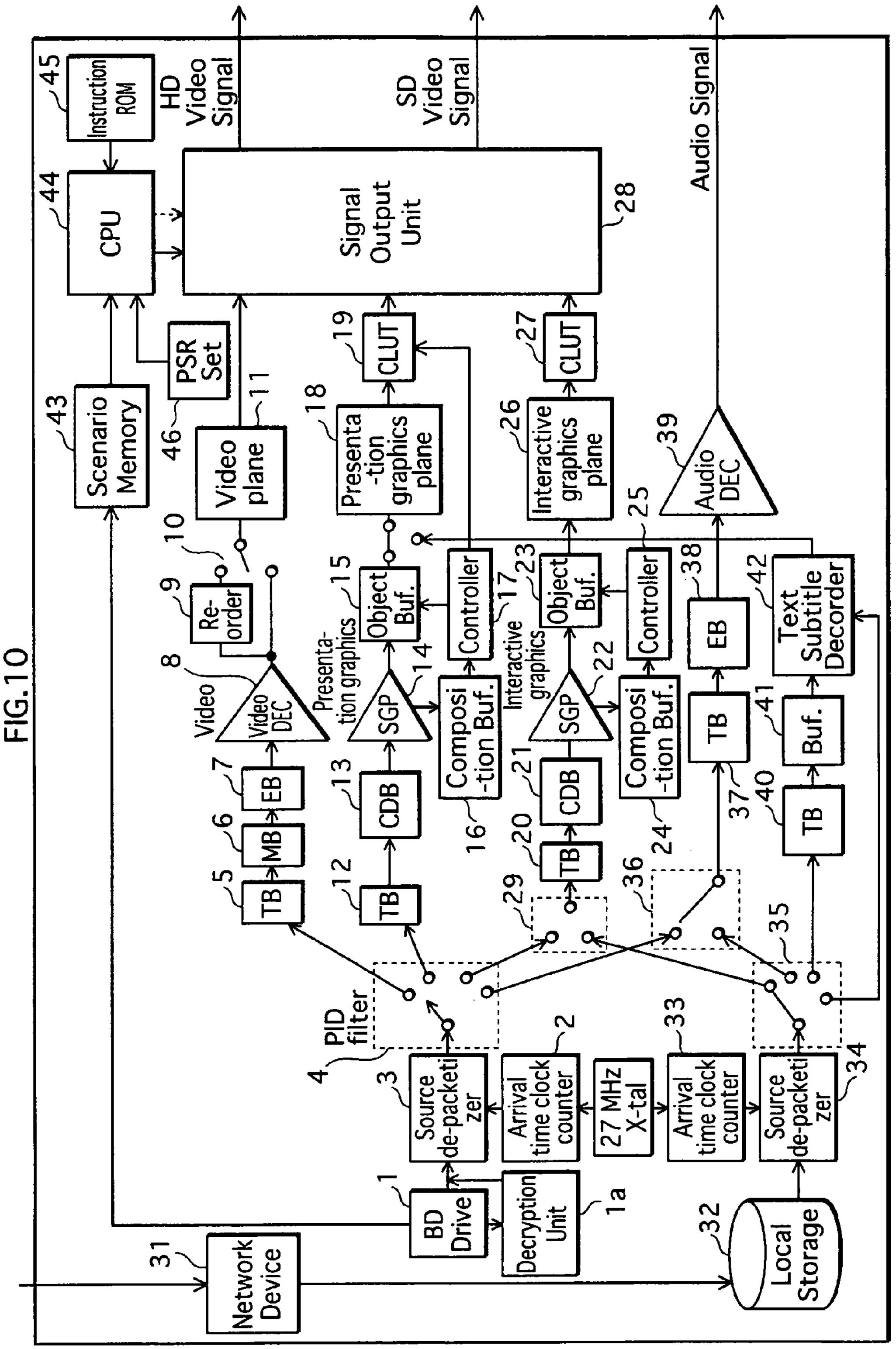
FIG. 10 illustrates the internal structure of a playback device according to the present invention.

FIG. 10 illustrates the internal structure of a playback device according to the present invention. Based on the internal structure illustrated in the figure, playback devices consistent with the present invention are industrially manufactured. The playback device of the present invention is roughly composed of two parts, one of which is a system LSI and the other is a drive device. By mounting those parts into a device cabinet and onto a substrate, the playback device can be manufactured industrially. The system LSI is an integrated circuit containing various processing units for implementing the functions of the playback device. The playback device manufactured in the above manner is composed of a BD drive 1, a decryption unit 1*a*, an arrival time clock counter 2, a source de-packetizer 3, a PID filter 4, a transport buffer 5, a multiplexed buffer 6, a elementary buffer 7, a video decoder 8, a re-order buffer 9, a switch 10, a video plane 11, a transport buffer 12, a coded data buffer 13, a stream graphics processor 14, an object buffer 15, a composition buffer 16, a composition controller 17, a presentation graphics plane 18, a CLUT unit 19, a transport buffer 20, a coded data buffer 21, a stream graphics processor 22, an object buffer 23, a composition buffer 24, a composition controller 25, an interactive graphics plane 26, a CLUT unit 27, a signal output unit 28, a switch 29, a network device 31, a local storage 32, an arrival time clock counter 33, a source de-packetizer 34, a PID filter 35, a switch 36, a transport buffer 37, an elementary buffer 38, an audio decoder 39, a transport buffer 40, a buffer 41, a text subtitle decoder 42, a scenario memory 43, a CPU 44, an instruction ROM 45, and a PSR set 49. Note that the internal structure illustrated in the figure is a decoder model based on the MPEG T-STD model and capable of down-converting.

The BD drive 1 loads/ejects the BD-ROM and accesses the BD-ROM to sequentially read Aligned Units each composed of 32 TS packets.

The decryption unit la reads the Disc ID and the BD.MKB from the lead-in area, and generates an encryption key. The decryption unit la decrypts the AV clip using the thus generated encryption key, and supplies the decrypted data in real time to the source de-packetizer 3.

The arrival time clock counter 2 generates an arrival time clock using a 27 MHz crystal oscillator (27 MHz X-tal). The arrival time clock is a clock signal defining the time line on which the ATS assigned to each TS packet is based.

Once an Aligned Unit composed of 32 TS packets is read from the BD-ROM, the source de-packetizer 3 removes the TP_extra_header from each of the 32 TS packets and outputs the TS packets without the headers to the PID filter 4. The output by the source de-packetizer 3 to the PID filter 4 is performed at the timing when the time measured by the arrival time clock counter 2 reaches the ATS shown by the TP_extra_header. Since the output to the PID filter 4 is carried out in accordance with the ATS, the TS packets are sequentially output to the PID filter 4 in accordance with the time measured by the arrival time clock counter 2, regardless of the speed at which data is read from the BD-ROM, such as 1×-speed or 2×-speed.

The PID filter 4 judges, with reference to the PID attached to the TS packets, whether the type of stream to which the TS packets belong is a video stream, a PG stream, or an IG stream. According to the judgment, the PID filter 4 outputs the TS packets to an appropriate one of the transport buffers 5, 12, 20, and 37.

The transport buffer (TB) 5 is a buffer for temporarily storing TS packets output from the PID filter 4, if the TS packets belong to a video stream.

The multiplexed buffer (MB) 6 is a buffer for temporarily storing PES packets output from the transport buffer 5, in order to later output the video stream to the coded picture buffer 7.

The elementary buffer (EB) 7 is a buffer for storing a video elementary stream.

The video decoder 8 decodes individual frames contained in the video elementary stream at every predetermined decoding time (DTS) to obtain a plurality of frames and writes the resulting picture data on the re-order buffer 9.

The re-order buffer 9 is a buffer for storing pictures (I picture and P picture) referenced by other pictures.

The switch 10 performs switching between output from the video decoder 8 and output from the re-order buffer 9, so as to reorder the presentation order of coded data obtained by decoding.

The video plane 11 is used for presenting uncompressed picture data. A plane is a memory area of the playback device for storing a frame of pixel value data. The video plane 11 stores picture data at the resolution of 1920×1080 and the picture data is composed of pixel values each expressed by 16-bit YUV values.

The transport buffer (TB) 12 is a buffer for temporarily storing TS packets output from the PID filter 4, if the TS packets belong to a PG stream.

The coded data buffer (CDB) 13 is a buffer for temporarily storing PES packets constituting a PG stream.

The stream graphics processor (SPG) 14 decodes a PES packet containing graphics data (ODS) to obtain uncompressed bitmapped data expressed by index colors. The stream graphics processor (SPG) 14 then writes the obtained bitmapped data as a graphics object on the object buffer 15.

The object buffer 15 holds the graphics object obtained as a result of the decoding performed by the stream graphics processor 14.

The composition buffer 16 is memory for storing control information for graphics data rendering (PCS).

The composition controller 17 analyzes the PCS stored on the composition buffer 16 and executes control in accordance with the analytical result.

The presentation graphic plane 18 is a memory area as large as one full screen and stores uncompressed graphics data worth one screen. The presentation graphic plane 18 stores uncompressed graphics data at the resolution of 1920×1080 and pixel values of the uncompressed graphics data are expressed using an 8-bit index colors. By converting the index colors with reference to a CLUT (Color Lookup Table), the uncompressed graphics data stored on the presentation graphics plane 18 is supplied for display.

The CLUT unit 19 converts the index colors of the uncompressed graphics data stored on the presentation graphic plane 18 into Y, CR, and Cb values.

The transport buffer (TB) 20 is a buffer for temporarily storing TS packets belonging to an IG stream.

The coded data buffer (CDB) 21 is a buffer for temporarily storing PES packets constituting an IG stream.

The stream graphics processor (SPG) 22 decodes a PES packet carrying graphics data to obtain uncompressed bitmapped data expressed by index colors, and writes the obtained bitmapped data as a graphics object on the object buffer 23.

The object buffer 23 stores a plurality of uncompressed graphics objects obtained as a result of the decoding by the stream graphics processor 22.

The composition buffer 24 is a buffer for storing control information for graphics data rendering.

The composition controller 25 analyzes the PCS stored on the composition buffer 24 and executes control in accordance with the analytical result.

The interactive graphics plane 26 is used for presenting uncompressed graphics data obtained as a result of the decoding by the stream graphics processor (SGP) 22. The uncompressed graphics data is written on the interactive graphics plane 26 at the resolution of 1920×1080, and the graphics data is composed of pixel values each expressed using 8-bit index colors. By converting the index colors with reference to the CLUT (Color Lookup Table), the uncompressed graphics data stored on the interactive graphics plane 26 is supplied for display.

The CLUT unit 27 converts the index colors of the uncompressed graphics data stored on the interactive graphics plane 26 into Y, CR, and Cb values.

The signal output unit 28 captures data from the video plane 11, the presentation graphics plane 18, and the interactive graphics plane 26 at predetermined time intervals to generate HD and SD video signals and output the resulting signals simultaneously.

The switch 29 selectively supplies the TS packets read from the BD-ROM or the TS packets read from the local storage 32 to the transport buffer 20.

The network device 31 is used to implement the communications functionality of the playback device. More specifically, the network device 31 establishes TCP connection, FTP connection, and so on, with a web site at an URL.

The local storage 32 is used to store content supplied via various recording media and communication media. Content downloaded from a web site via the connection established by the network device 31 is also stored to the local storage 32.

The source de-packetizer 34 removes the TP_extra_header from each TS packet constituting the AV clip read from the local storage 32 and outputs the TS packets without headers to the PID filter 35. The output of the TS packets to the PID filter 35 is carried out at the timing when the time measured by the arrival time clock counter 33 reaches the ATS shown by the TP_extra_header.

The PID filter 35 performs switching so as to selectively output the TS packets read from the local storage 32 to an appropriate one of the IG stream decoder, the audio decoder, and the text subtitle decoder.

The switch 36 issues a permission request for the TS packets read from the BD-ROM or from the local storage 32.

The transport buffer (TB) 37 stores the TS packets belonging to an audio stream.

The elementary buffer (EB) 38 stores the PES packets constituting the audio stream.

The audio decoder 39 decodes the PES packets output from the elementary buffer 38 and outputs uncompressed audio data obtained by the decoding.

The transport buffer (TB) 40 stores TS packets belonging to a text subtitle stream.

The elementary buffer (EB) 41 stores the PES packets carrying the text subtitle stream.

The text subtitle decoder 42 decodes PES packets read to the elementary buffer 41 and supplies the resulting data for presentation. More specifically, the text subtitle decoder 42 expands text strings contained in the text subtitle stream into bitmapped data, by applying font data separately read from the local storage 32. The resulting data is written on the presentation graphics plane 18.

The scenario memory 43 stores current PlayList information and current Clip information. The current PlayList information used herein refers to the currently processed PlayList information from among a plurality of pieces of PlayList information stored on the BD-ROM. The current Clip information used herein refers to the currently processed Clip information from among a plurality of pieces of Clip information stored on the BD-ROM.

The CPU executes software stored on the instruction ROM 45 to carry out overall control of the playback device. The control executed on the playback device dynamically changes in response to a user event generated upon receipt of a user operation and in accordance with the values held in the PSRs of the PSR set 49.

The instruction ROM 45 stores software defining playback control of the playback device.

The PSR set 49 is a set registers provided within the playback device. The set of registers include 64 player status registers (PSRs) and 4,096 general-purpose registers (GPRs). The 64 player status registers represent the current status of the playback device, including the current playback point. The current playback point is represented by the values of the PSR(5)-PSR(8). Specifically, the PRS (8) takes on a value ranging from 0 to 0xFFFFFFFF representing the current playback point (current PTM) on the AV clip in 45 KHz time accuracy. The PSR (11) represents the page_id of the currently active page (current page) constituting a multi-page menu. The PSR(10) represents, the button in the selected state (current button) presented on the current page.

<Internal Structure of Signal Output Unit 28>

Figure 11:
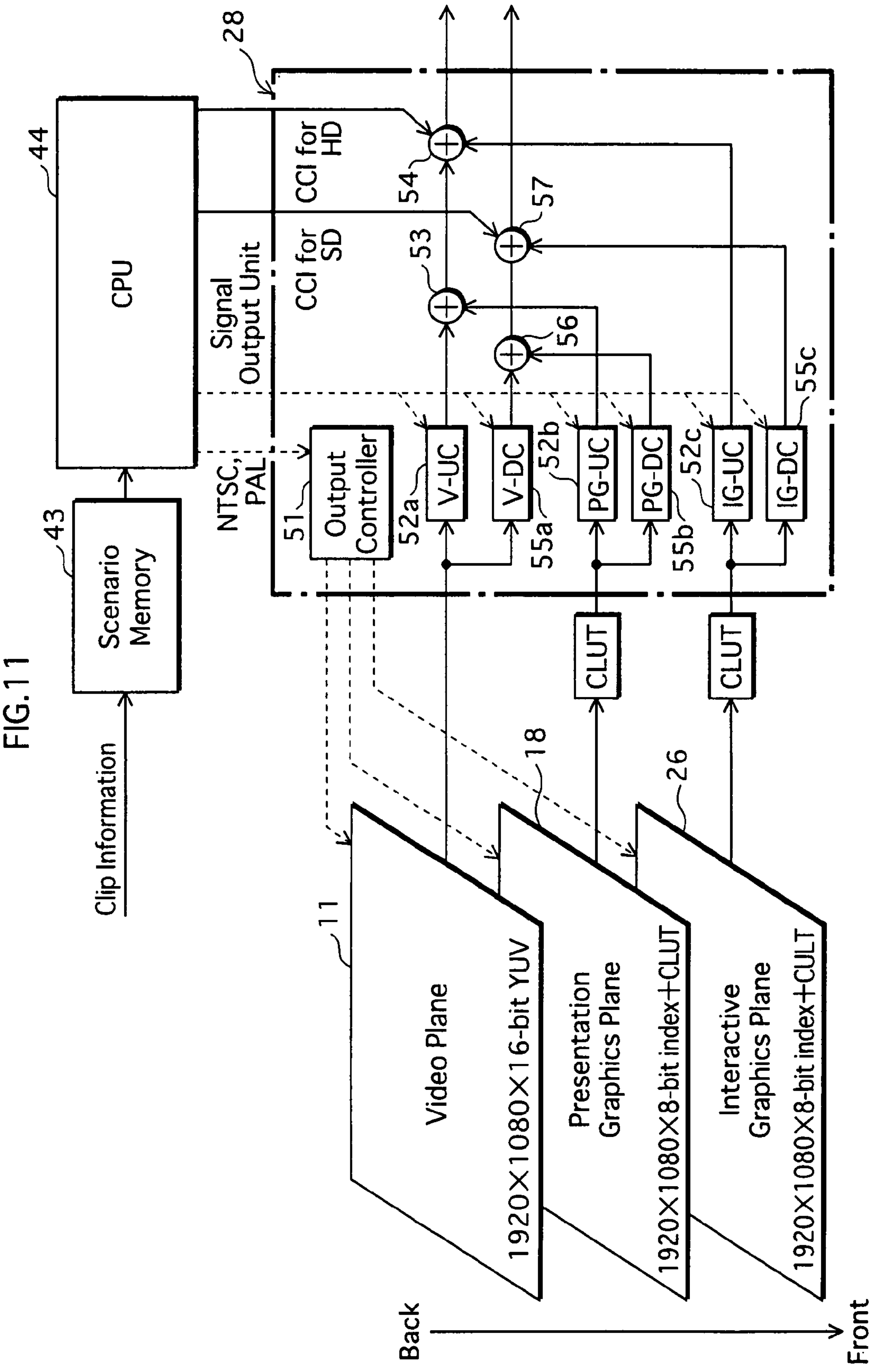
FIG. 11 illustrates the internal structure of a signal output unit 28.

This concludes the description of the internal structure of the playback device. Next, a description of the internal structure of the signal output unit 28 is given in greater detail. FIG. 11 illustrates the internal structure of the signal output unit 28. As illustrated in the figure, the signal output unit 28 is composed of an output controller 51, an up-converters 52*a*, 52*b*, and 52*c*, a compositors 53 and 54, a down-converters 55*a*, 55*b*, and 55*c*, and compositors 56 and 57.

Figures 12A, 12B:
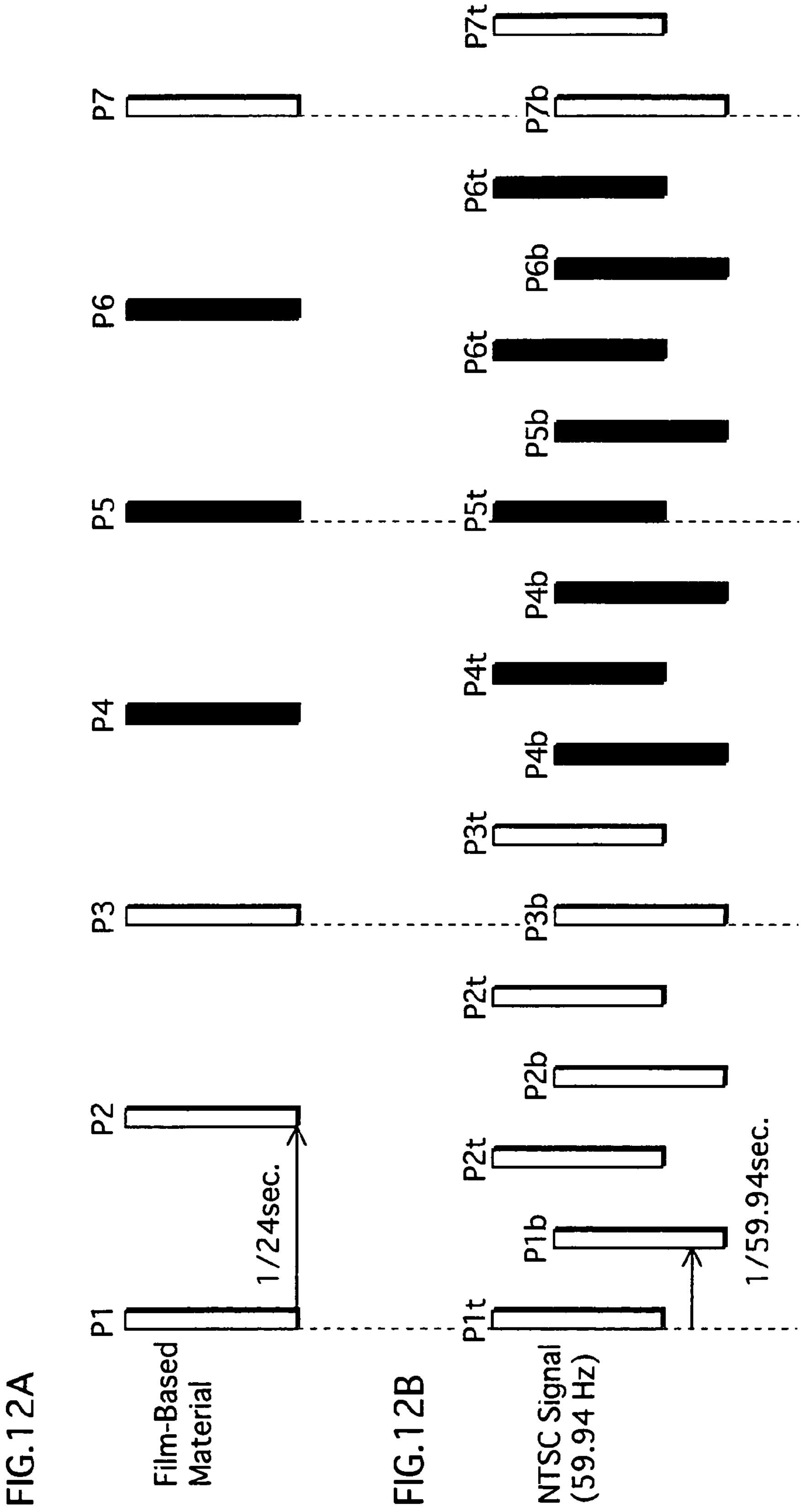
FIG. 12A illustrates an HD video output signal.
FIG. 12B illustrates conversion through a 2:3 pull down process.

The output controller 51 captures the data presented on the video plane 11, the presentation graphics plane 18, and the interactive graphics plane 26 at predetermined time intervals, and overlays the captured plane images on one another to make final video output at the adjusted display rate. FIG. 12A illustrates the HD video signal output. In the figure, frame images P1-P7 represent individual pictures constituting the HD video. The output controller 51 outputs those frame images at 1/24 sec intervals. As a result, a progressive HD video signal is output at 1/24 Hz.

Other than the above process, the display rate may be adjusted through 2:3 pull down, 50 Hz-DEFT, or 50 Hz-FD. The "display rate adjustment" used herein refers to the process of displaying video, for example, film-based material having a 24 Hz or 23.976 Hz display rate at a different display rate. FIG. 12B illustrates the 2:3 pull down conversion. In the figure, the frame images P1-P7 are individual pictures constituting film-based material. By applying the 2:3 pull down, the film-based material is converted into the following five fields: P1*t*-P1*b* (the top and bottom fields of P1), P2*t*-P2*b* (the top and bottom fields of P2), and P2*t* (the top field of P2). The output controller 51 outputs those frame fields at 1/59.94 sec intervals. As a result, the video signal is output at the display intervals compliant with the NTSC.

Figures 13A, 13B, 13C:
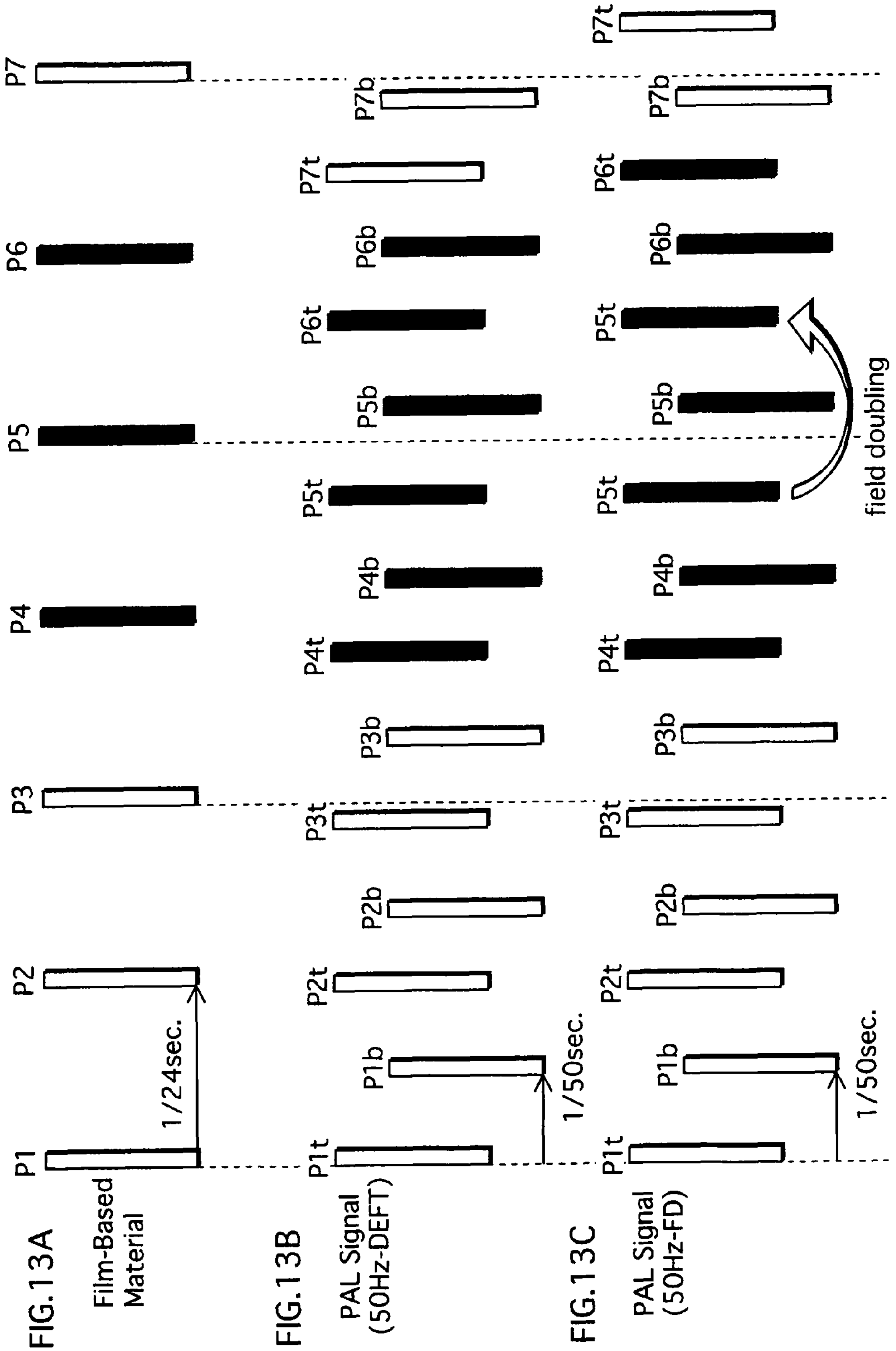
FIG. 13A illustrates the HD video signal output.
FIG. 13B illustrates conversion into a PAL signal through a 50 Hz-DEFT process.
FIG. 13C illustrates conversion into a PAL signal through a 50 Hz-FD process.

FIG. 13A illustrates the HD video output signal. FIG. 13B illustrates conversion into PAL signal through the 50 Hz-DEFT process. 50 Hz-DEFT is a process of converting 24 Hz video into 25 HZ. In other words, it is a process of fast-forwarding the video. More specifically, the conversion process is carried out by outputting the top and bottom fields of each picture at the intervals of 1/50 sec. In FIG. 13A, frame images P1-P3 are individual pictures constituting film-based material. By applying the 50 Hz-DEFT conversion to the images P1-P3, the following six fields are output: P1*t*-P1*b* (the top and bottom fields of P1); P2*t*-P2*b* (the top and bottom fields of P2); and P3*t*-P3*b* (the top and bottom fields of P3). The output controller 51 outputs those fields at 1/50 sec intervals. As a result, the film-based material is output as a video signal having display intervals compliant with the PAL. The 50 Hz-DEFT conversion is advantageous in that flame fluctuations are minimized. Yet, the 50-HZ DEFT involves disadvantage that audio playback rate needs to be increased with the video playback rate, which leads to audio distortion (high pitch). Due to the disadvantage, the 50 Hz DEFT is not suitable for applications that place importance on music.

FIG. 13C illustrates the conversion into a PAL signal through 50 Hz-FD. In the 50 Hz-FD (Field Dubbing) process, fields are duplicated (field dubbing) at regular intervals to slower the playback rate in order to minimize audio distortion. For example, one out of every five frames is dabbled (i.e., two fields per second). In FIG. 13A, the flame images P1-P5 are individual pictures constituting film-based material. The frames P1-P5 are converted into the following ten fields: P1*t*-P1*n*, P2*t*-P2*n*, P3*t*-P3*b*, P4*t*-P4*b*, and P5*t*-P5*b*. In the 50 Hz-FD process, the field P5*t* is subject to field dubbing. As a result of the field dubbing, the field p5*t* is output in duplicate, so that the video playback rate is reduced and maintained at the equal speed. In view of this, the 50 Hz FD is more suitable for applications that place importance on equal speed playback. This concludes the description of the output controller 51.

For playback of a video stream of SD material, the up-converter (V-UC) 52*a* modifies the resolution of the uncompressed frame image data stored on the video plane 11 by enlarging the frame image data in the horizontal and vertical directions. For playback of a video stream of HD material, the up-converter 52*a* does not apply any conversion but simply passes, as its output, the uncompressed frame image data stored on the video plane 11. The resolution of SD material is 720×480, whereas the resolution of HDTV is 1920×1080. Thus, the resealing rate in the horizontal direction is 1920 pixels/720 pixels≈2.67, whereas the rescaling rate in the vertical direction is 1080 pixels/480 pixels=2.25. In the process of up-conversion, an original frame image is enraged according to the resealing ratios and the pixel aspect ratio (the length-to-width ratio of each pixel).

For playback of a PG stream of SD material, the up-converter (PG-UC) 52*b* modifies the resolution of uncompressed graphics data stored on the presentation graphics plane 18 by enlarging in vertical and horizontal directions. For playback of a PG stream of HD material, the up-converter 52*b* does not apply any conversion but simply passes, as its output, the graphics data stored on the presentation graphics plane 18. The resealing ratios in the horizontal and vertical directions of SD material are calculated in the same manner as that used by the up-converter 52*a*.

For playback of an IG stream of SD material, the up-converter (IG-UC) 52*c* modifies the resolution of uncompressed graphics data stored on the interactive graphics plane 26, by enlarging the graphics data in vertical and horizontal directions. For playback of an IG stream of HD material, the up-converter 52*c* does not apply any conversion but simply passes, as its output, the frame image stored on the interactive graphics plane 26. The rescaling ratios in the horizontal and vertical directions of SD material are calculated in the same manner as that used by the up-converter 52*a*.

The compositor 53 carries out signal composition during the frame intervals of HD video signal. More specifically, the compositor 53 overlays the uncompressed frame image stored on the video plane 11 with the uncompressed graphics object sorted on the presentation graphics plane 18 to make an interim composite image. In the interim composite image obtained as a result of the composition, the text subtitles are overlaid on the video.

The compositor 54 carries out signal composition during (i) the frame intervals and (ii) vertical blanking intervals (VBI) of an HD video signal. More specifically, during (i) the frame intervals, the compositor 54 overlays the uncompressed graphics object stored on the interactive graphics plane 26 with the interim composite image (of the uncompressed picture data overlaid with the uncompressed graphics object stored on the presentation plane 18) output from the compositor 53. During (ii) the vertical blanking period, CGMS is embedded into vertical blanking intervals of the HD video signal. The CGMS is obtained by converting CCIforHD contained in CCIforBD. As a result of the processing by the compositor 54, the HD video signal carries a composite image of video+subtitles+a menu in the frame intervals, and also carries CGMS generated from CCIforHD in the vertical blanking intervals. In the future, transfer of the video signal may be carried out via a digital I/F such as HDMI. In such a case, the copy control information (CGMS) may be transferred using a different scheme than the analog transfer scheme. Still, what is required for adapting such a feature technology is to simply replace the signal composition process during (ii) the vertical blanking periods with a scheme capable of transferring the copy generation management via a digital I/F.

The down-converter (V-DC) 55*a* modifies the resolution of an uncompressed frame image stored on the video plane 11 by reducing the frame image in the vertical and horizontal directions. Yet, in the case where the target video stream is of SD material, the down-converter 55*a* does not apply any conversion but simply passes, as its output, the frame image stored on the video plane 11. The resolution of HDTV is 1920×1080, whereas the resolution of SDTV is 720×480. Thus, the resealing rate in the horizontal direction is 720 pixels/1920 pixels=0.375, whereas the resealing rate in the vertical direction is 480 pixels/1080 pixels≈0.444. In the process of down-conversion, an original frame image is reduced according to the resealing ratios and the pixel aspect ratio (the length-to-width ratio of each pixel).

The down-converter (PG-DC) 55*b* modifies the resolution of uncompressed graphics data stored on the presentation graphics plane 18 by reducing the graphics data in the vertical and horizontal directions. Yet, in the case where a target PG stream is of SD material, the down-converter 55*b* does not apply any conversion but simply passes, as its output, the frame image stored on the presentation graphics plane 18. The resealing ratios in the horizontal and vertical directions of HD material are calculated in the same manner as that used by the down-converter 55*a*.

The down-converter (IG-DC) 55*c* modifies the resolution of uncompressed graphics data stored on the interactive graphics plane 26. Yet, in the case where a target IG stream is of SD material, the down-converter 55*c* does not apply any conversion but simply passes, as its output, the frame image stored on the interactive graphics plane 26. The resealing ratios in the horizontal and vertical directions of HD material are calculated in the same manner as that used by the down-converter 55*a*.

The compositor 56 carries out signal composition during the field intervals of an SD video signal. More specifically, during the field intervals, the compositor 56 overlays the top or bottom field of the frame image stored on the video plane with a corresponding one of top and bottom fields of the uncompressed object stored on the presentation graphics plane 18 to make an interim composite image. In the interim composite image obtained as a result of the composition by the compositor 56, the text subtitles are overlaid on the video.

The compositor 57 carries out signal composition during (i) the field intervals and (ii) vertical blanking period of an SD video signal. More specifically, during (i) the field intervals, the compositor 57 overlays the top or bottom field of the uncompressed graphics object stored on the interactive graphics plane 26 with a corresponding one of top and bottom fields of the interim composite image (of the uncompressed picture data overlaid with the uncompressed graphics object stored on the presentation plane 18) output from the compositor 56. During (ii) the vertical blanking period, CGMS is embedded into vertical blanking intervals of the SD video signal. The CGMS is obtained by converting CCIforSD contained in CCIforBD. As a result of the processing by the compositor 57, the SD video signal carries a composite image of video+subtitles+a menu in the frame intervals, and also carries CGMS generated from CCIforHD in the vertical blanking intervals. In the future, transfer of the video signal may be carried out via a digital I/F such as HDMI. In such a case, the copy control information (CGMS) may be transferred using a different scheme than the analog transfer scheme. Still, what is required for adapting such a feature technology is to simply replace the signal composition process during (ii) the vertical blanking periods with a scheme capable of transferring the copy generation management via a digital I/F. The scope of the term “assign” used in this specification is relatively broad and covers “embedding” CGMS in the vertical blanking periods of a video signal, as described above.

<Details of HD and SD Video Signals>

Figure 14A:
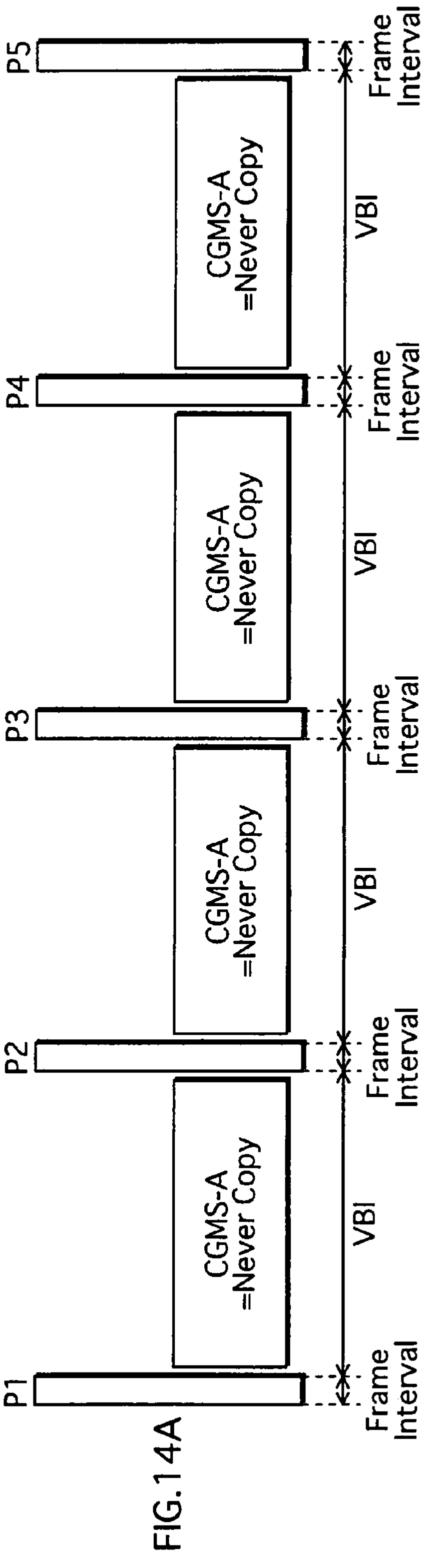
FIG. 14A illustrates an HD composite video signal output by a compositor 54.

FIG. 14A illustrates an HD composite video signal output from the compositor 54. As illustrated in the figure, the HD video signal is composed of alternating “frame intervals” and “vertical blanking intervals”. The HD video signal carries frame images P1, P2, P3, P4, . . . captured from the output controller 51 in the frame intervals. The CGMS embedded by the compositor 54 is carried in the vertical blanking intervals. Since the CGMS embedded in the vertical blanking intervals indicate “Copy Never”, even if the recording device 600 is connected to the playback device, the recording device 600 is not permitted to record this HD video signal to a portable recording medium such as a DVD.

Figure 14B:
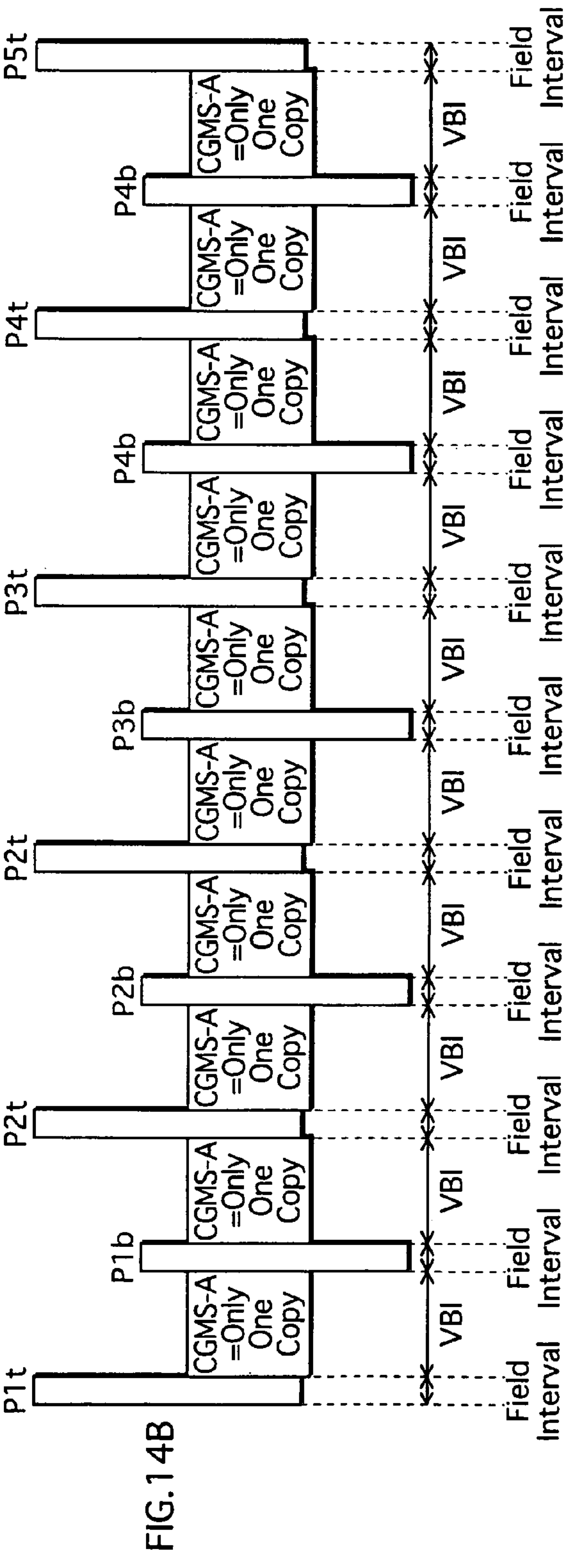
FIG. 14B illustrates an NTSC composite video signal output by a compositor 57.
Figure 15A:
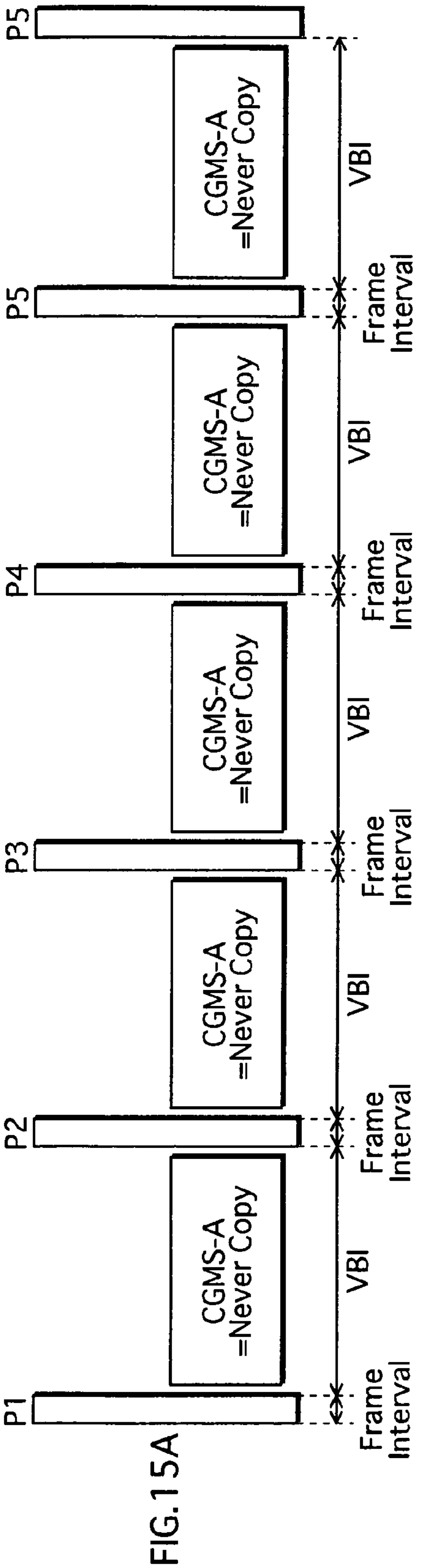
FIG. 15A illustrates an HD composite video signal output by the compositor 54.
Figure 15B:
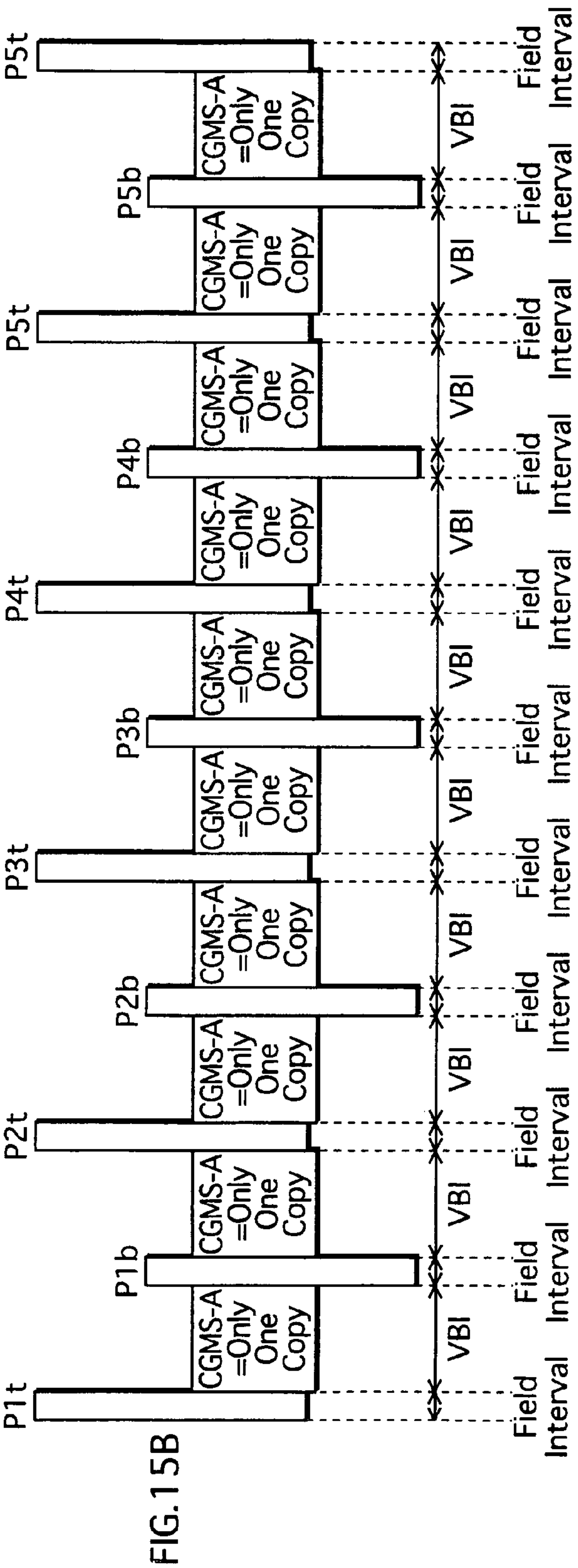
FIG. 15B illustrates a PAL composite signal output by the compositor 57.

FIG. 14B illustrates an SD composite video signal output in compliance with NTSC by the compositor 57. As illustrated in the figure, the SD video signal is composed of alternating “field intervals” and “vertical blanking intervals”. The field images P1*t*, P1*b*, P2*t*, P2*b*, P3*t*, P3*b*, P4*t*, P4*b* . . . captured from the video plane 11 are carried in the field intervals. The CGMS embedded by the compositor 57 is carried in the vertical blanking intervals. Since the CGMS embedded in the vertical blanking intervals indicate “Only One Copy”, the recording device 600 is only permitted to make a first generation copy of the video signal onto a portable recording medium such as a DVD. FIGS. 14A and 14B illustrate an example of NTSC signal, whereas FIGS. 15A and 15B illustrate an example of PAL signal.

The above description relates, but not limited, to an example of BD.CCI defining a relatively flexible restriction, with CCIforHD set to “Copy Never” and CCIforSD set to “Only Once Copy”. Alternatively, CCIforHD may be set to “Copy Never” and CCIforSD may be set to EPN-Copy Free.

Figure 16:
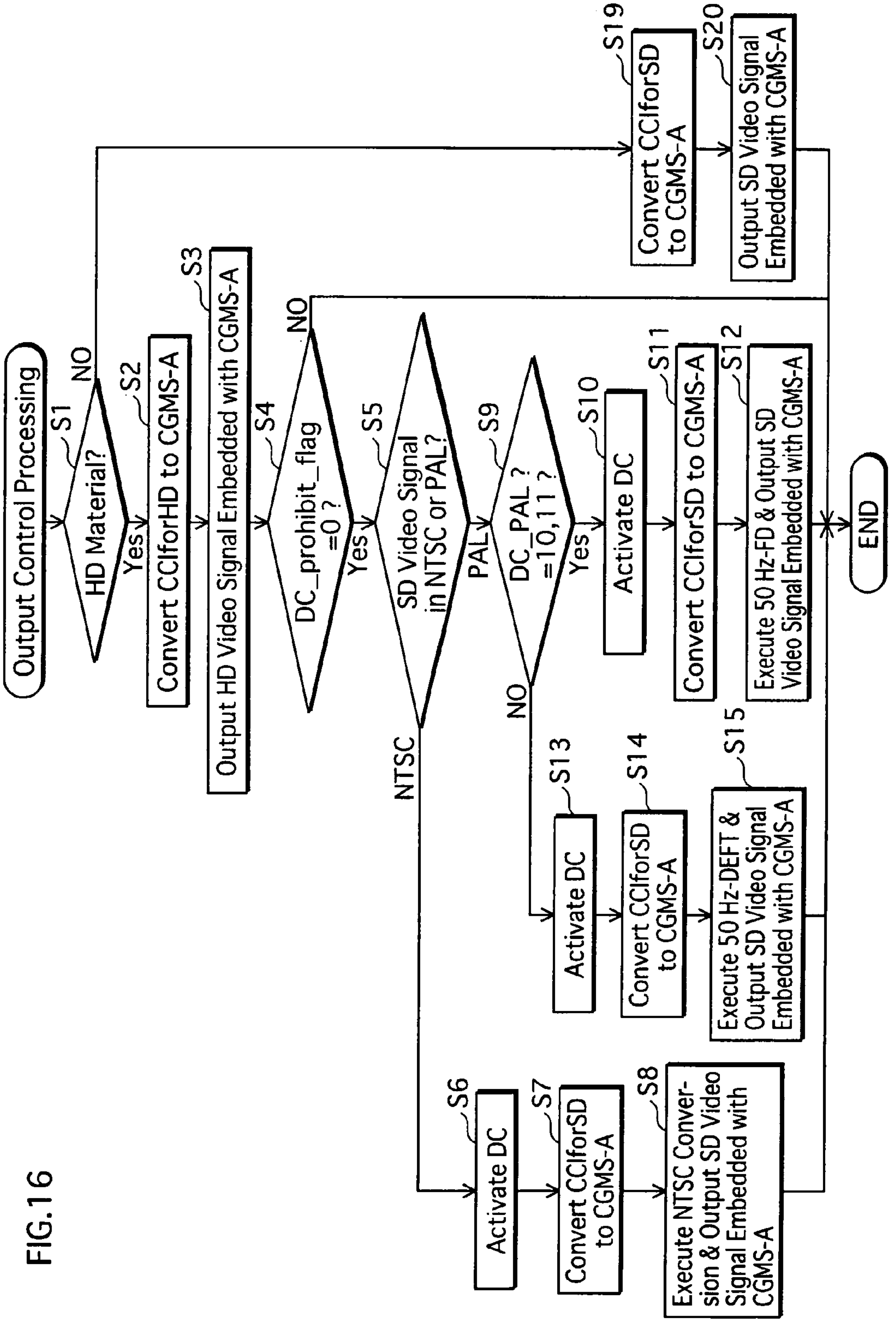
FIG. 16 is a flowchart of the processing steps performed by an output controller 51.

Now, a specific description is given of implementation of the output controller 51. The output controller 51 may be implemented as a system LSI circuit containing a CPU and a program defining processing steps illustrated in FIG. 16. FIG. 16 is a flowchart of the processing steps performed by the output controller 51. According to the flowchart, the output controller 51 judges, with reference to the Clip information, whether the resolution of the video stream contained in the AV clip is equal to 1920×1080 (Step S1). According to the judgment result, either the sequence of Steps S2-S15 or the sequence of Steps S16-20 is selectively performed.

Through the processing steps S2-S15, CCIforHD is converted into CGMS in a format suitable for the transmission path of video (step S2). In the case of analog output, for example, CCIforHD is converted into CGMS-A. The CGMS is embedded into the HD video signal and the resulting signal is output for playback (step S3). Then, the SD video signal is output for playback (steps S4-S15).

At the time of the SD video signal output (steps S4-S15), the output controller 51 refers to the DC_prohibit_flag included in the Clip information (step S4). If the DC_prohibit_flag is set to “1” (step S4: NO), the processing is terminated without performing any further steps. On the other hand, if the DC_prohibit_flag is set to “0” (step S4: YES), the step S5 is performed next.

In the step S5, it is judged whether the SD video signal is in the NTSC system or the PAL system. If the SD video signal is in the NTSC system, the down-converters 55*a*, 55*b*, and 55*c* are activated (step S6), and CCIforSD is converted into CGMS (step S7). While instructing the compositor 54 to embed the CGMS into the NTSC signal, the output controller 51 causes output of the NTSC signal to be started (step S8).

If it is judged in the step S5 that the SD video signal is in the PAL system, a step S9 is performed next. In the step S9, it is judged whether the DC_PAL in the Clip information is set to either of “10” and “11”. If it is set to either of “10” and “11” (step S9: YES), the output controller 51 activates the up-converters 52*a*, 52*b*, and 52*c* (step S10). At the same time, the output controller 51 converts CCIfroSD into CGMS (step S11). While instructing the compositor 57 to embed the resulting CGMS to the SD signal, the output controller 51 executes the 50 Hz-FD process. As a result, output of the SD video signal starts (step S12).

If, on the other hand, the DC_PAL in the Clip information is set to neither of “10” nor “11”, the output controller 51 activates the down-converters 55*a*, 55*b*, and 55*c* (step S13), and converts CCIforSD to CGMS (step S14). While instructing the compositor 57 to embed the resulting GGMS to the SD signal, the output controller 51 executes the 50 Hz-DEFT processes to start SD video signal output (step S15).

If the video stream is judged to be of SD material (step S1: NO), the output controller 51 causes CCIforSD to be converted into CGMS (step S19). The output controller 51 then causes the resulting CGMS to be embed into the SD video and the resulting SD signal to be output (step S20). In the case where the SD material is up-converted to be output as an HD video signal, the copy generation management information to be embedded in the video signal may be any of CCIforHD and CCIforSD.

As described above, according to the present embodiment, copy control may be set so as to prohibit recording of an HD video signal but to permit recording of an SD video signal. Since recording of an SD video signal is permitted, users are allowed to readily obtain a copy of a movie recorded at the SD level, simply by connecting the output terminal of the playback device to the input terminal of the recording device. As described above, since a copy of a certain quality level is readily available to users, simply by connecting the recording device 600 to the playback device. Thus, the users are discouraged to go through the troubles of obtaining rippers and make illegal copies. As a consequence, illegal copying by users is expected to be reduced.

Second Embodiment

The first embodiment of the present invention mainly relates to the case where the playback device is connected to the TV via analog connection. A second embodiment of the present invention relates to the case where the playback device is connected to an HDTV via digital connection.

The interface used for establishing digital connection is, for example, the one called HDMI (High Definition Multimedia Interface). According to the second embodiment, the signal output unit 28 is provided therein with a connector for HDMI connection.

Figure 17:
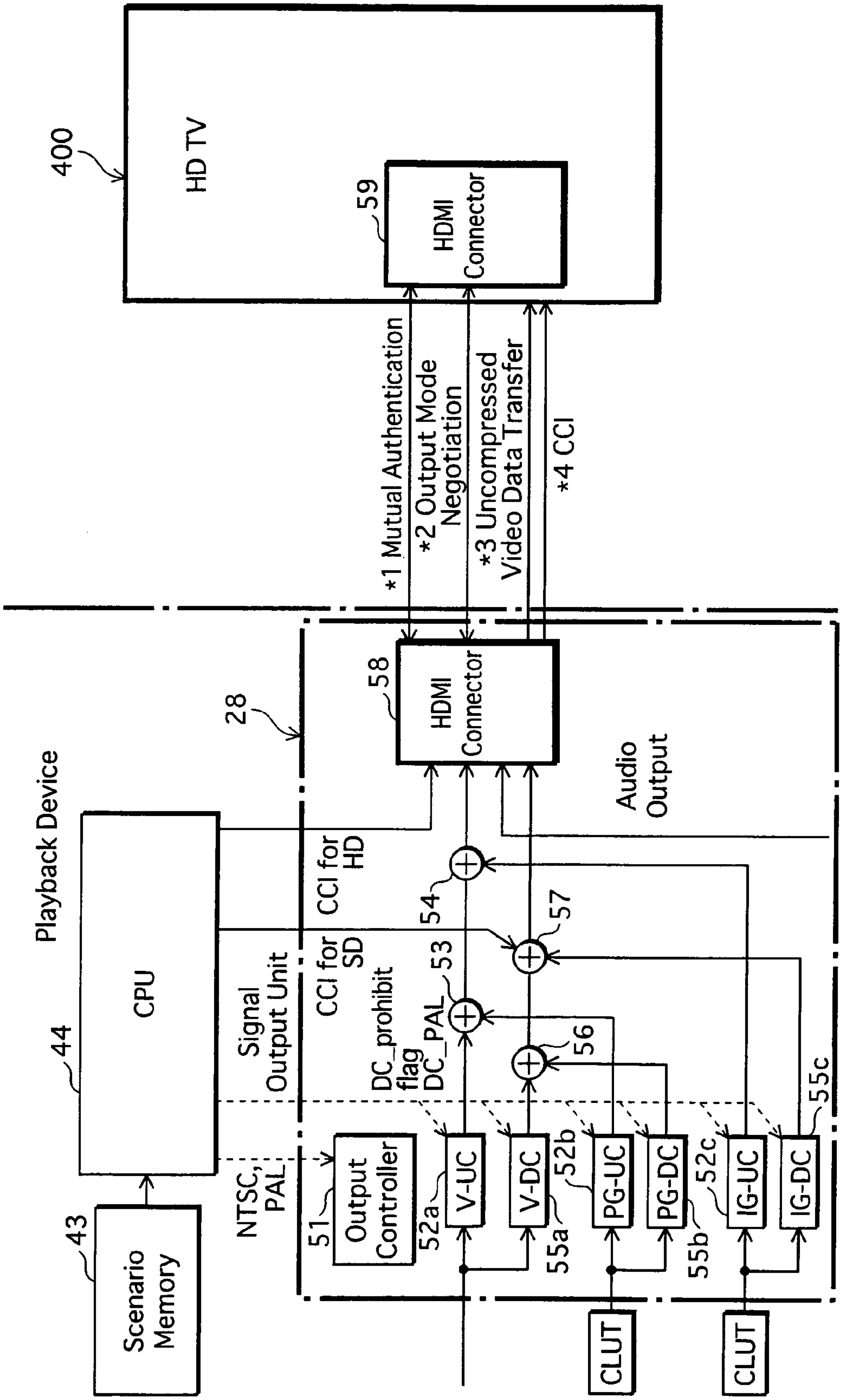
FIG. 17 illustrates the internal structure of the signal output unit 28 according to a second embodiment of the present invention.

FIG. 17 illustrates the internal structure of the signal output unit 28 according to the second embodiment. The reference numerals each associated with an asterisk (*1, *2, *3, and *4) represent processes performed by the signal output unit 28 for establishing digital connection. As illustrated in the figure, the signal output unit 28 includes an HDMI connector 58 for establishing digital connection with the HDTV. In addition, the HDTV is provided with a component (HDMI connector 59) similar to the HDMI connector 58. The HDMI connector 58 carries out mutual authentication (*1), negotiates the output mode (*2), and then transfers uncompressed video data (*3) and CCI (*4) in compliance with the copyright protection system called HDCP.

For transmitting CCI, the HDMI connector 58 passes either of the CCIforHD and CCIforSD depending on the type of material or the type of video signal carried on the transmission path. The type of video signal refers to either an HD or SD video signal. The type of material refers to either HD or SD video material. With the above arrangement, the playback device is allowed to output a video signal via a digital I/F together with appropriate CCI. In the case of transferring an uncompressed video stream, the playback device transfers the uncompressed video stream with an appropriate one of CCI for HD and CCI for SD. The scope of the term "assign" used in this specification is relatively broad and covers "output CGMS with uncompressed video stream".

The digital I/F is not limited to HDMI and may alternatively be any other interface including IEEE1394, USB, and IP network. In addition, the copyright protection system is not limited to HDCP and may alternatively be any other system including DTCP and Net DRM. In practice, video signals and CCI are transmitted in the mode suitable to the I/F and copyright protection system employed. Yet, it still holds, regardless of whether a digital I/F or an analog I/F is employed, that appropriate CCI (restrictions imposed on recording) is selectably assigned in accordance with the type of the video signal and/or the material.

Third Embodiment

Figure 18A:
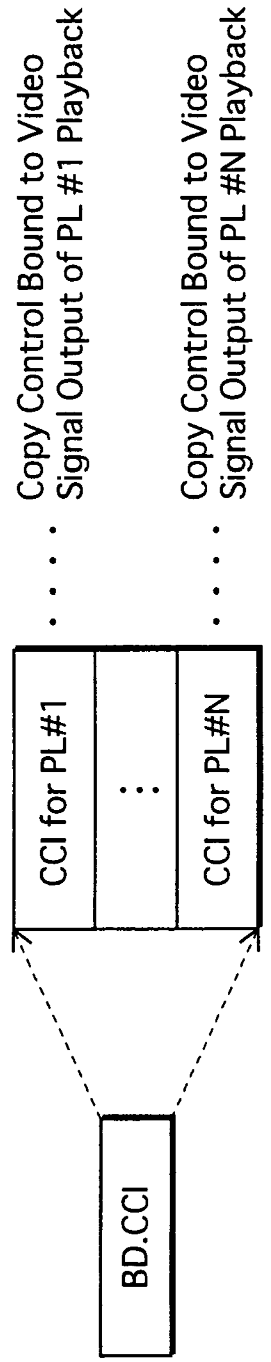
FIG. 18A illustrates the internal structure of BD.CCI according to a third embodiment of the present invention.

According to the first embodiment above, a single piece of CCI is assigned to the entire BD-ROM. A third embodiment of the present invention relates to an improvement in which different pieces of CCI are assigned to different pieces of PL information. FIG. 18A illustrates the internal structure of BD.CCI according to the third embodiment.

Figure 18B:
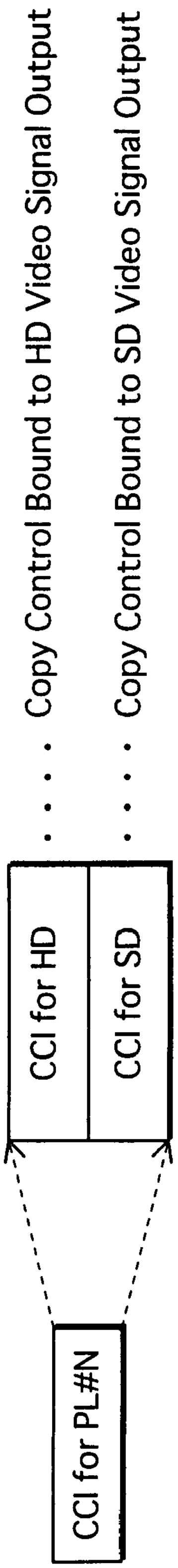
FIG. 18B illustrates the internal structure of CCIforPL.

As illustrated in the figure, the BD.CCI is composed of CCIforPL #1-#N. Each piece of CCIforPL defines copy control to be effected on SD and HD video signals output at the time of playback of a specific piece of PL information. FIG. 18B illustrates the internal structure of a piece of CCIforPL. As illustrated in the figure, CCIforPL is composed of CCIforHD and CCIforSD.

Figure 19:
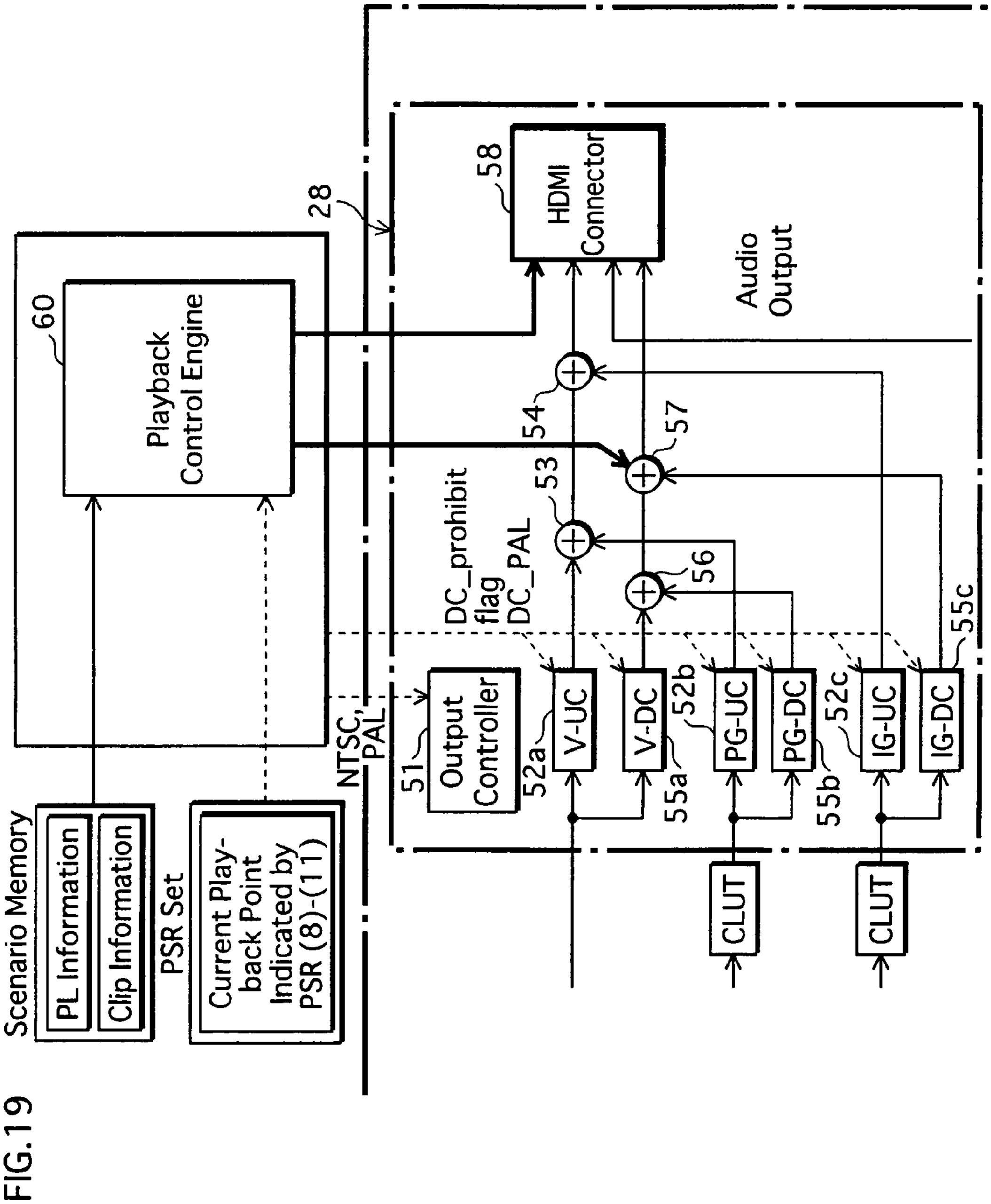
FIG. 19 illustrates the functional blocks of a playback device according to the third embodiment.

This concludes the description of the improvement on the recording medium according to the third embodiment. Now, the following describes an improvement made on the playback device. FIG. 19 illustrates the functional blocks of a playback device according to the third embodiment.

As illustrated in the figure, the playback device includes a functional block called a playback control engine 60 implemented by the CPU and a control program stored on the instruction ROM.

The playback control engine 60 executes playback control according to PL information stored on the scenario memory.

Figure 20:
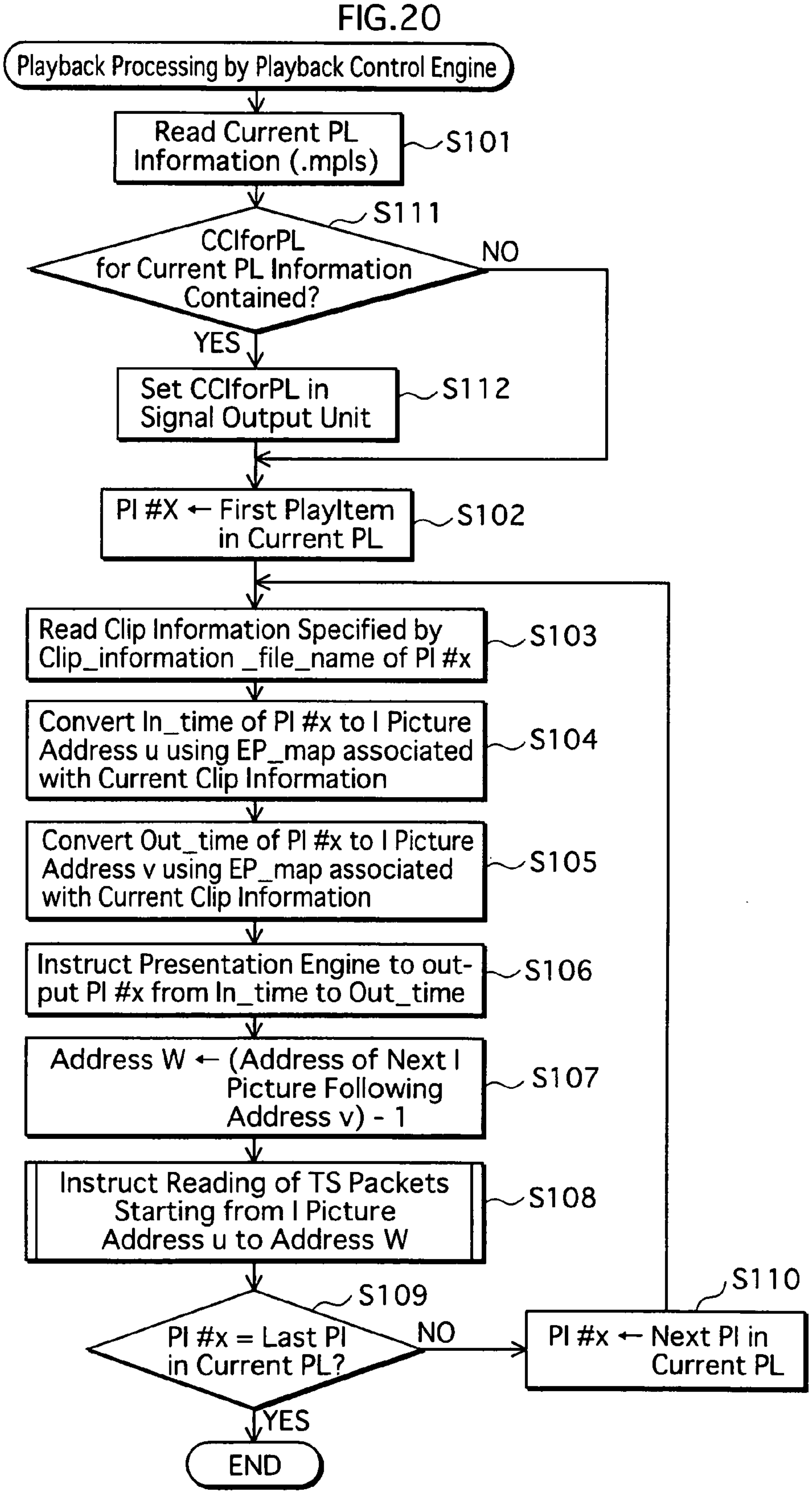
FIG. 20 illustrates a flowchart of playback processing performed by a playback control engine 60.

By using CCIforPL that is additionally provided in the third embodiment, the playback control engine 60 performs the processing steps illustrated in FIG. 20. The processing steps S101-S110 illustrated in FIG. 20 are processing steps common to other embodiments, whereas the steps S111 and S112 are unique to the third embodiment.

Hereinafter, the processing steps performed by the playback control engine 60 are specifically described with reference to the flowchart illustrated in FIG. 20.

FIG. 20 illustrates the flowchart of the playback processing performed by the playback control engine 60. The playback processing mainly includes a step of controlling the decoder (step S106) and a step of controlling the BD-ROM drive 1 or the local storage 18 (step S108). In the following description, the PlayItem currently subject to the playback processing is referred to as PlayItem #x. In the processing, first, the current PL information (.MPLS) is read (step S101) and the steps S102-S110 are performed. The steps S102-S110 create a loop in which the steps S103-S110 are repeated on each piece of PI information included in the current PL information, until the judgment in the step S109 results in "YES". The PlayItem subject to the processing steps in the loop is referred to as PlayItem #x (PI #x). When set to be the first PlayItem in the current PL, the PlayItem #x is initialized (step S102). The terminal condition of the loop described above is satisfied when the last PlayItem in the current PL is designated as the PlayItem #x (Step S109: YES). If there is another PlayItem following the PlayItem #x in the current PL (Step S109, NO), the next PlayItem is designated as a new PlayItem #x (Step S110). In the steps S103-S110 repeated in the loop, the following are performed. First, Clip information specified by the Clip_information_file_name included in the PlayItem #x is read to the scenario memory 25 (step S103). The value held in the In_time of the PlayItem #x is converted into the address u of an I picture, using the EP_map associated with the current Clip information (step S104). The value held in the Out_time of the PlayItem #x is converted into the address v of an I picture, using the EP_map associated with the current Clip information (step S105). The address of the first I picture subsequent to the address v is obtained, and the address immediately preceding the thus obtained address is designated as an address w (step S107). Finally, the playback control engine 60 instructs the BD-ROM drove 1 or the local storage 18 to read TS packets starting from the I picture address u and end at the address w (step S108).

In the loop composed of the steps S103-S110 described above, each time a new piece of PL information is read, it is judged whether the current PL contains CCIforPL (step S111). If CCIforPL is contained, the CCIforPL is set in the signal output unit 28, so that the CCIforPL will be used in the later processing (step S112). Through the above processing, each time a different piece of PL information is selected for playback, a different piece of CCI is set to impose a different level of restrictions on recording of the playback signal. Thus, copy control is carried out in more detail.

Fourth Embodiment

Figure 21A:
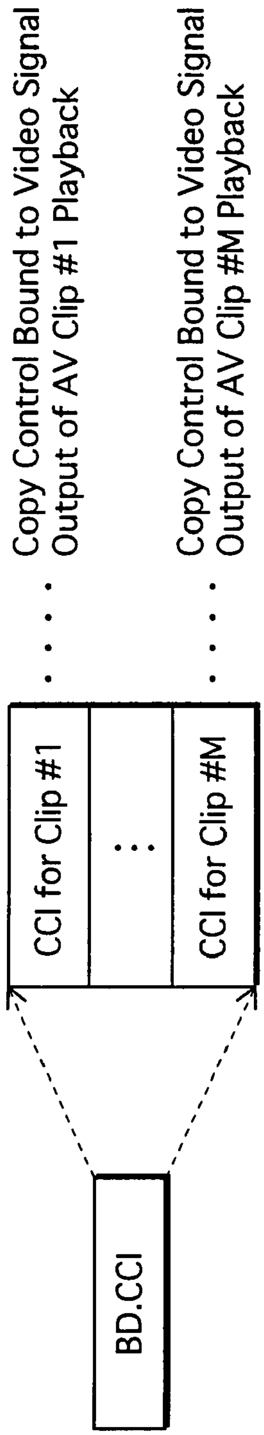
FIG. 21A illustrates the internal structure of BD.CCI according to a fourth embodiment of the present invention.

In the first embodiment, a single piece of CCI is assigned to the entire BD-ROM. A fourth embodiment of the present invention relates to an improvement in which different pieces of CCI are assigned to different AV clips. FIG. 21A illustrates the internal structure of BD.CCI according to the fourth embodiment.

Figure 21B:
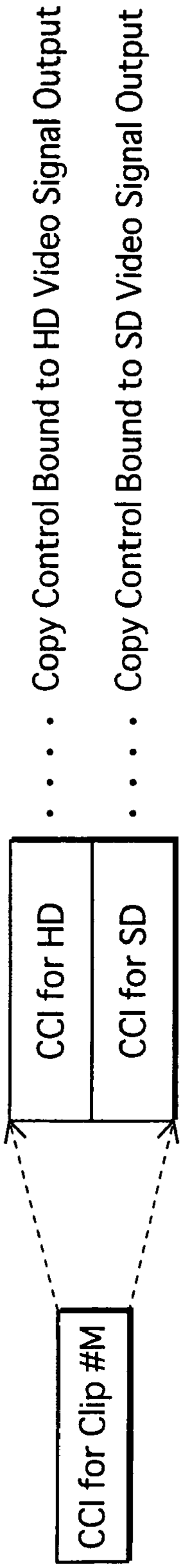
FIG. 21B illustrates the internal structure of CCIforClip.
Figure 22:
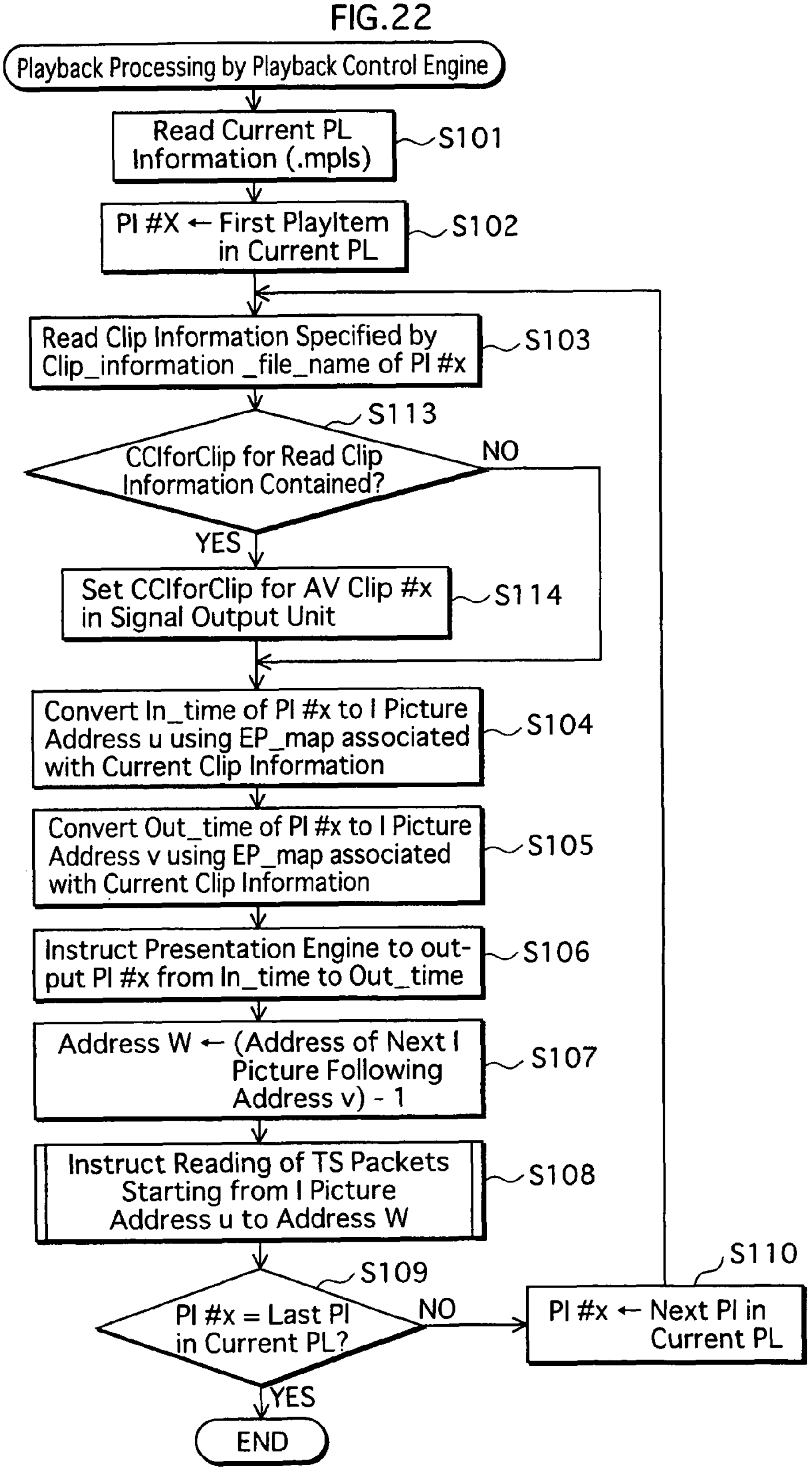
FIG. 22 illustrates a flowchart of processing performed by the playback control engine 60 according to the fourth embodiment.

As illustrated in the figure, the BD.CCI is composed of a plurality of pieces of CCIforClip #1-#M. Each piece of CCIforClip defines restrictions to be imposed on SD and HD video signals output at the time of playback of a specific AV clip. FIG. 21B illustrates the internal structure of a piece of CCIforClip. As illustrated in the figure, CCIforClip is composed of CCIforHD and CCIforSD. By using CCIforClip, the playback control engine 60 according to the fourth embodiment performs the processing steps illustrated in FIG. 22. The processing steps S101-S110 illustrated in FIG. 22 are processing steps common to the other embodiments, where as the steps S111 and S112 are unique to the fourth embodiment. According to the flowchart, each time a new AV clip is selected for playback, it is judged whether the AV clip contains CCIforClip (step S113). If CCIforClip is contained, the CCIforClip is set in the signal output unit 28, so that the CCIforClip will be used in the later processing (step S114). Through the above processing, each time a different AV clip is selected for playback, a different piece of CCI is set to impose a different level of restrictions on recording of the playback signal. Thus, copy control is carried out in more detail.

Fifth Embodiment

Figure 23A:
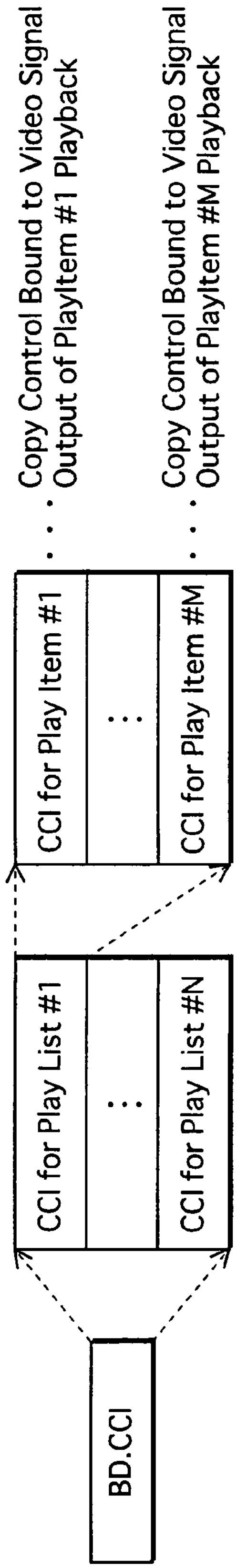
FIG. 23A illustrates the internal structure of BD.CCI according to a fifth embodiment of the present invention.

In the first embodiment, a single piece of CCI is assigned to the entire BD-ROM. A fifth embodiment of the present invention relates to an improvement in which different pieces of CCI are assigned to different pieces of PlayItem information. FIG. 23A illustrates the internal structure of BD.CCI according to the fifth embodiment.

Figure 23B:
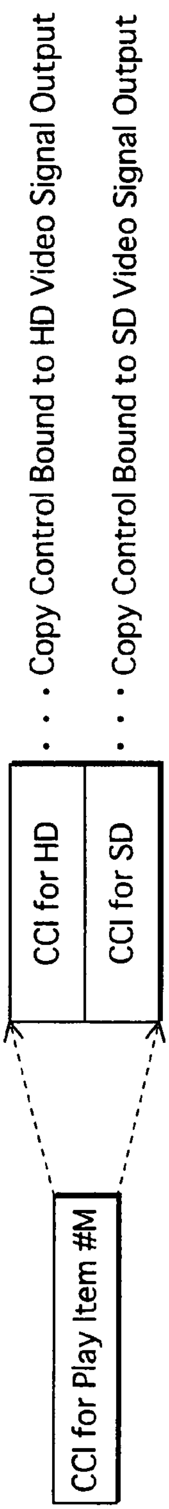
FIG. 23B illustrates the internal structure of CCIforPlayItem.
Figure 24:
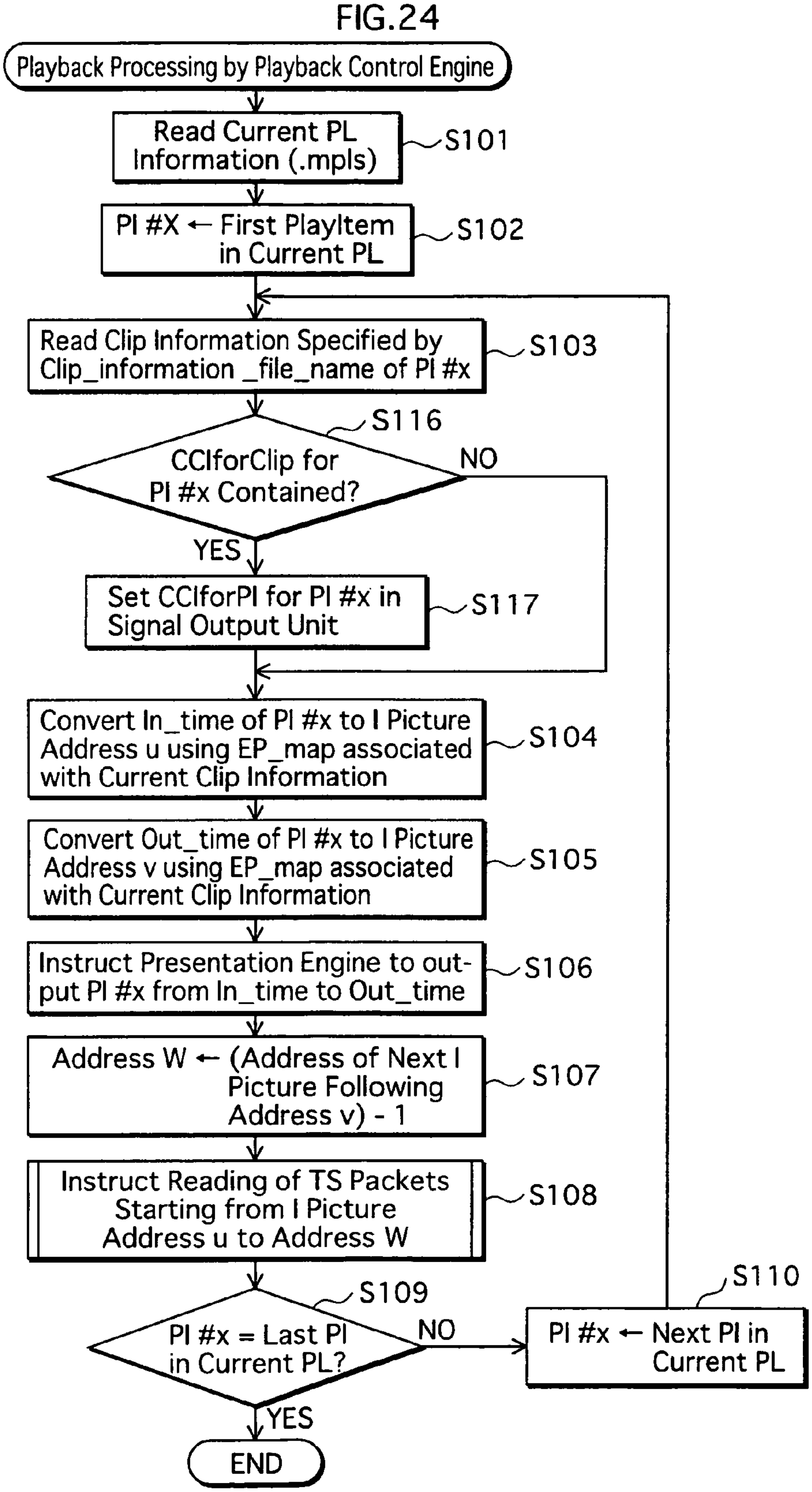
FIG. 24 illustrates a flowchart of processing performed by the playback control engine 60 according to the fifth embodiment.

As illustrated in the figure, the BD.CCI is composed of a plurality of pieces of CCIforPlayItem #1-#M provided each of which is provided for a different one of a plurality pieces of PL information. Each piece of CCIforPlayItem information defines restrictions to be imposed on SD and HD video signals output at the time of playback of a specific piece of PlayItem information. FIG. 23B illustrates the internal structure of a piece of CCIforPlayItem. As illustrated in the figure, CCIforPlayItem is composed of CCIforHD and CCIforSD. By using CCIforPlayItem, the playback control engine 60 according to the fifth embodiment performs the processing steps illustrated in FIG. 24. The processing steps S101-S110 illustrated in FIG. 24 are processing steps common to the other embodiments, whereas the steps S116 and S117 are unique to the fifth embodiment. According to the flowchart, each time a new piece of PlayItem information is selected for playback, it is judged whether the PlayItem information contains CCIforPlayItem (step S116). If CCIforPlayItem is contained, the CCIforPlayItem is set in the signal output unit 28, so that the CCIforPlayItem will be used in the later processing (step S117). Through the above processing, each time a different piece of PlayItem information is selected for playback, different piece of CCI is set to impose a different level of restrictions on recording of the playback signal. Thus, copy control is carried out in more detail.

Sixth Embodiment

According to the first embodiment, CCI is described to be contained in the BD.CCI. According to an improvement made in a sixth embodiment of the present invention, CCIforBD is not stored on the BD-ROM. Rather, CCIforBD is supplied to the signal output unit 28 from a secure memory card 61 upon connection of the memory card 61 to the playback device.

Figure 25:
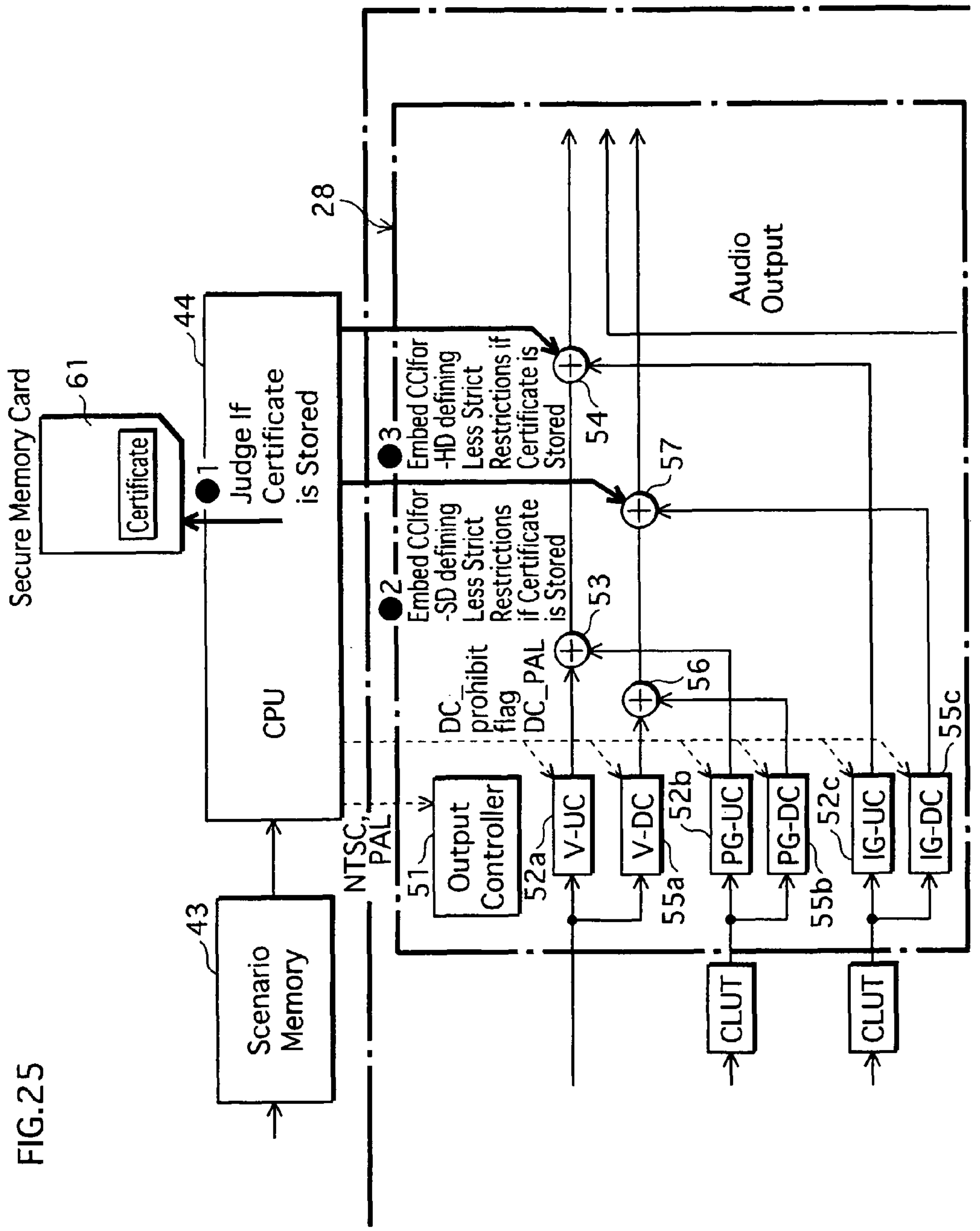
FIG. 25 illustrates the internal structure of a playback device according to a sixth embodiment of the present invention.

FIG. 25 illustrates a playback device according to the sixth embodiment. The playback device of the sixth embodiment is provided with a connector. The memory card 61 is connected to the playback device via the connector.

The memory card 61 is for example a non-contact semiconductor memory card and includes a logic circuit and a connector. When connected to the playback device via the connector, the memory card 61 carries out challenge-response mutual authentication with the playback device to mutually establish the validity of their identities. After successfully establishing the mutual authentication, the memory card 61 permits the playback device to access the nonvolatile memory. With this arrangement, access by an unauthorized device is prevented. In addition, owing to the large capacity of the nonvolatile memory amounting 64M bytes to 1 G bytes, the memory card 61 is suitable for storing copyrighted material.

A user takes the memory card 61 to a Kiosk terminal set on a street, and connects the memory card 61 to the Kiosk terminal to acquire, on the memory card 61, a certificate issued by a film-distributing company. This certificate proves the user's right to loosen the copy control. In the case where the local storage 32 has a secure area, it is applicable that such a certificate is acquired via the Internet using secure communications protocols and store the certificate in the secure area of the local storage 32.

As described above, the memory card 61 is connectable to the playback device via the connector. When the memory card 61 is connected to the playback device, the CPU 44 according to the sixth embodiment makes an access to the nonvolatile memory of the memory card 61 to judge if a certificate issued by a film-distributing company is stored therein. If the certificate is stored, the CPU 44 passes either of CCIforSD and CCIforHD both of which define a relatively flexible restriction. In the figure, reference numerals each associated with a black dot (●1, ●2, and ●3) schematically represent the following processes performed upon establishing connection with the memory card 61. That is, the judgment as to whether the certificate is stored or not (●1) and passing of CCI (●2 or ●3). With this mechanism, movie distributing companies are offered the option of additionally selling the right for recording their movies. If the certificate is not stored on the memory card 61 or if the certificate is not an authentic one, the playback device passes, to the signal output unit 28, CCIforSD or CCIforHD set to indicate "Never Copy". This arrangement prevents unauthorized recording of copyrighted material by a malicious user.

As described above, the sixth embodiment offers movie distributing companies options of launching business of selling, apart from selling their movies, certificates proving the right to loosen copy control imposed on the movies. This will make a significant contribution to the movie industry.

Seventh Embodiment

According to a feature of the third embodiment, two different types of CCI, which are CCIforHD and CCIforSD, are provided. According to a seventh embodiment of the present invention, CCIforHD and CCIforSD are each additionally provided with attributes.

Figure 26:
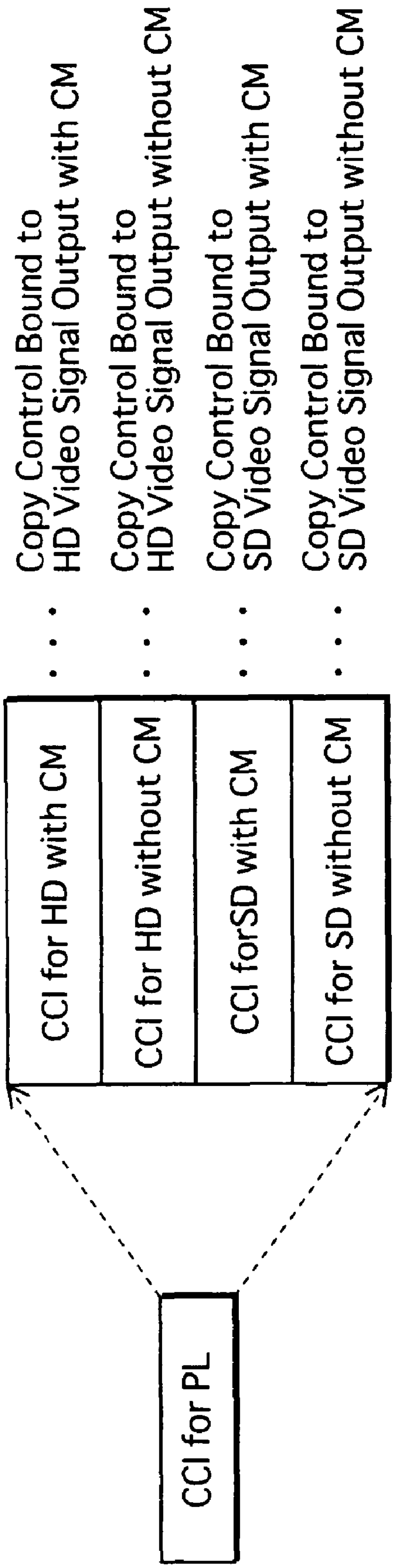
FIG. 26 illustrates the internal structure of CCIforPL according to a seventh embodiment of the present invention.

FIG. 26 illustrates the internal structure of CCIforPL according to the seventh embodiment. In the figure, the "CCIforHD without CM" and the "CCIforSD without CM" are identical in substance to the CCIforHD and CCIforSD of the third embodiment, respectively. The "CCIforHD with CM" and "CCIforSD with CM" are the CCI having new attributes.

Because of the new attributers, the copy control information requires supplemental information to be added to the video signal output. This embodiment is described using an example in which the supplemental information is advertisement or one ore more "Commercial Messages (CMs)".

The "CCIforHD with CM" defines restrictions to be imposed on recording of an HD video signal output with addition of a CM.

The "CCIfroHD without CM" defines restrictions to be imposed on recording of an HD video signal output without addition of a CM.

The "CCIforSD with CM" defines restrictions to be imposed on recording of an SD video signal output with addition of a CM.

The "CCIfroSD without CM" defines restrictions to be imposed on recording of an SD video signal output without addition of a CM.

The CM used herein refers to any form of information for advertising goods, events, organizations, and groups to the public. In this embodiment, the CM is a preview of an upcoming movie.

Figure 27:
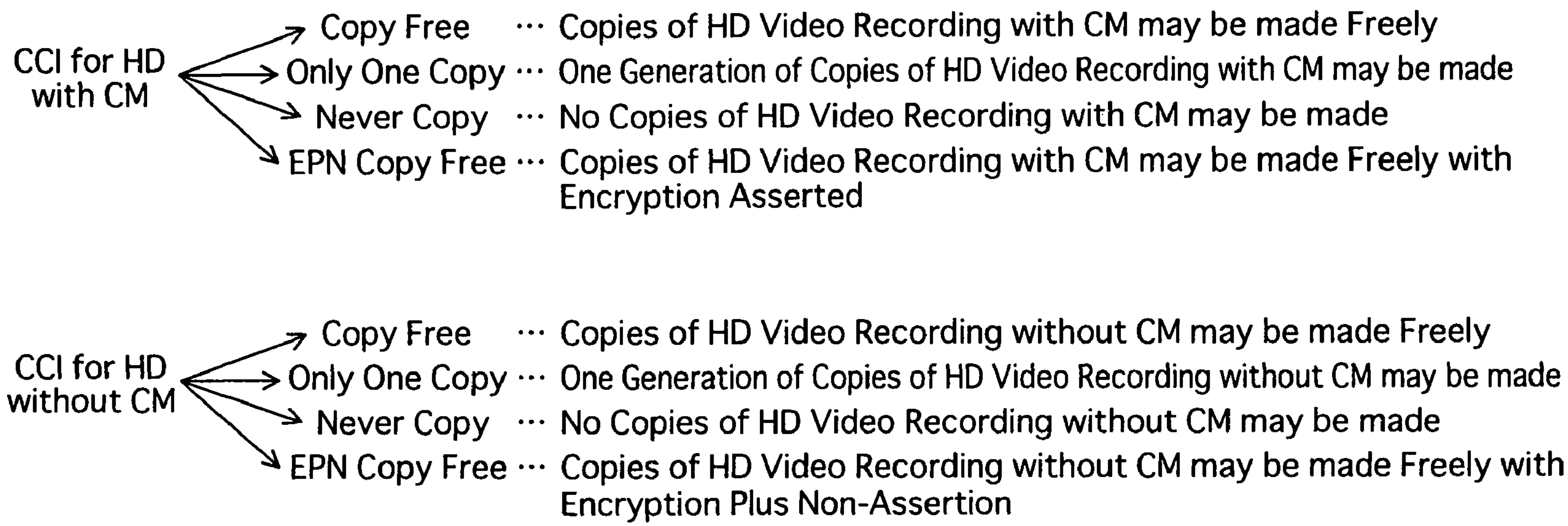
FIG. 27 illustrates an example setting of "CCIforHD with CM" and "CCIforHD without CM"

FIG. 27 illustrates an example setting of "CCIforHD with CM" and "CCIforHD without CM". FIG. 28 illustrates an example setting of "CCIforSD with CM" and "CCIforSD without CM". Any of "CCIforHD with CM", "CCIforHD without CM", "CCIforSD with CM", and "CCIforSD without CM" can be set to indicate Copy Free, Only One Copy, Never Copy, or EPN Copy Free.

With the additionally provided attributes of "with CM" and "without CM", an advantageous effect is achieved that the CCIforHD and CCIforSD are able to define different restrictions on recording of a video signal depending on whether the video signal is output with or without addition of CM.

Figure 29:
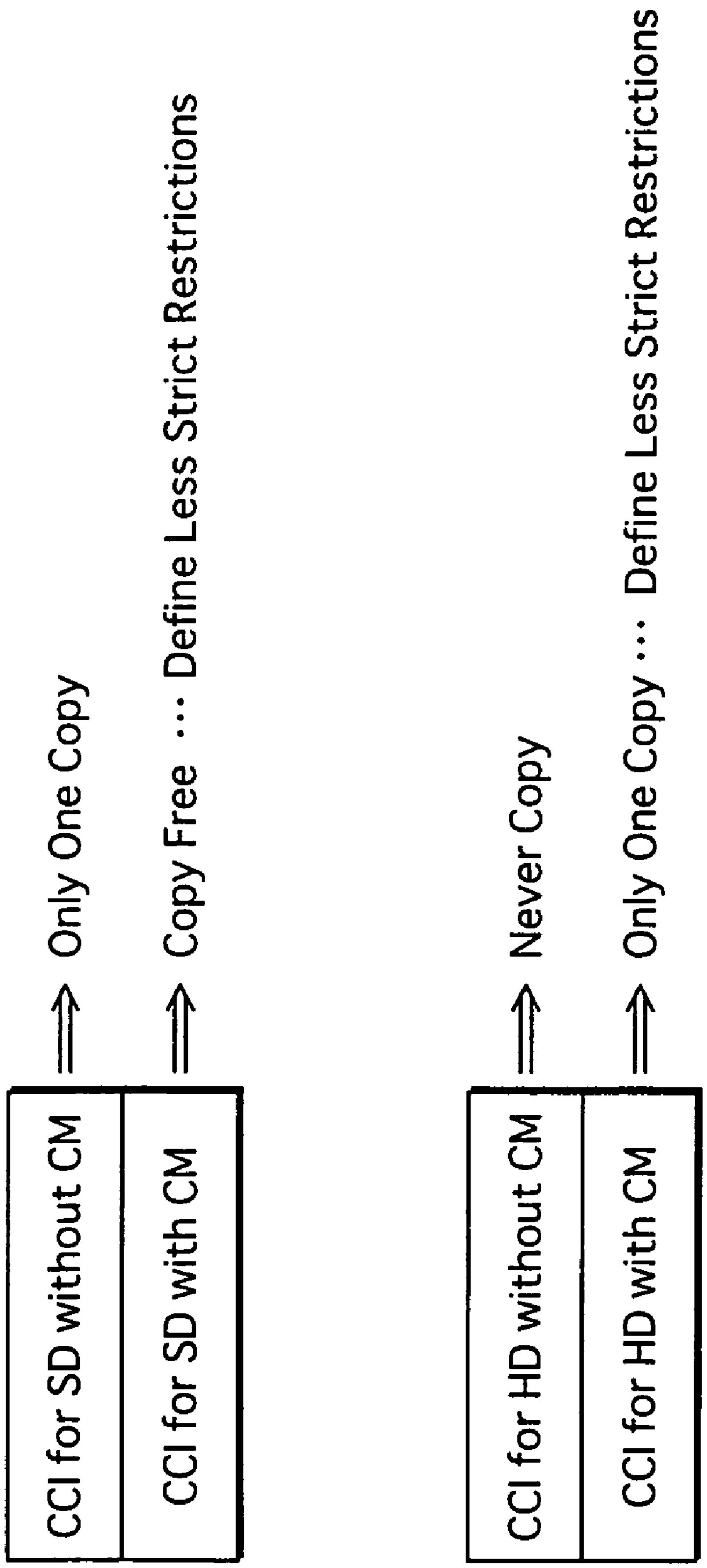
FIG. 29 illustrates copy restrictions defined with the use of additionally provided attributes.

FIG. 29 illustrates the copy restrictions defined with the use of the additionally provided attributes.

According to the first embodiment, CCIforHD is set to the Never Copy status and CCIforSD is set to the Only One Copy status. According to this embodiment, CCIforHD having the "with CM" attribute is set to the Only One Copy status, and CCIforSD having the "with CM" attribute is set to the Copy Free status. The provision of the attribute offers users options of obtaining the right for loosening the restrictions imposed on recording of a video signal, in return for accepting CM to be added to the video playback.

Figure 30:
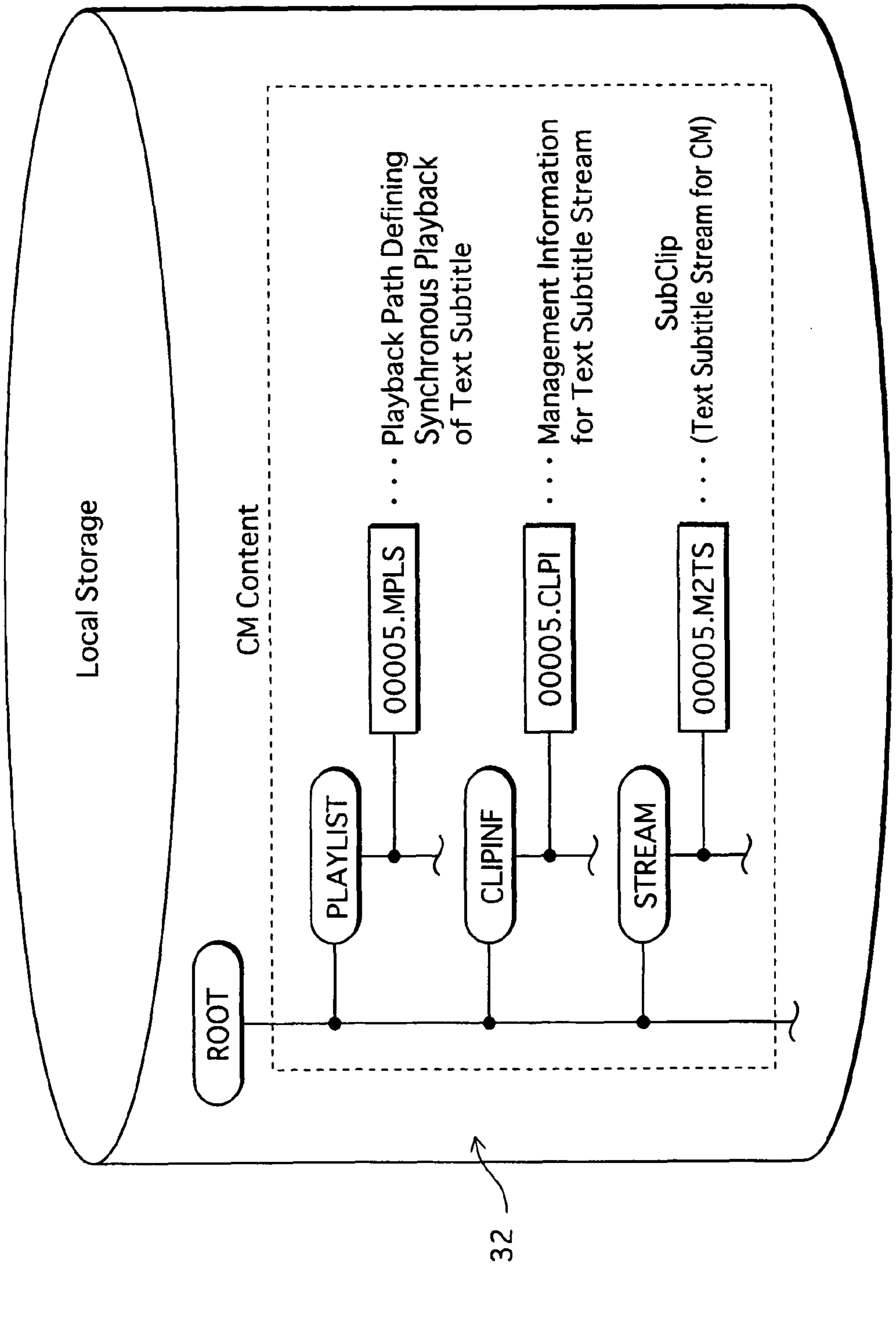
FIG. 30 illustrates an example of CM content stored on a local storage 32.

Now, a discussion is given about how subtitles are presented on movie playback. CM content to be attached to movie content is provided using a SubClip, Clip information, PL information stored on the local storage 32. FIG. 30 illustrates an example of CM content stored on the local storage 32. As illustrated in the figure, the CM content is composed of a file called "00005.M2TS" containing a SubClip, a file called "00005.CLPI" containing Clip information associated with the SubClip, and a file called "00005.MPLS" containing PL information defining a playback path for synchronous playback of the SubClip stored on the local storage 32 with the AV clip stored on the BD-ROM. CCIforPL composed of CCIforHD with/without CM and CCIforSD with/without CM is associated with the PL information stored on the local storage 32.

Figure 31A:
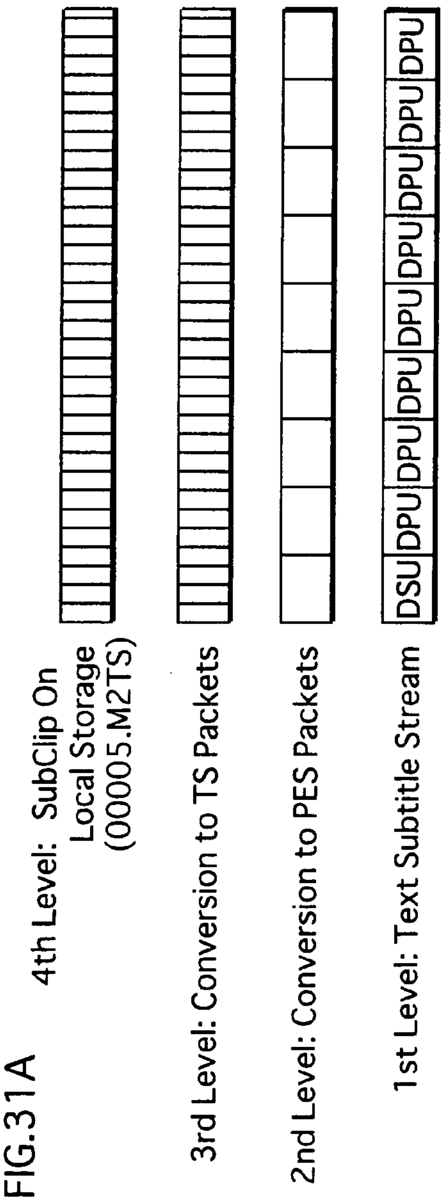
FIG. 31A illustrates the structure of a SubClip constituting the CM content.
Figure 31B:
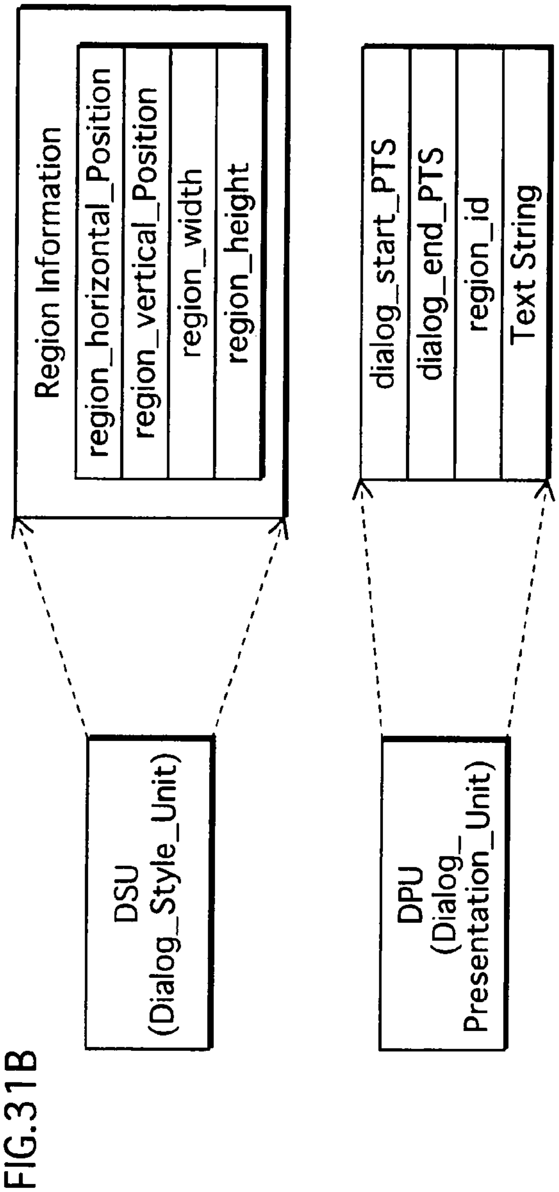
FIG. 31B illustrates the internal structure of a DSU and a DPU included in a text subtitle substream.

FIG. 31A illustrates the structure of the SubClip that constitutes the CM content. As illustrated in the figure, the SubClip is generated in the following way. First, the text subtitle stream illustrated on the first level is converted into PES packets (illustrated on the second level), and the PES packets are further converted into TS packets (illustrated on the third level). FIG. 31B illustrates the internal structure of the text subtitle substream. The text subtitle stream is composed of a single "DSU (Dialog_Style_Unit)" field at the top of the stream and a plurality of "DPU (Dialog_Presentation_Unit)" fields. The DSU includes region information specifying a display region in which text subtitles are presented. More specifically, the region information includes "region_horizontal_position" and "region_vertical_position" specifying the horizontal and vertical positions of the display region, respectively. The region information also includes "region_width" and "region_height" specifying the width and height of the display region, respectively.

Each DPU includes "dialog_start_PTS" indicating the presentation start time of the subtitles, "dialog_end_PTS" indicating the presentation end time of the subtitles, "region_id" uniquely specifying the display region in which the text subtitles are presented, and "text_string" to be presented as subtitles.

Figure 32:
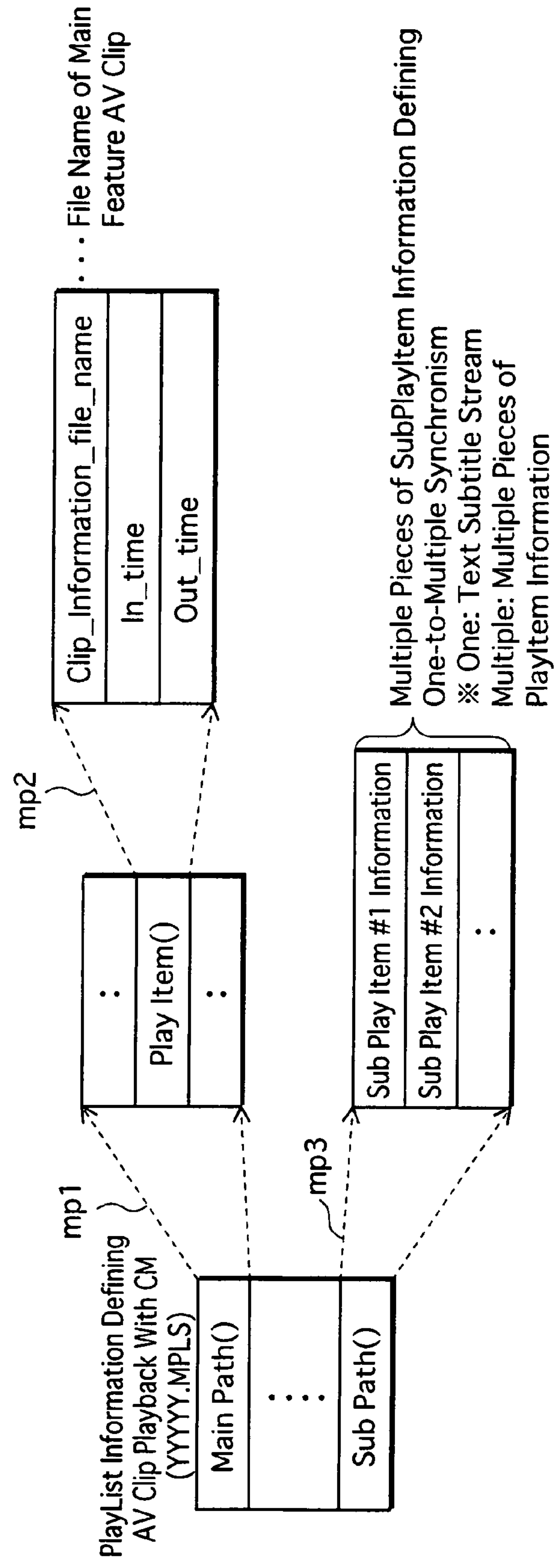
FIG. 32 illustrates the internal structure of PL information constituting the CM content.

FIG. 32 illustrates the internal structure of PL information constituting the CM content. Similarly to the PL information described above in the first embodiment, PL information constituting CM content also includes MainPath( ) and SubPath( ). Leader lines mp1 in the figure indicate that the structure of the MainPath information is illustrated in greater detail. As indicated by the leader lines, the MainPath information includes one or more pieces of PlayItem information. Leader lines mp2 in the figure illustrate that the structure of PlayItem information is illustrated in greater detail. As indicated by the leader lines, PlayItem information is composed "Clip_information_file_name", "In_time", and "Out_time". Leader lines mp3 indicate that the structure of SubPath information is illustrated in greater detail. As indicated by the leader lines, the SubPath information includes one of more pieces of SubPlayItem information.

As described above, the PL information according to this embodiment is identical in internal structure to the PL information stored on the BD-ROM but differs in the following point. Unlike the PL information stored on the BD-ROM, the PL information of the seventh embodiment is capable of designating any Clip information regardless of whether the Clip information is stored on the BD-ROM or the local storage 32. The PL information stored on the local storage 32 can designate Clip information stored on the BD-ROM without specifying a full path. It is because the playback device recognizes all the directories and files on the local storage 32 and on the BD-ROM as a single virtual file system. Thus, Clip_information_file_name included in the PlayItem information or in the SubPlayItem information can specify any of the AV clips stored on the local storage 32 and BD-ROM using a five-digit number of a file body containing the Clip information. The playback device reads the content stored on the local storage 32 and dynamically synchronizes with the content stored on the BD-ROM, so that the BD-ROM content is played back in richer variations.

In addition, the PL information of the seventh embodiment also differs from the PL information of the first embodiment in that the SubPath information included therein is capable of one-to-multiple synchronization. Specifically, "one" in the "one-to-multiple" refers to the text substream (SubClip) stored on the local storage 32, whereas "multiple" refers to a plurality of pieces of PlayItem information included in the PL information. For example, the PL information illustrated in FIG. 33 includes SubPath information defining that a single text subtitle stream is repeatedly played back in synchronism with each of a plurality of pieces PlayItem information.

Figure 33:
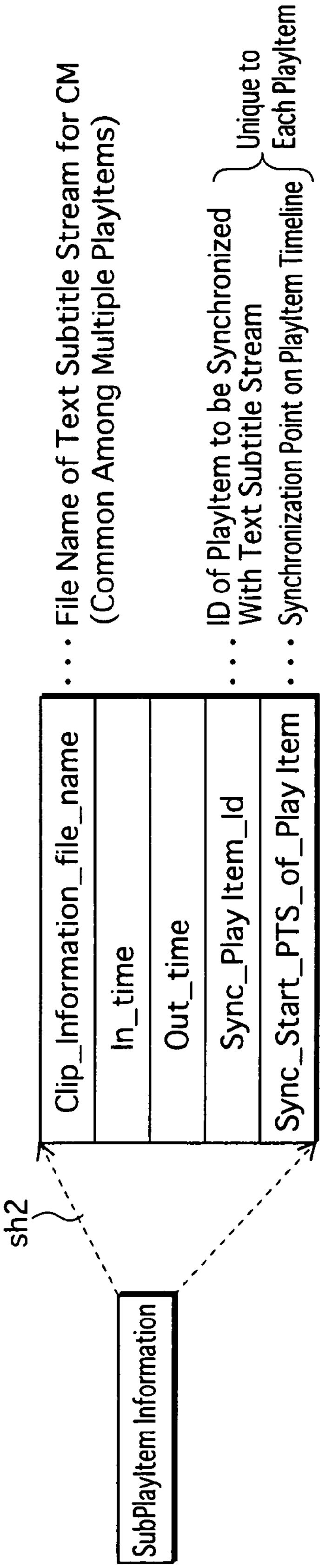
FIG. 33 illustrates the internal structure of PlayItem information illustrated in FIG. 32.

FIG. 33 illustrates the internal structure of PlayItem information illustrated in FIG. 32. Leader lines sh2 in the figure indicate that the structure of SubPlayItem information is illustrated in greater detail. As indicated by the leader lines, the SubPlayItem information is composed of the following fields: "Clip_information_file_name", "In_time", "Out_time", "sync_PlayItem_id", and "sync_start_PTS_of_PlayItem". Among the above fields, the "Clip_information_file_name" field is set to specify a file name commonly among a plurality of pieces of PlayItem information. The "sync_PlayItem_id" and "sync_start_PTS_of_PlayItem" fields, on the other hand, are set to values unique to a respective piece of PlayItem information.

Figure 34:
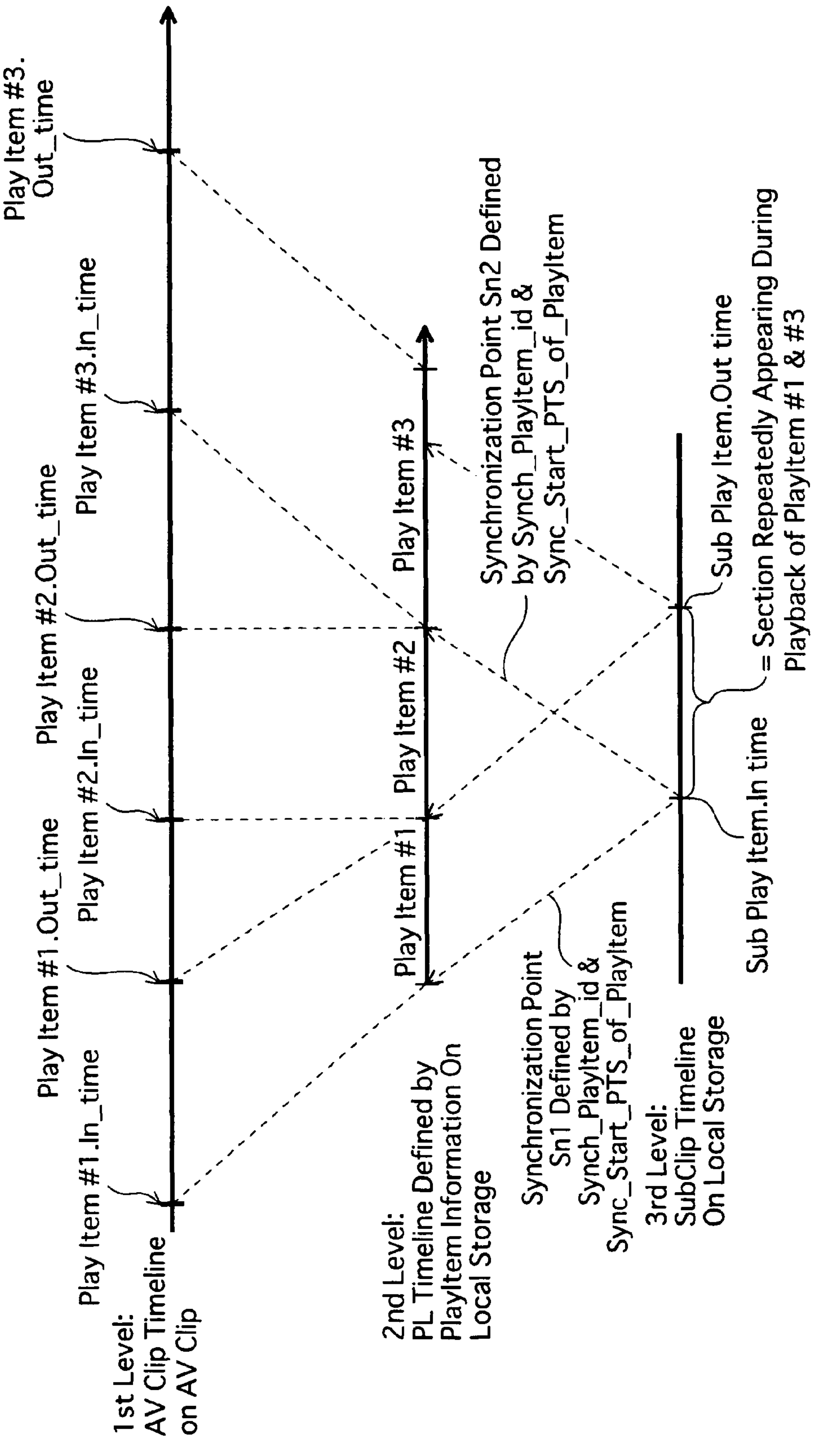
FIG. 34 illustrates the timeline of PlayList playback defined by the PL information stored on the local storage 32.

FIG. 34 illustrates the timeline of PlayList playback defined by the PL information stored on the local storage 32. In the figure, the first level illustrates the playback timeline of the AV clip stored on the BD-ROM. The second level illustrates the timeline of PlayList playback defined by the PL information stored on the local storage 32. As illustrated on the first and second levels of the figure, the PL information stored on the local storage 32 can be used to define a different timeline for playback of the AV clip stored on the BD-ROM. The third level illustrates the timeline defined for playback of SubClip stored on the local storage 32. The SubPlayItem.In_time and the SubPlayItem.Out_time define the start and end points of the playback section of the SubClip. That is, the playback section is defined also on the SubClip timeline. Arrows Sn1 and Sn2 indicate the synchronous playback defined by the Sync_PlayItem_id and the sync_start_PTS_of_PlayItem in each SubPlayItem (SubPlayItem #1, #2). More specifically, the arrow sn1 indicates the designation by SubPlayItem #1.

Since the Sync_PlayItem_id in the SubPlayItem #1 designates PlayItem #1, the SubClip stored on the local storage 32 is played back in synchronism with the PlayItem #1.

The arrow Sn2 indicates the synchronous playback defined by Sync_PlayItem_id and sync_start_PTS_of_PlayItem.

Since the Sync_PlayItem_id in the SubPlayItem #2 designates PlayItem #3, the SubClip stored on the local storage 32 will be played back in synchronism with the PlayItem #1. Because of the above setting of SubPlayItem #1 and #2, the text subtitle stream stored on the local storage 32 is played back synchronously with PlayItem #1 as well as with PlayItem #2.

As above, with the use of a plurality of pieces of SubPlayItem information, SubPath information can define playback control that a single SubClip is played back repeatedly in synchronism with each of multiple pieces of PlayItem information. With such repetitive presentation of CM content to users, the CM content is likely to achieve high advertising effect.

Figure 35A:
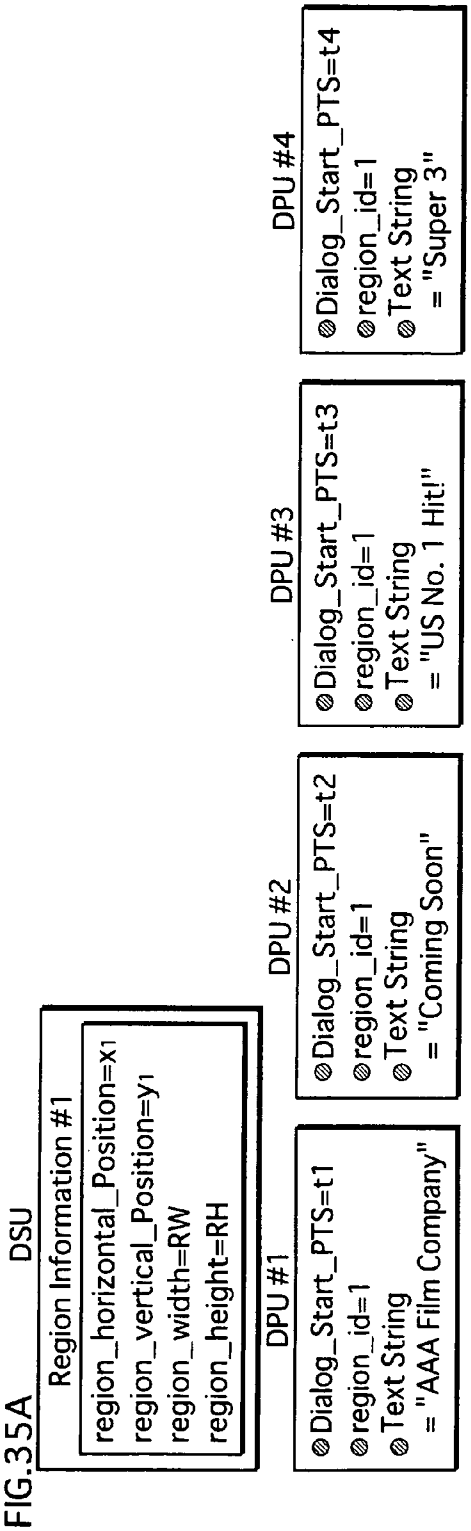
FIG. 35A illustrates an example setting of the DSU and the DPU.

FIG. 35A illustrates an example setting of the DSU and the DPU. In this example, the region information #1 included in the DSU is set to indicate a region of the presentation graphics plane 18, with the coordinate (x1, y1), the width RW, and the height RH.

The four DPUs illustrated in FIG. 35A all specify the region information #1 defined in the DSU. Yet, each DPU designates with its dialog_start_PTS a different one of t1, t2, and t3. The text strings defined by the respective DPUs read as follows, "AAA Film Company", "Coming Soon", "US No. 1 Hit", and "Super 3". As a result of the above setting, the subtitles set by the DPUs are sequentially presented in synchronism with video playback.

Figure 35B:
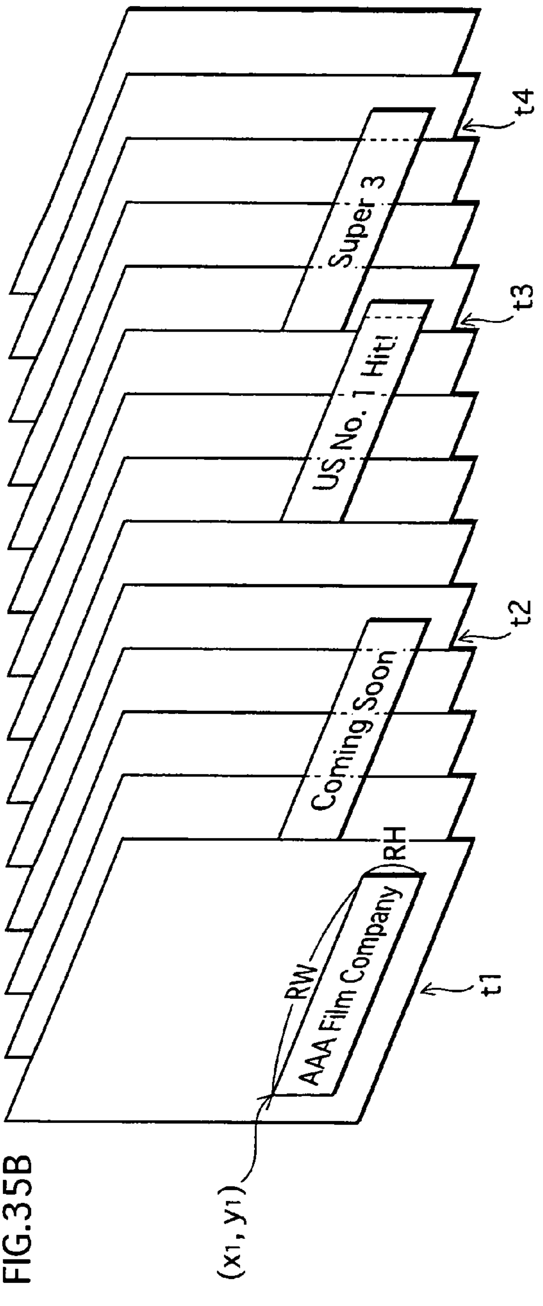
FIG. 35B illustrates the video playback presented by sequentially displaying text strings at a specified presentation start time and at a specified position on a presentation graphics plane 18.

The PL information stored on the local storage 32 defines synchronization of the text subtitle stream (SubClip) containing the DPUs illustrated in FIG. 35A, with the AV clip stored on the BD-ROM. Consequently, the text strings are sequentially presented at the specified presentation start time and at the specified position on the presentation graphics plane 18. As a result, the composite images as illustrated in FIG. 35B are sequentially played back.

Since such PL information as above is stored on the local storage 32, a display effect is archived in which text subtitles are sequentially changed in synchronism with playback of the AV clip stored on the BD-ROM. The subtitles are, for example, commercial messages of the film-distributing company. By displaying such subtitles, playback of the PL information always involves display of CM. Alternatively to such a movie preview as described above, CM content presented according to this embodiment may be a so-called logo CM. A logo CM refers to a dynamically presented logo image of a film-distributing or film-production company. Generally, such a logo image is often presented at the beginning of a movie and thus well recognized as a house mark of the film-distributing or film-production company.

As described above, on condition that a video signal is output with addition of a text subtitle stream, less strict restrictions are imposed on recording of such a video signal. That is, users obtain the right to record a movie in return for viewing advertisement. In the above description, the CM content is, but not limited to, a text subtitle. Similar advertisement effect is archived by presenting some additional images to playback of the original video content. Other than text subtitles, for example, CM content may be a bitmap image or an animation sequence of bitmap images. Although no specific description of such variations of CM content is given here, the mechanism of presentation graphics used for presenting movie subtitles of BD-ROM content may be employed for CM presentation.

Figure 36:
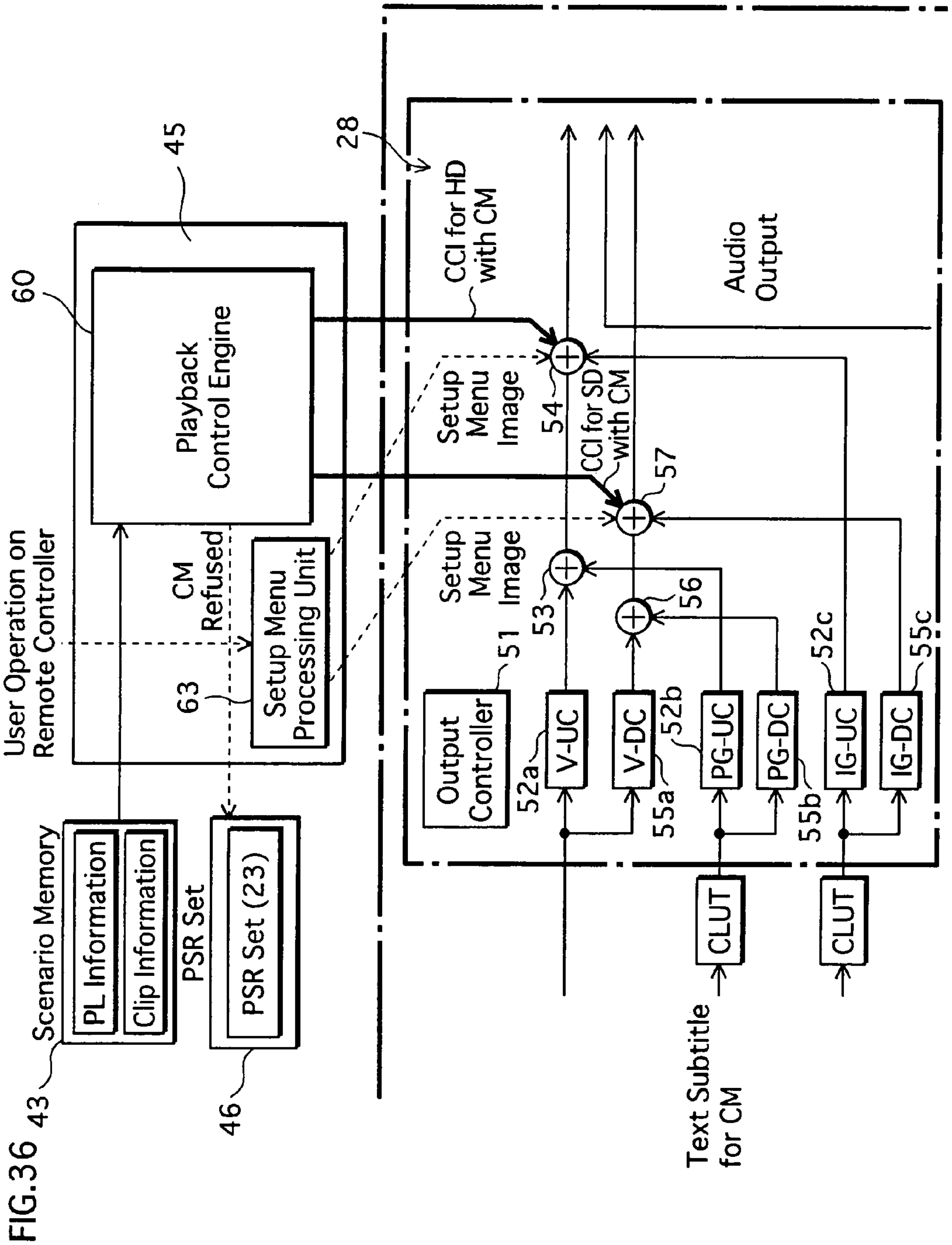
FIG. 36 illustrates an improvement made on a playback device according a seventh embodiment of the present invention.

This concludes the description of the improvement made on the recording medium according to this embodiment. Next, the following describes an improvement made on the playback device according to the present invention. FIG. 36 illustrates the improvement made on the playback device according the seventh embodiment. As illustrated in the figure, the PSR set 46 includes a PSR(23). The PSR(23) indicates whether a user accepts addition of CM.

Figure 37A:
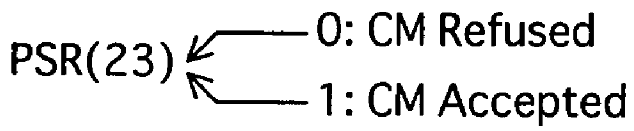
FIG. 37A illustrates the meaning of values that PSR (23) may hold.

FIG. 37A illustrates the meaning of values that the PSR (23) may hold. As illustrated in the figure, when set to "1", the PSR (23) indicates that the user accepts addition of CM. When set to "0", the PSR(23) indicates that the user refuses addition of CM.

In addition, the instruction ROM 45 is additionally provided with a setup-menu processing unit 63 as a control program for executing setup of the playback device.

Figure 37B:
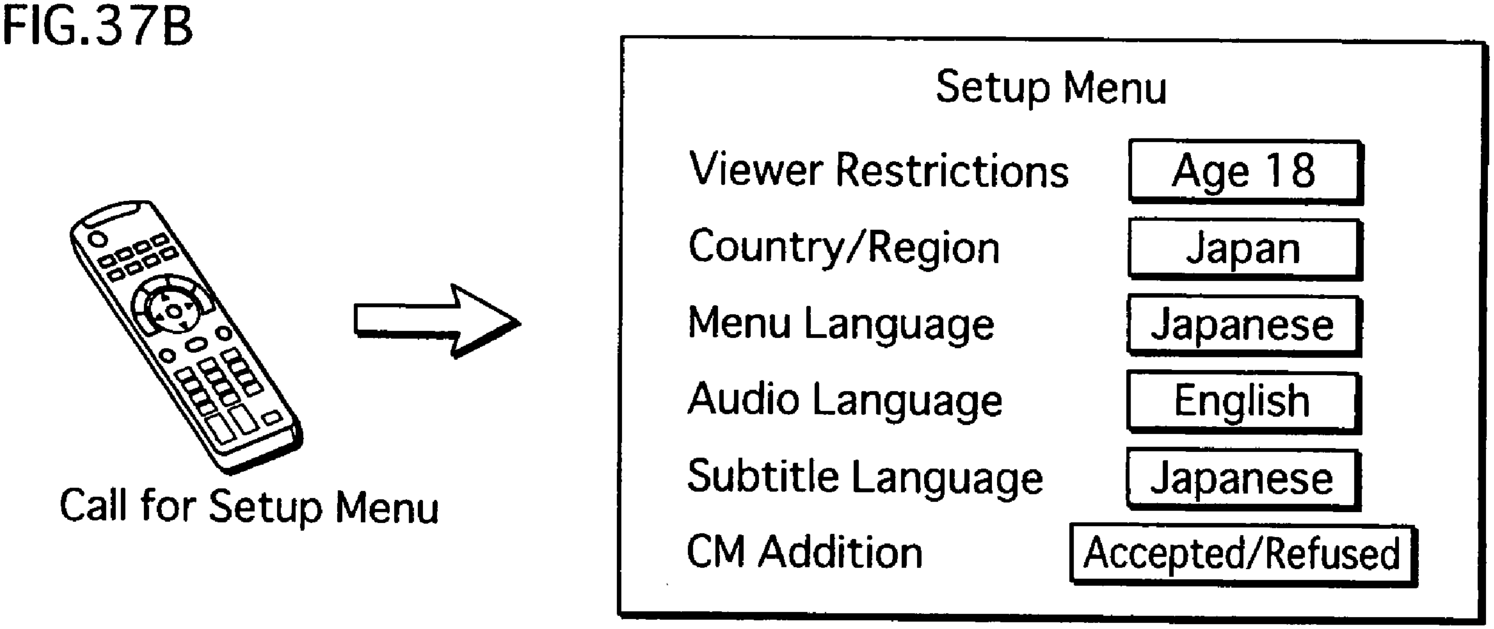
FIG. 37B illustrates an example of setup menu.

In response to a user operation made on the remote controller for calling a setup menu, the setup-menu processing unit 63 instructs the signal output unit 28 to display a setup menu. In response to a user operation for selecting whether to accept addition of CM, the setup-menu processing unit 63 writes the value corresponding to the user operation to the PSR(23). FIG. 37B illustrates an example of a setup menu. As illustrated in the figure, items selectable on the set-up menu generally include the following five items: viewer restriction, country/region, menu language, audio language, and subtitles language. In addition, the set-up menu in this embodiment includes the item for selecting whether to accept or refuse "CM Addition".

Figure 38:
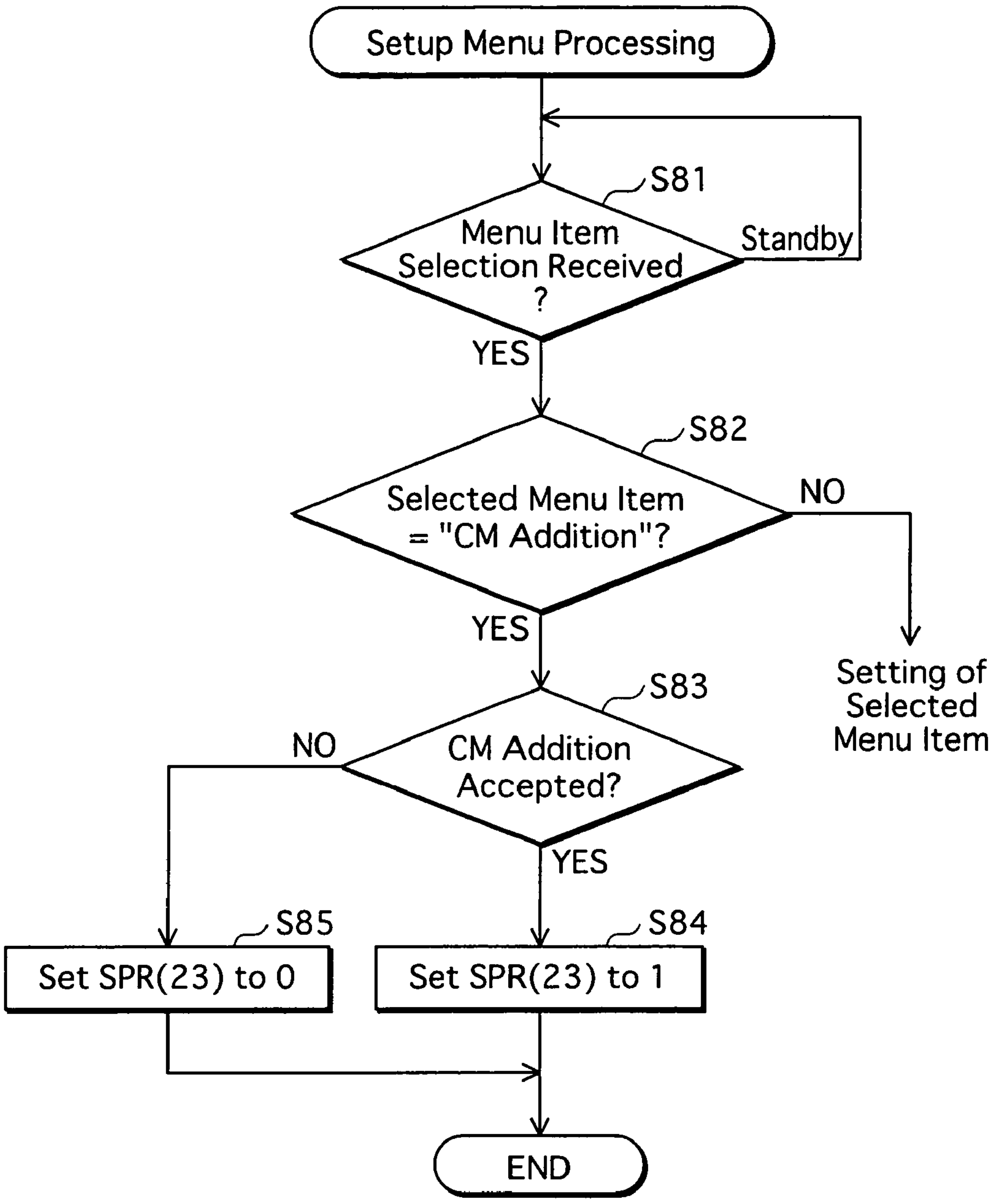
FIG. 38 illustrates a flowchart of setup processing performed by a setup-menu processing unit 63.

FIG. 38 illustrates a flowchart of the setup processing performed by the setup-menu processing unit 63. The processing steps of the flowchart are executed in response to a user operation made on the remote controller for calling the setup menu. According to the flowchart, the setup-menu processing unit 63 is placed in standby for receiving a user input of selecting one of the menu items for setting (step S81). Upon receipt of the user input, the setup-menu processing unit 63 judges whether the selected menu item is the "CM addition" (step S82). If the selected menu item is other than "CM addition", the setup-menu processing unit 63 receives a user input related to the selected menu item. On the other hand, if the selected item is "CM addition", the setup-menu processing unit 63 receives a user input selecting whether to accept or refuse CM addition. If CM addition is selected to be "refused" (step S83, NO), the PSR(23) from among the plurality of PSRs of the PSR set 46 is set to the value "0" indicating that CM addition is "refused" (step S85). On the other hand, if CM addition is selected to be "accepted" (step S83, YES), the PSR(23) is set to "1" indicating that CM addition is "accepted" (step S84). This concludes the description of the processing steps performed by the setup-menu processing unit 63.

Next, a description is given of the improvement made on the playback control engine 60 according to this embodiment.

Once the PRS (23) is set to either "0" or "1", the playback control engine 60 controls the compositors 54 and 57 included in the signal output unit 28. Under the control, at the time of PlayList playback, an appropriate piece of CGMS is selected according to the value held in the PSR(23) and the selected CGMS is embedded into the output video signal. More specifically, when the PSR(23) is set to "0" indicating that CM addition is "refused", the playback control engine 60 instructs the signal output unit 28 to embed CGMS composed of "CCIforSD without CM" and "CCIforHD without CM". On the other hand, when the PSR(23) is set to "1" indicating that CM addition is "accepted", the playback control engine 60 instructs the signal output unit 28 to embed CGMS composed of "CCIforSD with CM" and "CCIforHD with CM".

Figure 39:
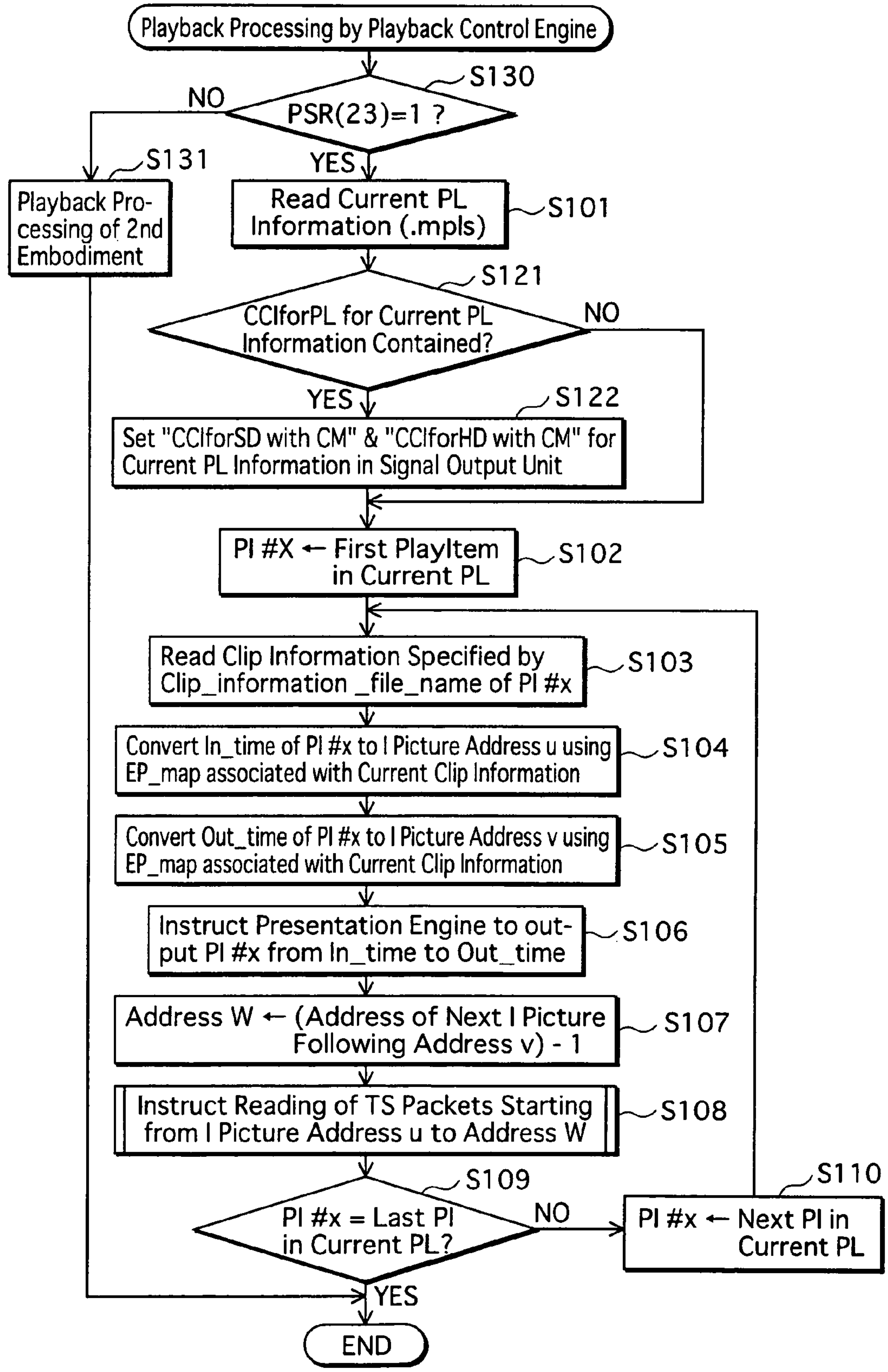
FIG. 39 is a flowchart of processing performed by the playback control engine 60 according to the seventh embodiment.

CGMS composed of "CCIforSD with CM" and "CCIforSD with CM" is embedded through the processing illustrated in FIG. 39.

FIG. 39 is a flowchart of the processing steps performed by the playback control engine 60 according to the seventh embodiment. This flowchart is an improved version of the flowchart illustrated in FIG. 20. The improvement lies in a step S130 added before the step S101. If the judgment in the step S130 results in "NO", the same playback processing as that described in the second embodiment will be executed.

Figure 40:
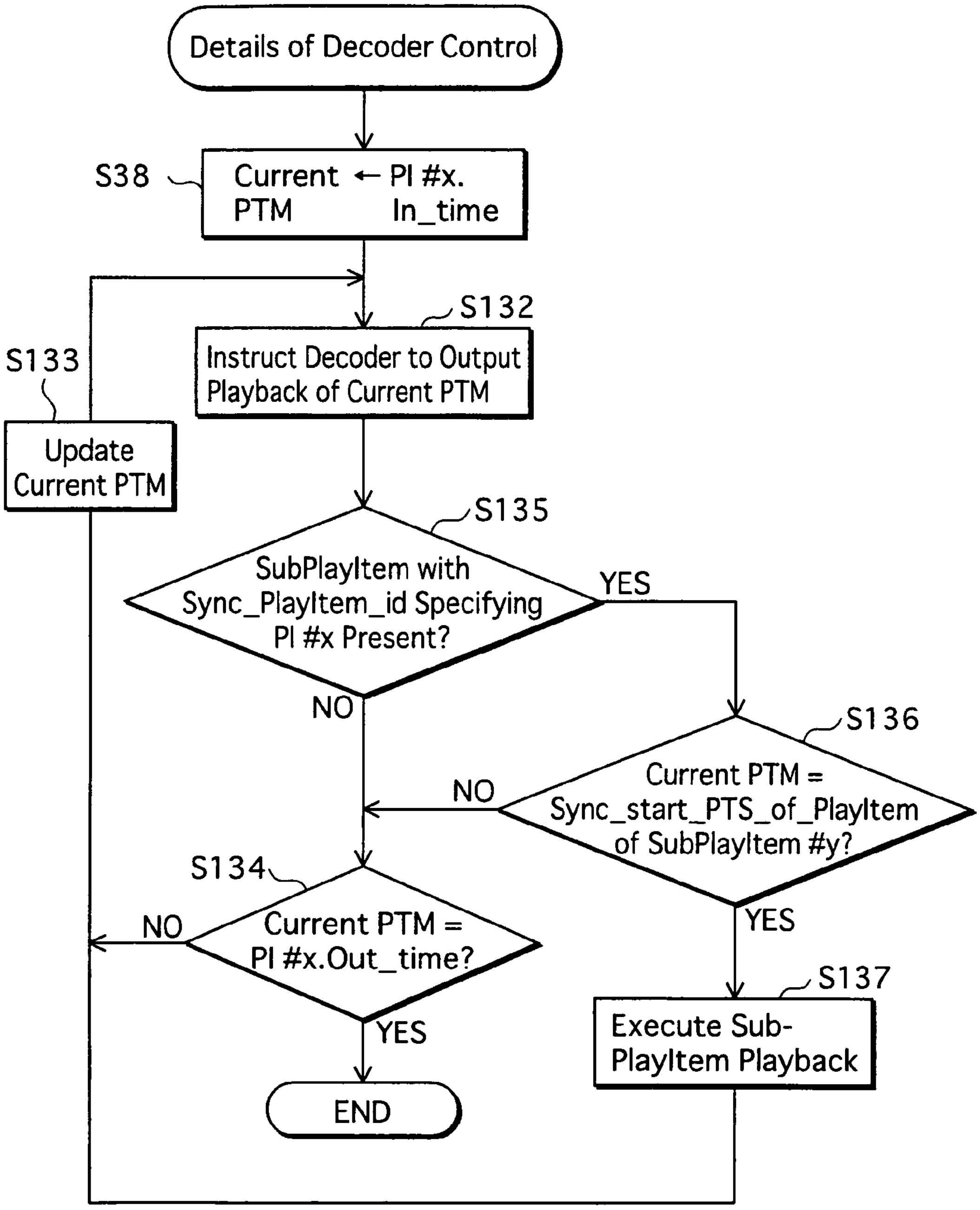
FIG. 40 illustrates a flowchart of processing performed for synchronous playback of the SubClip with the stream playback.

On the other hand, if the judgment in the step S130 results in "YES", the steps S101-S110 are sequentially performed. The difference with the processing of the second embodiment illustrated in FIG. 20 is found in that the steps S111 and S112 are replaced with steps S121 and S122, respectively. Through the above steps unique to this embodiment, the playback control engine 60 judges, each time a piece of PL information is read, whether CCIforPL is contained (step S121). If CCIforPL is contained, the playback control engine 60 sets the signal output unit 28 so that the compositors 54 and 57 embed CGMS composed of "CCIforSD with CM" and "CCIforHD with CM" (step S122). This concludes the description of the PL information payback control. As described above, in order to synchronize CM content with AV clip playback, it is necessary to monitor when the current playback point reaches In_time and Out_time of the SubPlayItem. The monitoring is carried out as one sequence through the control of the video decoder 8, the stream graphics processor 14, the coded data buffer 22, and the text subtitle decoder 42. FIG. 40 illustrates the processing steps performed for controlling the video decoder 8, the stream graphics processor 14, the coded data buffer 22, and the text subtitle decoder 42. The processing of this flowchart is to perform a loop composed of steps S132-137 after setting the current PTM to the PTS value of an I picture (step S138).

Next, a description of the loop composed of the steps S132-S135 is given. In the loop, playback of the picture and audio located at the current PTM (step S132) and update of the current PTM (step S133) are repeated. The step S134 defines the terminal condition to be met to exit form the loop. More specifically, the loop is terminated when it is judged in the step S134 that the current PTM reaches Out_time of the PI #x.

In the step S135, it is judged whether there is SubPlayItem#y of which sync_PlayItem_id specifies PlayItem #x. If there is such SubPlayItem #y, it is then judged in the step S136 whether the current PTM has reached sync_start_PTS_of_PlayItem of SubPlayItem #y. If the current PTM is reached, playback of SubPlayItem #y is executed in the step S137.

Figure 41:
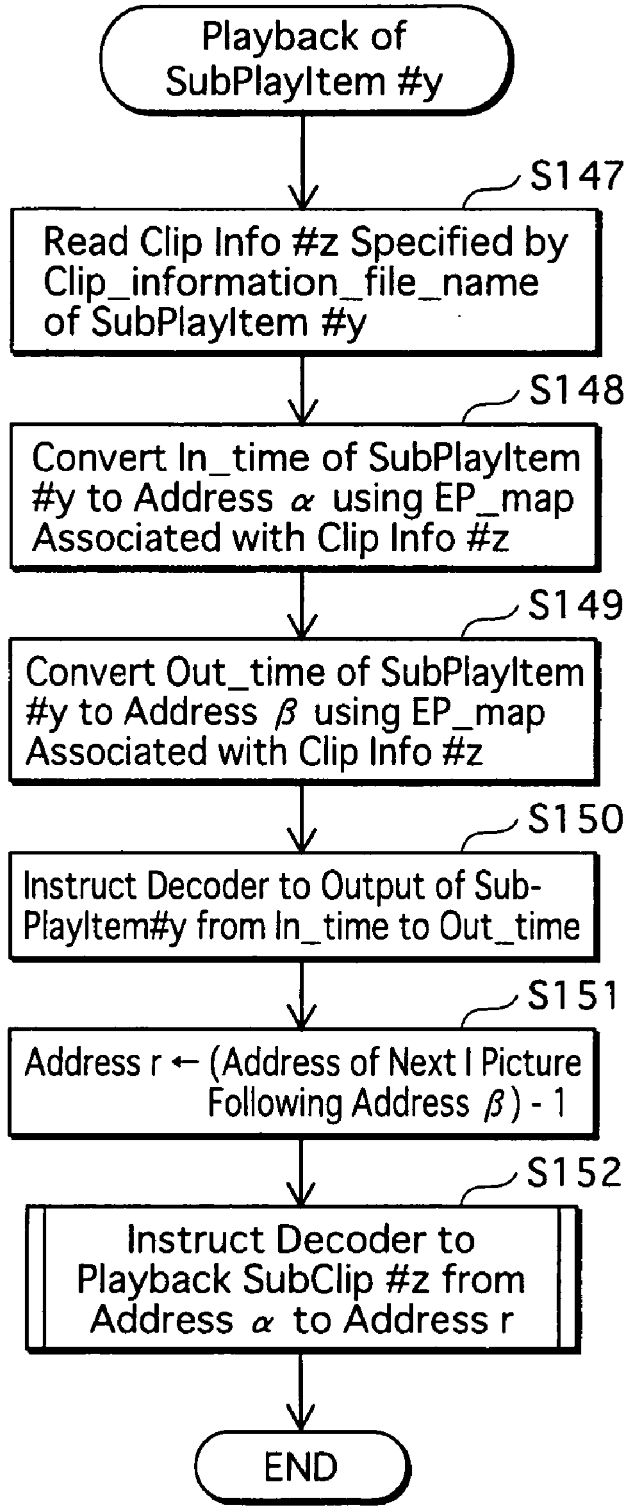
FIG. 41 illustrates a flowchart of processing performed for playback of SubPlayItem #y.

FIG. 41 illustrates a flowchart of the processing steps performed for playback of SubPlayItem #y.

In the step S147, Clip information that is specified by the Clip_information_file_name of SubPlayItem#y is read. In the step S148, the value of In_time of SubPlayItem #y is converted into an address $\alpha$, using the EP_map associated with the current Clip information. Similarly, in the step S149, the value of Out_time of SubPlayItem #y is converted into an address $\beta$, using the EP_map associated with the current Clip information. In the step S150, the decoder is instructed to output SubPlayItem#y starting from a point specified by In_time and end at a point specified by Out_time. Then, the address of the first I picture after the address $\beta$ is calculated and the address immediately before the thus calculated address is set as an address y (step S151). Then, the BD-drive 1 or the local storage 18 is instructed to read Subclip #z, so that a sequence of TS packets starting from the address a and end at the address y is read (step S152).

Through the above processing steps, both the MainPath playback and the SubPath playback are executed in synchronism, so that composite images as illustrated in FIG. 35B are presented. In the steps S121-S122 of the flowchart illustrated in FIG. 39, CCIforPL composed of "CCIforHD with CM" and "CCIforSD with CM" is set in the signal output unit 28, so that the CCIforPL will be used in the later processing. As a consequence, at the time of video signal output, CGMS imposing less strict restrictions is embedded within the SD and HD video signals.

Figure 42A:
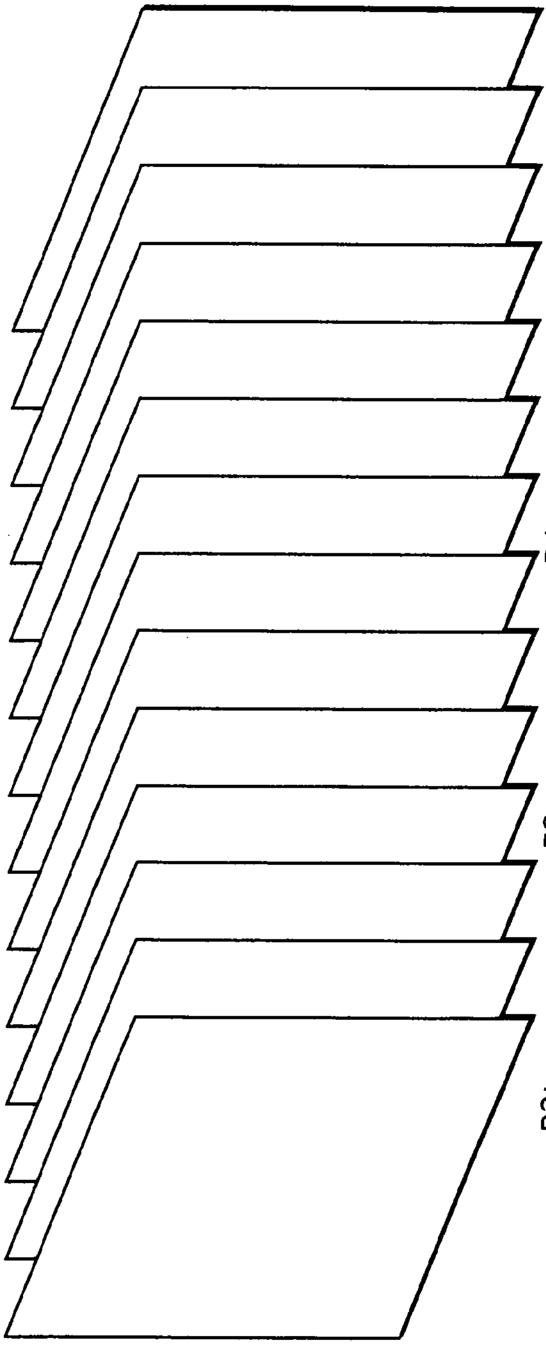
FIG. 42A illustrates a video sequence presented on a TV without CM added thereto.
Figure 42B:
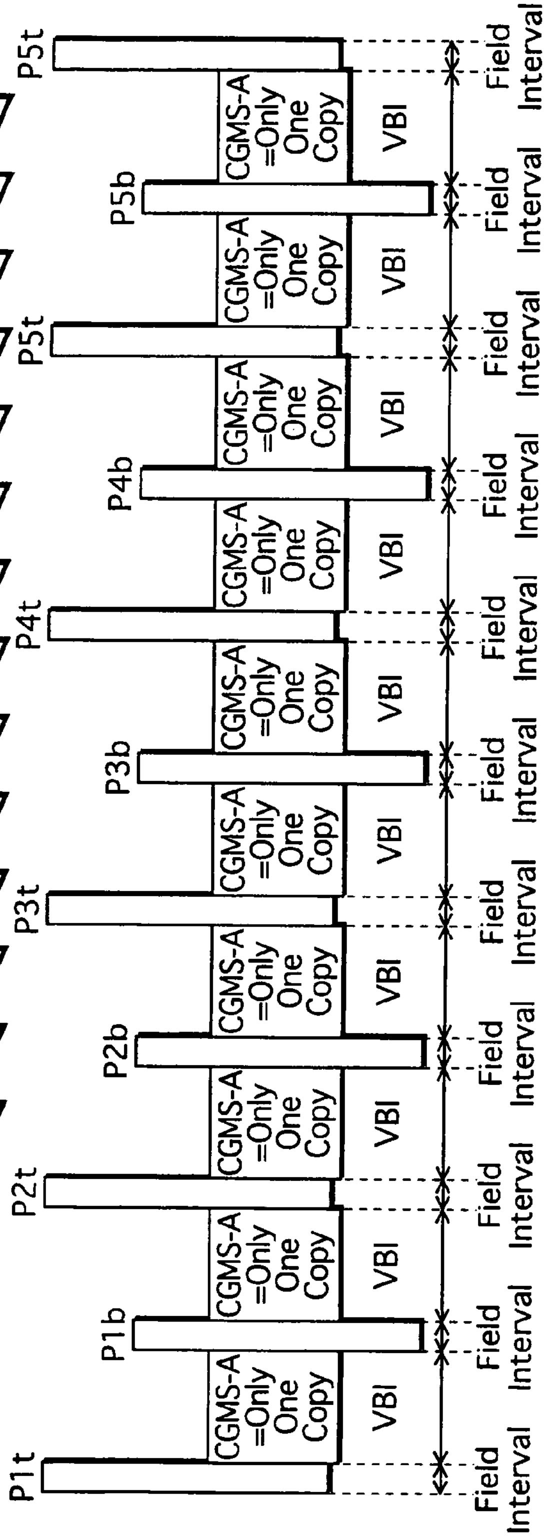
FIG. 42B illustrates an SD video signal carrying the video sequence.

FIG. 42A illustrates a video sequence presented on a TV without CM added thereto, and FIG. 42B illustrates an SD video signal carrying the video sequence. As illustrated in FIG. 42B, the SD video signal carries, in the vertical blanking intervals, CGMS that indicates the Only One Copy status. Since such CGMS is embedded, the recording device 600 is permitted to record the SD video signal once and once only.

Figure 43A:
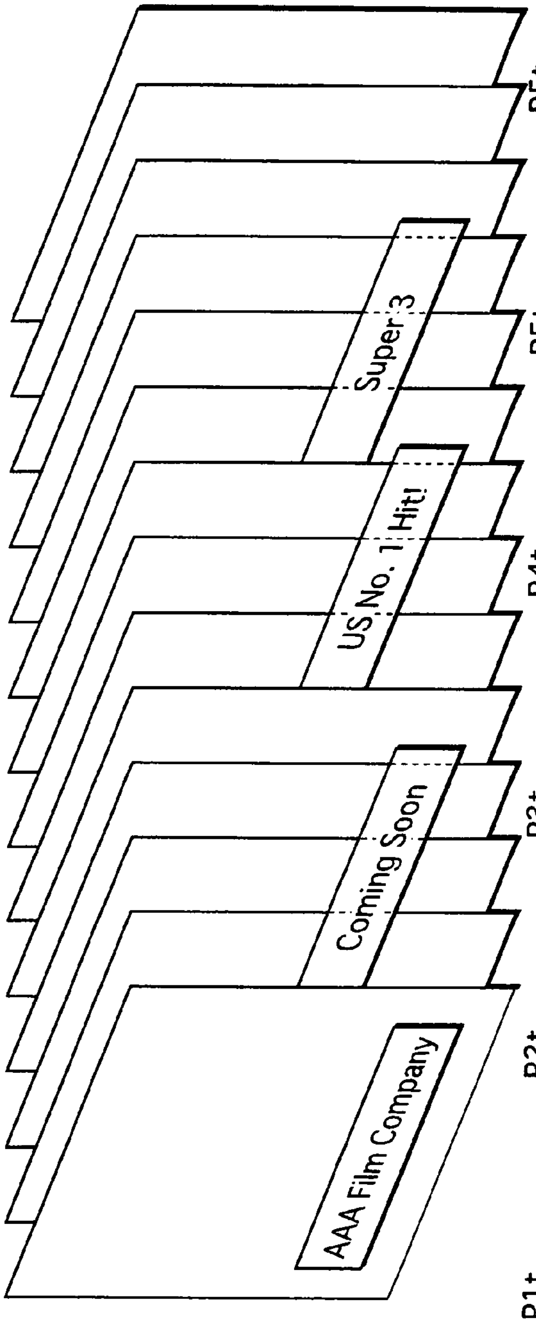
FIG. 43A illustrates a video sequence presented on a TV with CM added thereto.
Figure 43B:
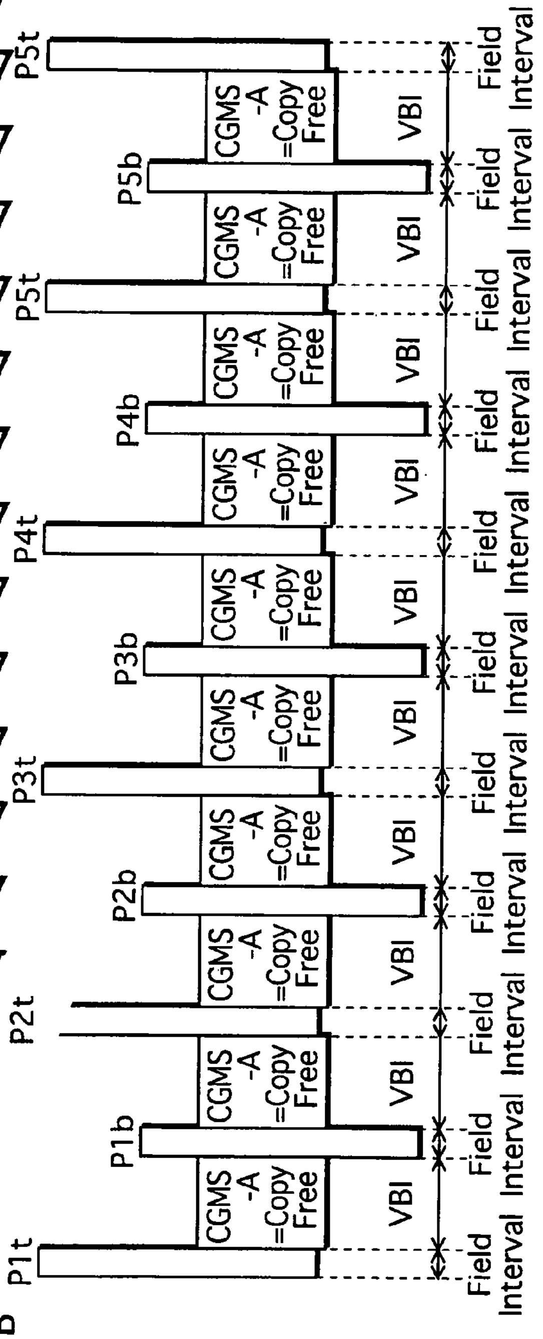
FIG. 43B illustrates an SD video signal carrying the video sequence.

FIG. 43A illustrates a video sequence presented on a TV with CM added thereto, and FIG. 43B illustrates an SD video signal carrying the video sequence. As illustrated in FIG. 43B, the SD video signal carries, in the vertical blanking intervals, CGMS indicating the Copy Free status. Since such CGMS is embedded, less strict restrictions are imposed and the recording device 600 is permitted freely record the SD video signal.

As described above, according to this embodiment, CCI is set to permit copying of movie content, on condition that CM is added to the movie content. That is, by accepting that CM is added to movie content, a user is permitted to freely copy the digitized movie content. Such a copy of the movie content may be stored on the HD recorder or home server. Playback of such a copy is presented with the CM added thereto. Thus, whenever watching the movie content, the user has no choice but to watch CM. Consequently, a certain level of advertising effect is expected. Since users are offered the right to make personal copies of movie content in exchange for watching CM, this form of advertising works with the users' consent. In other words, since the users are offered the choices as to whether or not to accept such advertising via a copy of original content, the advertising effect can be increased without offending the users.

Eighth Embodiment

Figure 44A:
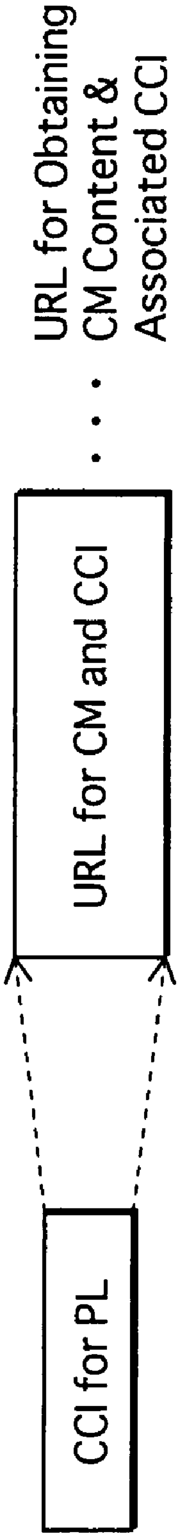
FIG. 44A illustrates the internal structure of CCIforPL according to an eighth embodiment of the present invention.

According to the first embodiment, CM content is prerecorded on a BD-ROM. An eighth embodiment of the present invention relates to the case where CM content is downloaded from a WWW server. FIG. 44A illustrates CCIforPL included in CCIforBD associated with CM content to be downloaded. FIG. 44A illustrates the internal structure of CCIforPL according to the eighth embodiment. As illustrated in the figure, the CCIforPL according to the eighth embodiment does not contain any CCI. Instead of CCI, CCIforPL defines a URL indicating the address on a network from which CM content and CCI is to be downloaded.

Since CCIforBD contains no CCI but an URL, at the time of video output, the network device 31 accesses the WWW server at the URL and downloads CM content and CCI from the WWW server.

Figure 44B:
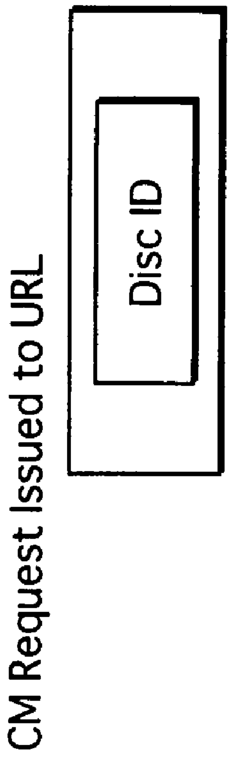
FIG. 44B illustrates the internal structure of a CM request that a network device 31 issues for downloading the CM content.

FIG. 44B illustrates the internal structure of a CM request that the network device 31 issues for downloading CM content. As illustrated in the figure, the CM request includes the Disc ID recorded in the lead-in area of the BD-ROM.

Figure 45:
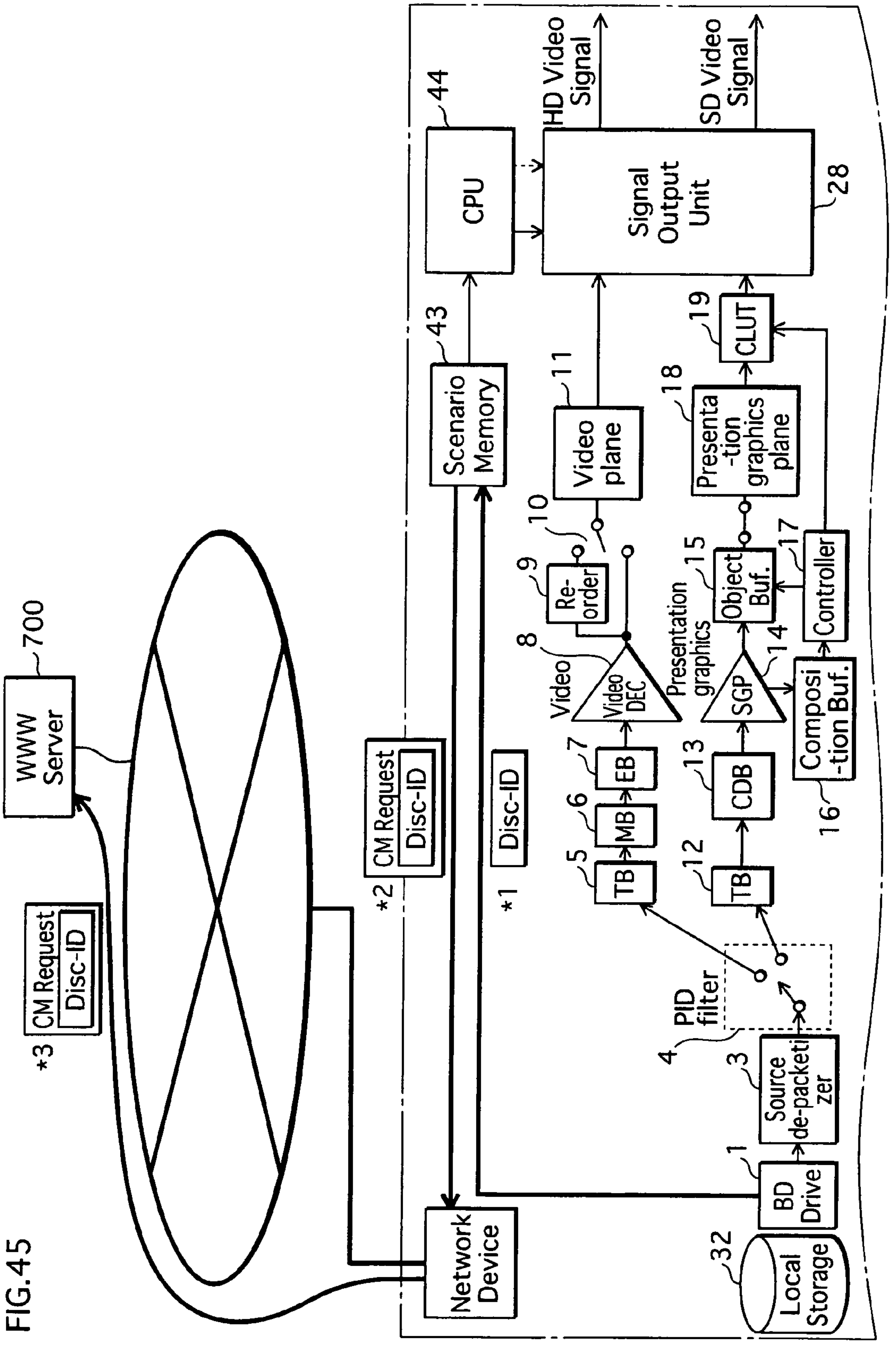
FIG. 45 schematically illustrates acquisition of the Disc ID by a CPU 44 (*1), and the transmission of a CM request to a WWW server from the network device 31 (*2, and *3)
Figure 46:
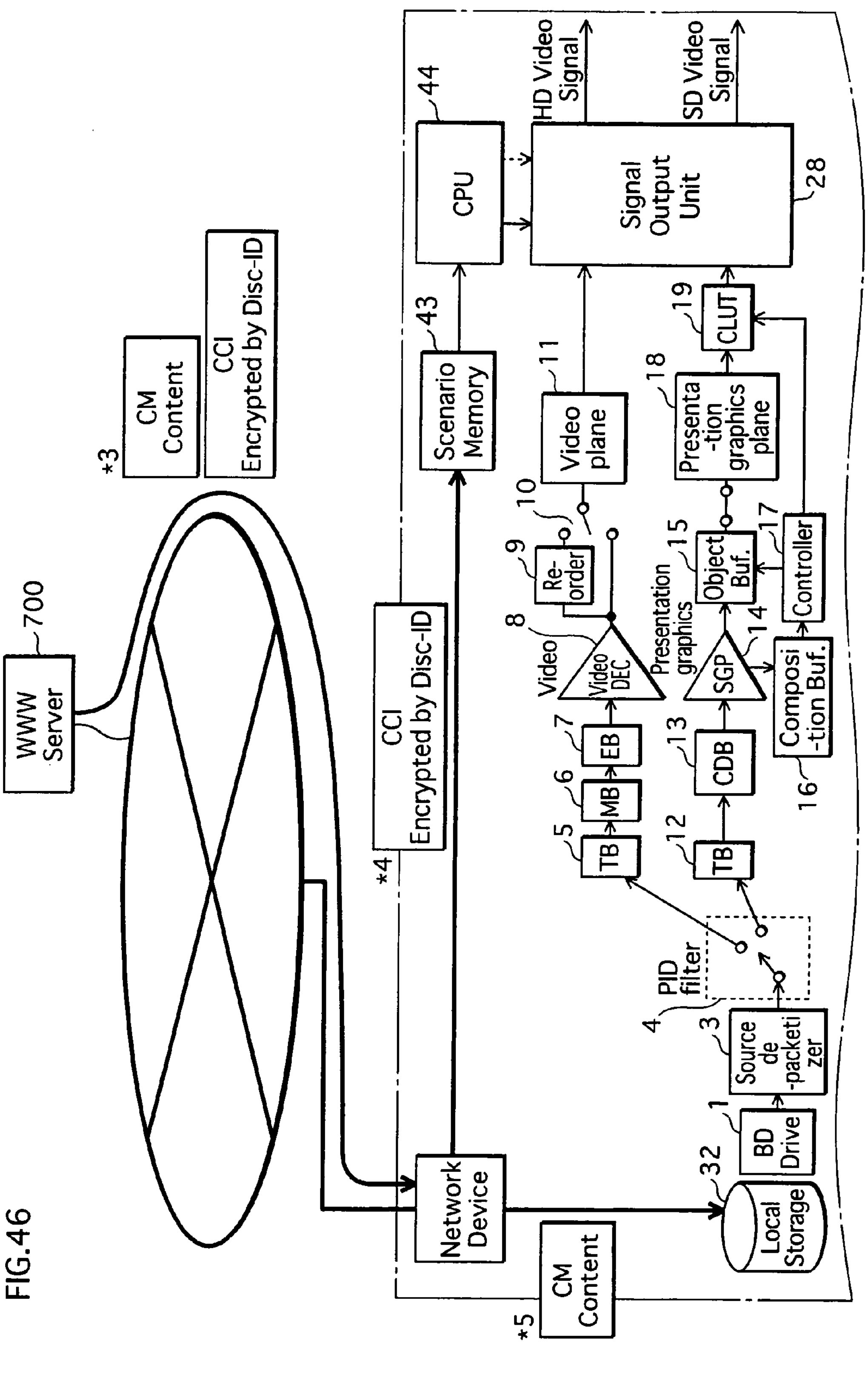
FIG. 46 schematically illustrates the transmission of the CM content and CCI from the WWW server to the playback device (*3, *4, and *5)

For downloading CM content, the CPU 44 instructs the network device 31 to issue a CM request that includes the Disc ID. FIG. 45 schematically illustrates acquisition of the Disc ID by the CPU 44 (*1), and the transmission of a CM request to the WWW server from the network device 31 (*2, and *3). In response to the CM request transmitted as above, the WWW server retrieves, from its own databases CM content associated with the received Disc ID. The WWW server then encrypts "CCIforSD with CM" and "CCIforHD with CM" using the Disc ID, and transmits the encrypted "CCIforHD with CM" and "CCI for SD with CM" back to the playback device that issued the request. FIG. 46 schematically illustrates the transmission of the CM content and the CCI from the WWW server to the playback device (*3, *4, and *5). Upon receipt of the CM content and the CCI, the playback device records the CM content to the local storage 32 and decrypts the "CCIforSD with CM" and "CCIforHD with CM" using the Disc ID to obtain the "CCIforSD with CM" and "CCIforHD with CM" in plaintext.

As described above, according to this embodiment, CM content is downloaded from a WWW server and presented in synchronism with movie content. Thus, it is made possible to present to users the latest version of CM content with the latest version of CCI information, simply by supplying such CM content to a WWW server.

Ninth Embodiment

According to the eighth embodiment, the playback device issues, to the server, a CM request that contains the Disc ID. According to a ninth embodiment, a CM request contains maker information in addition to the Disc ID.

Figure 47:
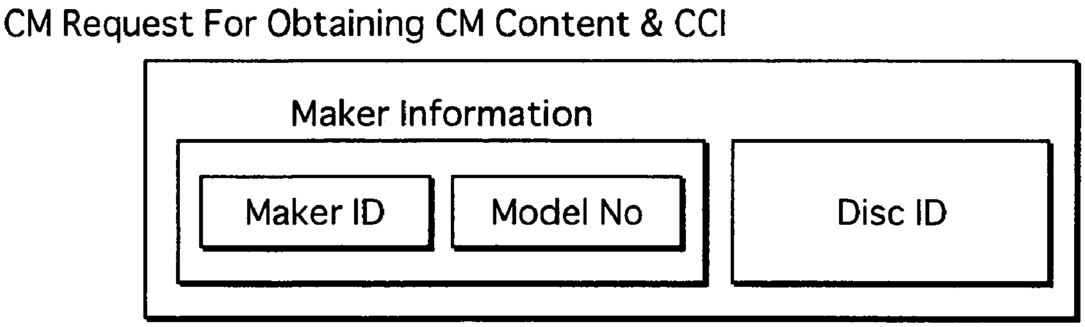
FIG. 47 illustrates the internal structure of a CM request according to a ninth embodiment of the present invention.

FIG. 47 illustrates the internal structure of a CM request according to the ninth embodiment. As illustrated in the figure, the CM request according to this embodiment contains maker information in addition to the Disc ID. The maker information is composed of a "maker ID" identifying the maker of the playback device and a "model number" assigned by the maker to the playback device. The maker information illustrated in the figure is stored in a secure semiconductor module provided within the playback device and in a non-rewritable state.

Figure 48:
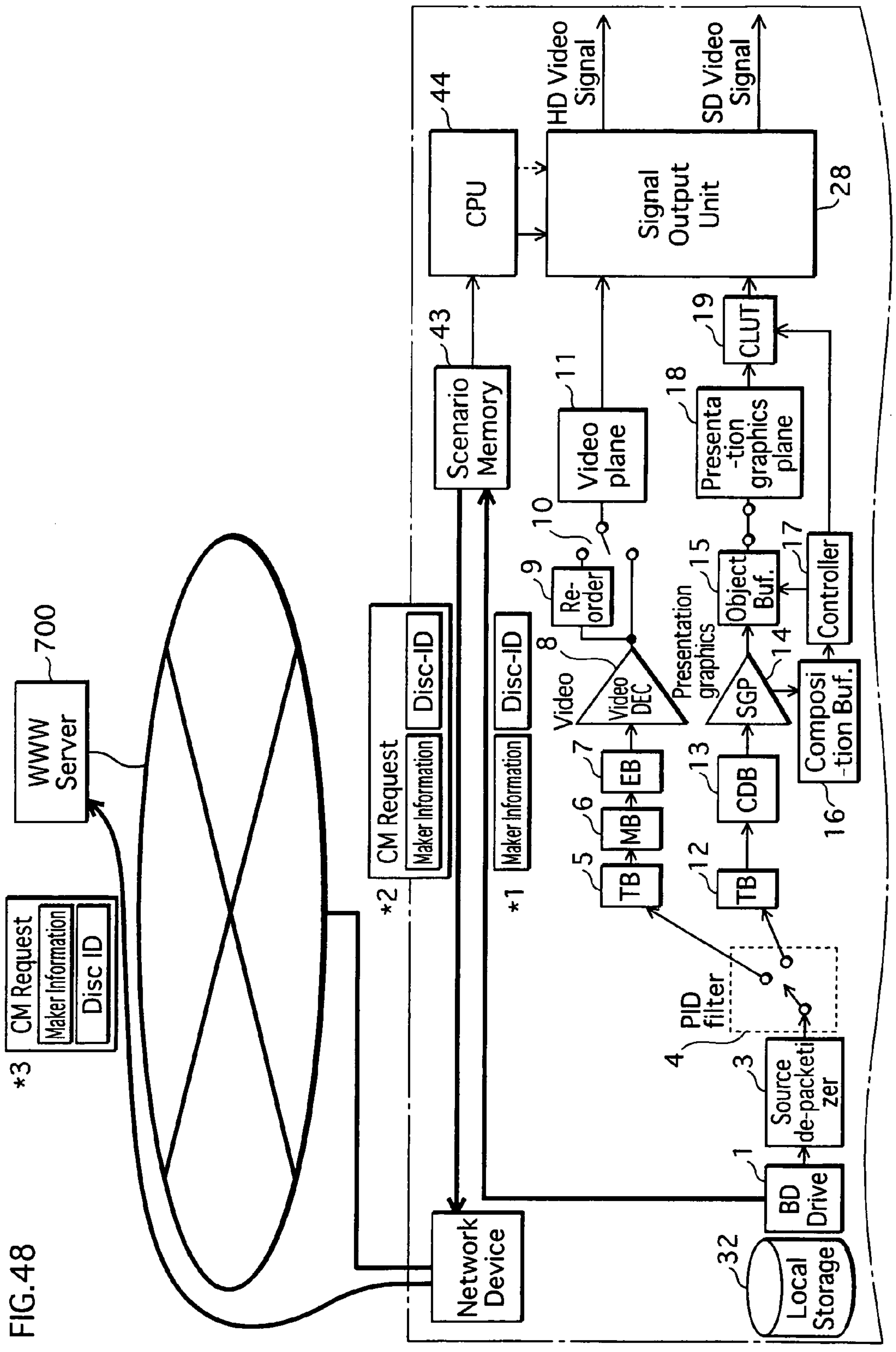
FIG. 48 schematically illustrates the acquisition of maker information and the Disc ID (*1) as well as the transmission of the CM request to the WWW server from the network device 31 (*2 and *3)

For issuing a CM request, the CPU 44 fetches the maker information from the secure semiconductor module mentioned above, and instructs the network device 31 to transmit a CM request composed of the maker information and the Disc ID. FIG. 48 schematically illustrates the acquisition of the maker information and the Disc ID by the CPU 44 (*1) as well as the transmission of the CM request to the WWW server, also by the CPU 44 (*2 and *3). Upon receipt of the CM request transmitted in the above manner, the WWW server operates just as described in the eighth embodiment. More specifically, the WWW server retrieves, from its own database, CM content associated with the received Disc ID, encrypts CCI using the Disc ID, and transmits the CM content and the encrypted CCI back to the playback device that issued the CM request.

Figure 49:
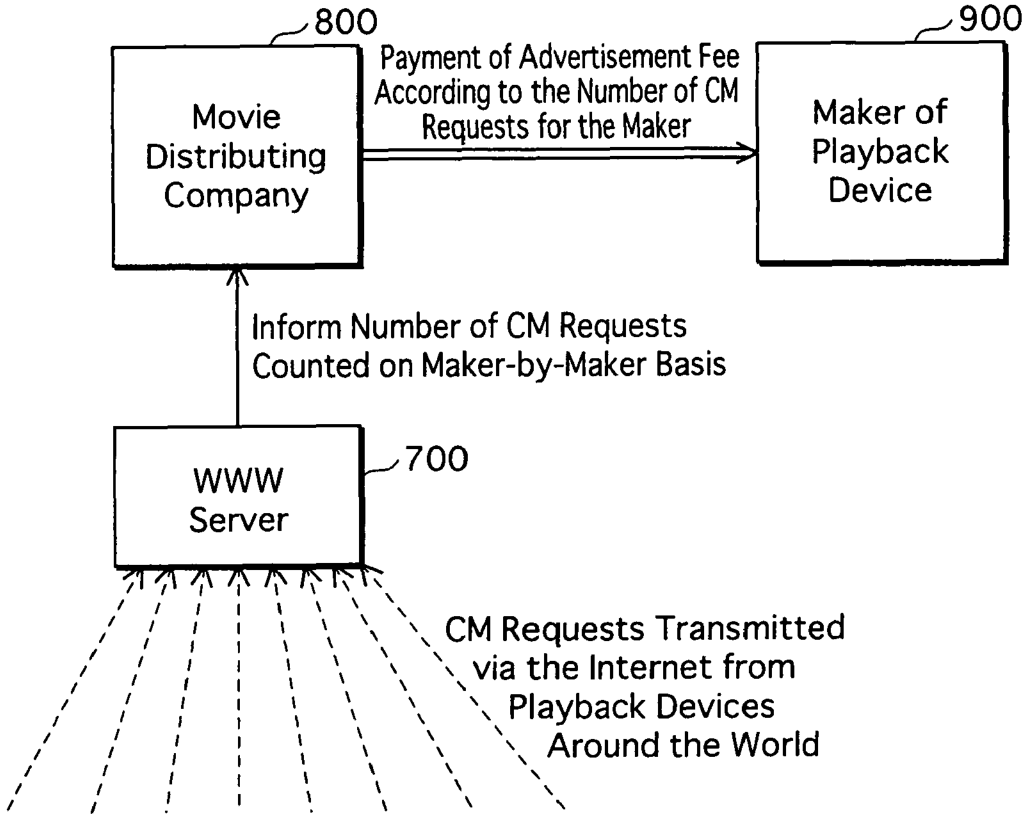
FIG. 49 illustrates the uses of the maker information.

Next, the following describes the uses of maker information transmitted to the WWW server 700. FIG. 49 illustrates the uses of maker information. Transmission requests similar to the one illustrated in FIG. 48 are issued from playback devices around the world. With reference to the maker information, the WWW server 700 calculates the number of received transmission requests separately for each maker.

Based on the calculation result of the transmission requests, a film-distributing company 800 makes a judgment regarding the contribution of each maker to advertising effect having been achieved. The film-distributing company 800 pays advertisement fees to a maker 900 in accordance with the contribution.

As described above, according to this embodiment, the playback device transmits maker information to the WWW server, for acquiring CM content. This arrangement allows the film-distributing company to figure out how much each maker (of playback devices) contributes to the advertising effect. Monetary reward for such contribution would be new revenue that the maker can obtain by providing advertisement via copies of original content.

Tenth Embodiment

Figure 50:
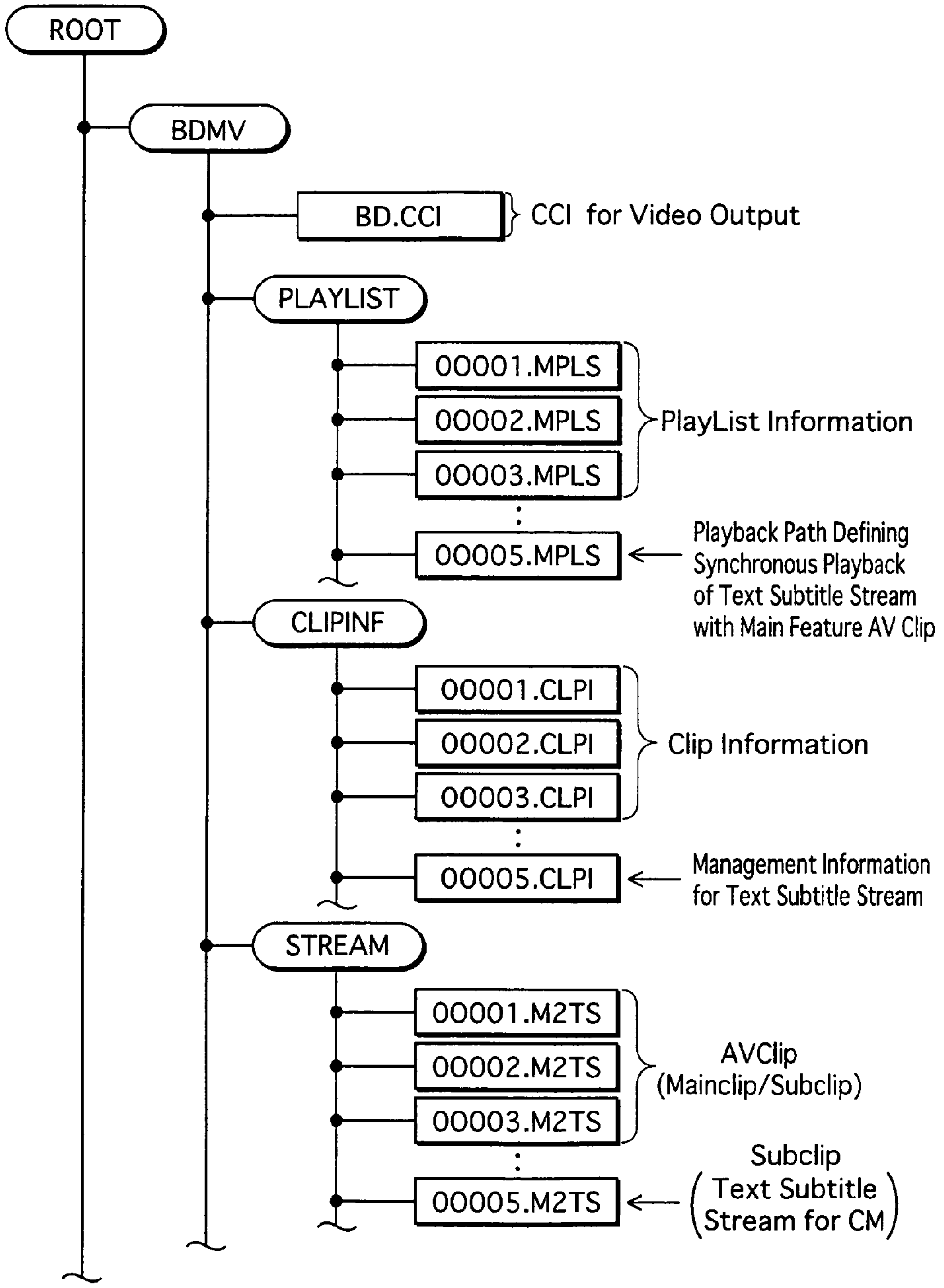
FIG. 50 illustrates the application layer format of the BD-ROM according to a tenth embodiment.

According to the seventh embodiment, CM content is stored on the local storage. According to a tenth embodiment of the present invention, CM content is stored on the BD-ROM and a permission request is issued. FIG. 50 illustrates the application format of the BD-ROM according to the tenth embodiment. As illustrated in the figure, the BD-ROM stores a SubClip that constitutes CM content, Clip information, and PL information. Since the SubClip, Clip information, and PL information are stored on the BD-ROM, even a playback device not provided with a local storage is able to present playback of movie content in synchronism with CM content. When outputting playback of movie content with addition of CM content, the playback device embeds, in the HD and SD video signals, CGMS imposing less strict restrictions of recording of the movie content.

Eleventh Embodiment

According to the seventh embodiment, a SubClip constituting CM content is stored on the BD-ROM and the SubClip contains text substreams. According to an eleventh embodiment of the present invention, a graphics stream is provided for presenting CM (hereinafter, also referred to as "CM graphics stream"), and the graphics stream is multiplexed into an AV clip.

Figure 51:
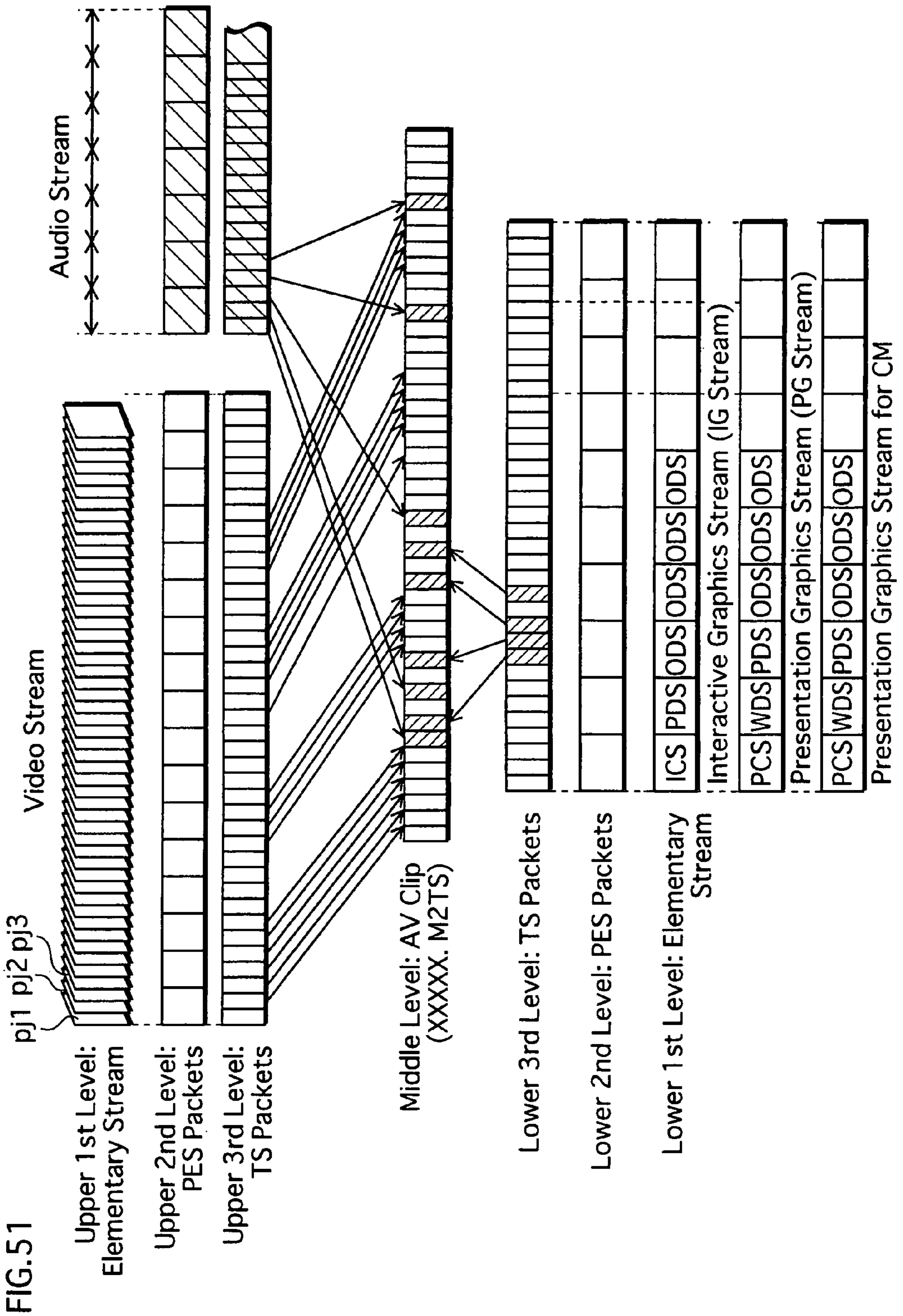
FIG. 51 illustrates the structure of an AV clip multiplexed with a graphics stream that is used for CM presentation.

FIG. 51 illustrates the structure of the AV clip multiplexed with a CM graphics stream.

Figure 52A:
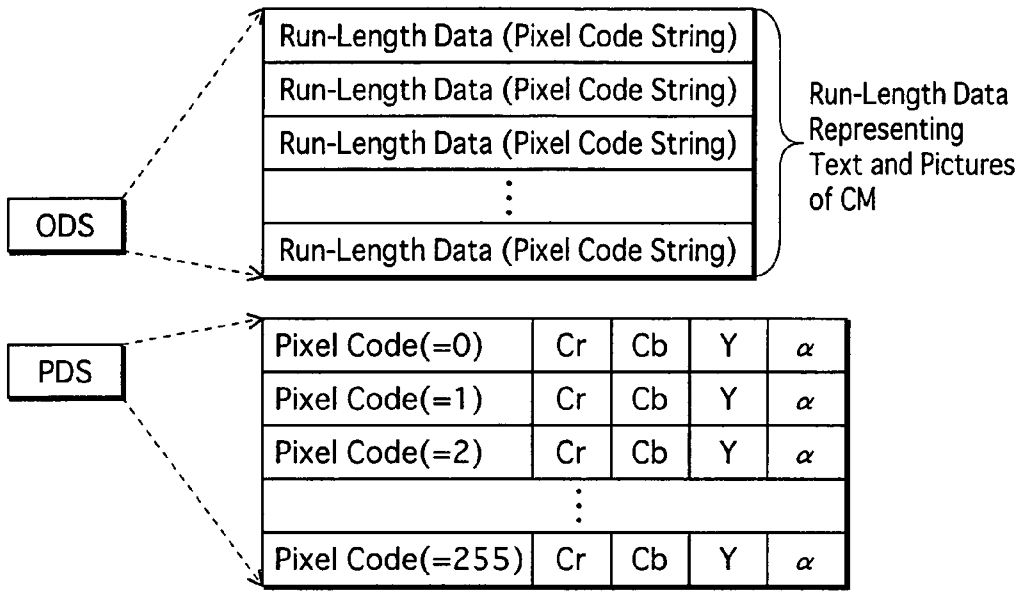
FIG. 52A illustrates the content of ODS and PDS carried in the graphics stream used for CM presentation.

As illustrated on the first level from the bottom, the AV clip according to this embodiment contains a CM graphics stream. FIG. 52A illustrates the content of ODS (Object Definition Segment) and PDS (Palette Definition Segment) carried in the CM graphics stream. The ODS contains run-length coded graphics data used for CM presentation.

Hereinafter, a description is given of the ODS and the PDS from among a plurality of functional segments constituting the CM graphics stream.

The ODS is a functional segment defining a graphics object used to present text strings or figures serving as CM. The graphics object composed of a plurality of pieces of run-length data. Each piece of run-length data is composed of a pixel code representing a pixel value and a run-length count of the pixel value. The pixel code is an 8-bit value showing one of the values from 1 to 255. Through the use of this pixel code, the run-length data sets arbitrary 256 pixel colors out of full colors (16,777,216 colors). Note that a graphic object used to present text subtitles needs to be rendered by placing a text string with a transparent background color.

The PDS is a functional segment that defines pallet data used for color conversion. The pallet data shows combinations of pixel codes of 1 to 255 and pixel values. The pixel value used herein is made up of a red color difference component (Cr value), a blue color difference component (Cb value), a luminance component (Y value), and a transparency (T value). Substituting a pixel code of each piece of run-length data into a pixel value shown by the palette data produces a color.

Figure 52B:
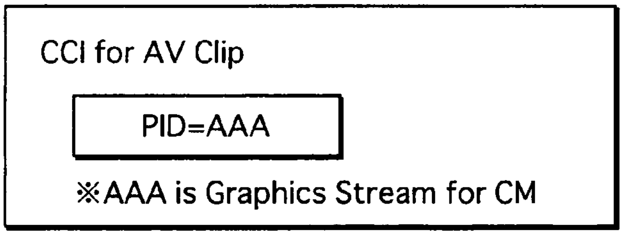
FIG. 52B illustrates CCIforClip that is unique to the AV clip.

For causing the CM graphics stream to be selected, the BD-ROM according to this embodiment stores CCI (CCIforClip) that is unique to this AV clip. FIG. 52B illustrates the CCIforClip that is unique to the AV clip.

The "CCI for AV clip" illustrated in FIG. 52B includes PID that uniquely identifies the above-mentioned CM graphics stream (i.e. PG stream used for CM presentation). At the time of playback, the playback device sets the value of the PID to the filter 4, so that the CM graphics stream is decoded and played back. Consequently, CGMS defining less strict restrictions is embedded in the HD and SD video signals. Alternatively to PID, any information uniquely identifying the CM graphics stream may be used.

Figure 53:
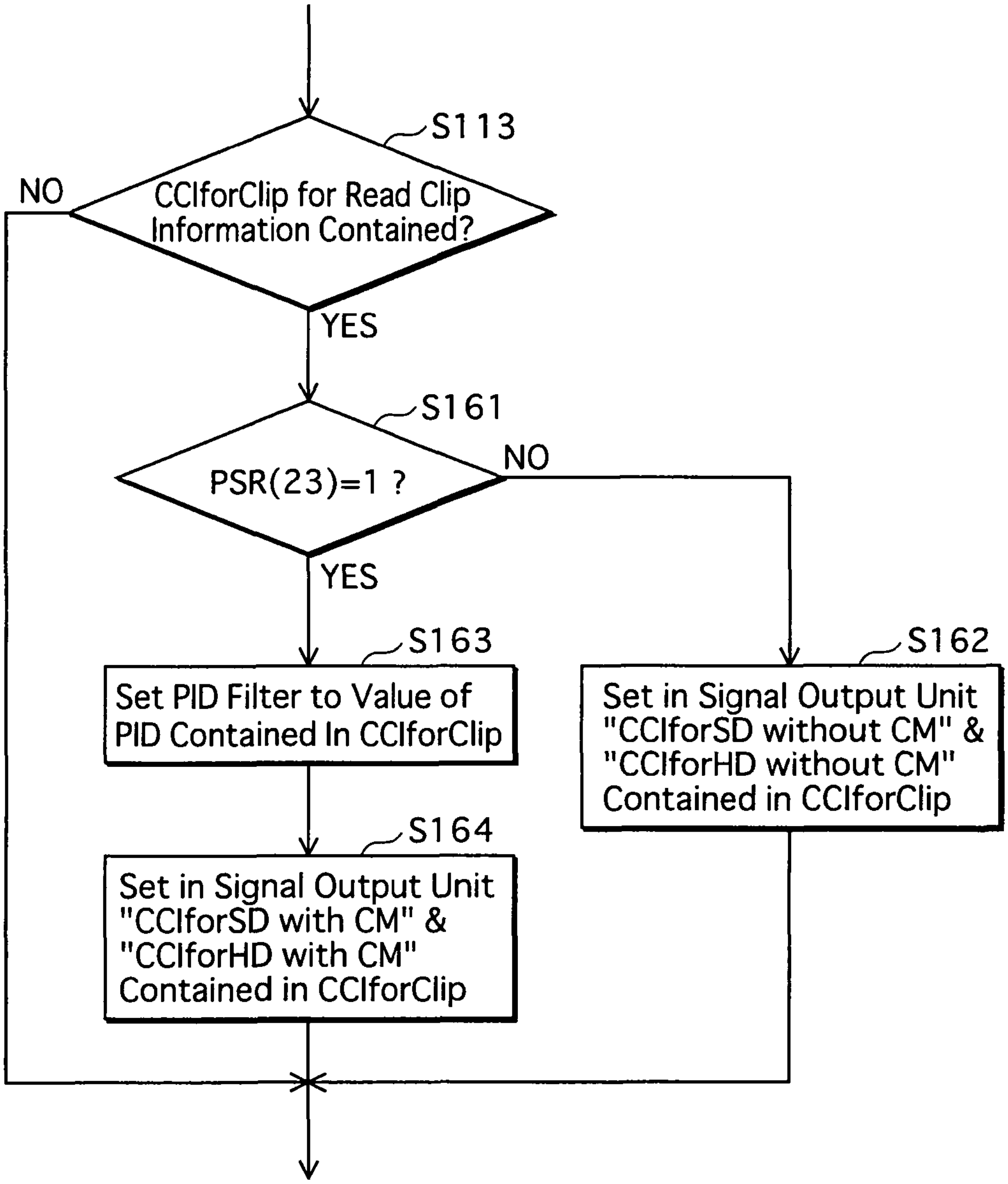
FIG. 53 illustrates a flowchart of processing performed by the playback control engine 60 according to an eleventh embodiment of the present invention.

This concludes the description of the improvement made on the recording medium. Now, a description is given of the improvement made on the playback device. In the flowchart illustrated in FIG. 22, the steps S113 and S114 are unique to the processing of CCIforClip. According to the eleventh embodiment, the step S113 is modified as illustrated in FIG. 53. In addition, the step S114 is replaced by steps s161-S164 also as illustrated in FIG. 53. Now, a description of the steps S161-S164 is given.

According to the flowchart in FIG. 53, each time a new AV clip is selected for playback, it is judged whether the value held by the PSR (23) is "1" (step S161). The PSR (23) represents the setting as to whether CM presentation is permitted by the user. If set to the value "0" indicating that CM presentation is not accepted, the signal output unit 28 is set to embed "CCIforSD without CM" and "CCIforHD without CM" included in CCIforPL associated with the current AV clip (step S162).

On the other hand, if the PSR (23) is set to "1" indicating that CM presentation is accepted, the playback device fetches PID from CCIforClip associated with the AV clip and sets the value of PID to the PID filter 4 (step S163). As a result of this setting, during playback of the AV clip illustrated in FIG. 51, the CM graphics stream is selected by the PID filter 4 and output to the stream graphics processor 41. Then, the signal output unit 28 is set to embed "CCIforSD with CM" and "CCIforHD with CM" included in CCI for PL associated with the current AV clip (step S164).

As described above, according to this embodiment, a CM graphics stream is multiplexed with an AV clip, so that the CM is presented to users when the AV clip is selected for playback.

(Supplemental Note)

The above description does not cover all the embodiments of the present invention. The present invention may be embodied by any embodiments including the following (A) to (T) below. The invention recited in each of the claims of this application includes extension and generalization of the above embodiments and their modifications below. The degree of extension and generalization depends upon the state of the art in the technical field of the present invention at the time when the present invention was made.

(A) According to the above embodiments, the BD-ROM stores PG and IG streams of HD quality only. Yet, it is applicable that the BD-ROM also stores PG and IG streams separately provided for down-conversion. At the time of down-converting, the selection may be made by the playback device or by a user.

(B) According to the above embodiments, a PG stream may be used to present text subtitles. However, the image quality of the PG stream may not be maintained at a satisfactory level if the PG stream is down-converted. In view of this, it is desirable that down-conversion is performed using a vector image font such as True Type font.

(C) Each of the above embodiments relates to a player model provided with separate converters optimum for video, PG, and IG streams, so as not to degrade image quality. Yet, it is applicable to first generate composite images at the HD level, and then down-convert the HD video signal to an SD video signal. If it is expected in this case that Pan & Scan should be applied to adjust the down-converted image into a 4:3 aspect ratio television image, the display region of text subtitles may be adjusted (especially, widthwise) so as to fit within such a 4:3 aspect ratio television image.

(D) Although the above embodiments do not provide a detailed description regarding how to set the display region of text subtitles, the setting may be made in view of down-converting. More specifically, different display regions may be set for the letterbox of down-converted NTSC, Pan & Scan for down-converted NTSC, letterbox of down-converted PAL, and Pan & Scan for down-converted PAL. It is also applicable to set different display regions and allowing a user to arbitrary select any of the display regions according to the user's preference.

(E) According to the first embodiment, a specific field is repeatedly presented at the time of down-converting through the field doubling process. Yet, the following modification may be made to reduce image fluctuations. That is, at the time of down-conversion by the field doubling process, an interim field picture is generated from and inserted between the previous and subsequent pictures. For example, the second picture P5*t* of 50 Hz-FD (PAL) illustrated in the figure may be generated from the pictures P5 and P6 of the 24 Hz (film).

(F) The above embodiments relate to the BD-ROM and the playback device. Yet, it is applicable that CCIforHD and CCI for SD are multiplexed in a digital broadcast stream.

(G) According to the above embodiments, a different piece of CCI is defined for a different piece of PlayList information.

Yet, it is applicable that a different piece of CCI is selectable by a Java application (program or script for playback control).

(H) It is desirable that the subtitles and the portions covered by the subtitles are always presented simultaneously. It is because such setting makes it easier to establish correspondence between HDTV and SDTV in the case of simultaneous output of the HDTV and SDTV signals.

(I) An audio down-coverer A-DC may be connected to the output end of the audio decoder 39. Down sampling by the audio down-converter A-DC ensures audio output at the SDTV quality.

(J) CCIforBD may contain "APSTB". APSTB is a two-bit value indicating whether to apply analog protection to SD video signal. When set to the value "01", APSTB indicates that analog protection is applied by disturbing the AGC circuit of VTR. When set to the value of "10", APSTB indicates that analog protection is applied by the AGC process and two-line color stripe system. When set to the value of "11", APSTB indicates that analog protection is applied by the AGC process and four-line color stripe system. When set to the value of "00", APSTB indicates that no analog protection is applied.

(K) The first embodiment relates to a player model based on the T-STD of MPEG-TS. Yet, the present invention is applicable to a player model based on the MPEG-PS or other multiplexing technique. In addition, at the time of performing down-conversion, the playback device may display recommendations for down-conversion described in the Clip information and allows users to select the type of down-conversion.

(L) As a result of the conversion of display method by the output control unit 51, the AV clip may be played back at a different speed than that originally defined. In such a case, it is not necessary that output control unit 51 carries out decoding at the timing specified by the DTS.

(M) Each of the above embodiments relates to the case where the BD-ROM is used as the recording medium. Main features of the present invention, however, lie in a graphics stream recorded on the recording medium, which does not rely on physical characteristics of the BD-ROM. Therefore, the present invention is applicable to any recording media capable of recording a graphics stream. Examples of such recording media include: optical discs such as DVD-ROM, DVD-RAM, DVD-RW, DVD-R, DVD+RW, DVD+R, CD-R, and CD-RW; magneto-optical disks such as PD and MO; semiconductor memory cards such as CompactFlash, SmartMedia, Memory Stick, MultiMediaCard, and PCMCIA; magnetic disks such as flexible disk, SuperDisk, Zip, and Clik!; removable hard disk drives such as ORB, Jaz, SparQ, SyJet, EZFley, and Microdrive; and built-in hard disk drives.

Each of the above embodiments relates to the case where the playback device decodes an AV clip stored on the BD-ROM and outputs the decoded AV clip to the television. As an alternative, the playback apparatus may be equipped with a BD drive only and the remaining components are provided in the television. In such a case, the playback apparatus and the television can be incorporated in a home network connected with an IEEE 1394 connector. In addition, although the above embodiments relate to the case where the playback device is connected to the television, the playback device may instead be a playback device integrally provided with a display device. Also, the playback device may include only the system LSI (integrated circuit) that carries out an essential part of the processing. The playback apparatus and the integrated circuit are both an invention described in this specification. Accordingly, regardless of whether the playback device or the integrated circuit is concerned, an act of manufacturing a playback device based on the internal structure of the playback device described in the sixth embodiment is considered to be an act of practicing the present invention. Also, any act of assigning with charge (i.e. for sale) or without charge (i.e. as a gift), leasing, and importing the playback device according to the first embodiment is an act of practicing the present invention. Likewise, an act of offering for assignment or lease of the playback device using storefront displays, catalogs, or brochures is an act of practicing the present invention.

(O) Information processing using the programs shown in the flowcharts is actually realized using hardware resources. Accordingly, the programs, which describe the processing steps shown in the flowcharts, are themselves an invention. The above embodiments all relate to the case where the programs are incorporated in the playback device, but the programs can be used independently of the playback device. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(P) The temporal elements of the processing steps executed in a time series in each of the flowcharts can be regarded as the necessary elements of the present invention. This being so, a playback method shown by these flowcharts is also considered to be an invention. If the processing shown in each flowchart is carried out by performing the processing steps in a time series so as to achieve the intended aim and the intended effect, it is considered as an act of practicing the playback method of the present invention.

(Q) The above embodiments relate to the case where the digital stream is an AV clip of the BD-ROM format, but the present invention may also be embodied with a VOB (Video Object) of the DVD-Video Format or the DVD-Video Recording Format. The VOB is a program stream that complies with the ISO/IEC13818-1 Standard and is obtained by multiplexing a video stream and an audio stream. Also, the video stream in the AV Clip may be an MPEG4 video stream or a WMV video stream. Further, the audio stream in the AV clip may be a Linear PCM audio stream, a Dolby AC-3 audio stream, an MP3 audio stream, an MPEG-AAC audio stream, or a dts audio stream.

(R) The movie content described in the above embodiments may be obtained by encoding an analog image signal broadcast by analog broadcasting. Alternatively, the movie content may be stream data made up of a transport stream broadcast by digital broadcasting.

Alternatively, the movie content may be obtained by encoding an analog/digital video signal recorded on videotape. Alternatively, the movie content may be obtained by encoding an analog/digital signal captured directly by a video camera. Alternatively, the video content may bb a digital copyrighted material distributed from a distribution server.

(S) The CM content described in the seventh embodiment and onwards is visual presentation of CM. Yet, CM may be presented by audio. That is, an audio stream presenting CM is recorded, and "CCIforSD with CM" and "CCIforHD with CM" may define copy control requiring the audio stream to be added to playback output.

(T) The supplemental information described in the seventh embodiment and onwards is CM content. Yet, the supplemental information may present any messages or some kind of information other than CM. In addition, CM content may be for any business entity other than a film-production company or a film-distributing company.

INDUSTRIAL APPLICABILITY

The recording medium and the playback device according to the present invention may be employed for personal use in a home theater system. Yet, the present invention may be manufactured in volume in accordance with the internal structures disclosed in the above embodiments. Thus, the recording medium and the playback device of the present invention can by industrially manufactured or used on an industrial scale. In view of the above, the recording media and the playback devices of the present invention have industrial applicability.

The invention claimed is:

1. A playback device for executing playback of video composed of a plurality of frame images, comprising:

a read unit operable to read a video stream from a recording medium;

a frame memory;

a video decoder operable to decode the video stream so as to sequentially obtain and write the frame images on the frame memory;

an output unit operable to generate a video signal from the frame images sequentially written on the frame memory and output the video signal together with copy control information that defines a permitted number of copying of the video signal;

a setup unit operable to accept a user operation indicating whether to allow or prohibit addition of supplemental information to the video signal;

an output control unit operable to cause the output unit to output the video signal with the addition of the supplemental information, respectively when the user operation allows and prohibits the addition; and an assigning unit operable to assign one type of the copy control information to the video signal according to the user operation, and cause the output unit to output together with the video signal, the one type of copy control information defining, a larger number when the user operation allows the addition of the supplemental information, than when the user operation prohibits the addition of the supplemental information.

2. The playback device according to claim 1, wherein the recording medium is a portable recording medium, the playback device further comprises:

a built-in recording medium storing a supplemental information stream, the read unit is further operable to read the supplemental information stream from the built-in recording medium, the playback device further comprises:

a supplemental information decoder operable to decode the supplemental information stream, and the supplemental information is an image obtained by decoding the supplemental information stream.

3. The playback device according to claim 2, wherein the built-in recording medium stores multi-path information binding the supplemental information stream to a section of the video stream on the portable medium, and the output control unit causes the video signal to be output with the addition of the supplemental information when a current playback point reaches the section.

4. A non-transitory computer-readable recording medium comprising a program recorded thereon, the program for causing a computer to execute playback of video composed of a plurality of frame images, the program comprising code operable to cause the computer to perform the steps of:

reading a video stream from a recording medium;

decoding the video stream so as to sequentially obtain and write the frame images on a frame memory of the computer;

generating a video signal from the frame images sequentially written on the frame memory;

accepting a user operation indicating whether to allow or prohibit addition of supplemental information to the video signal;

controlling and outputting the video signal with and without the addition of the supplemental information, respectively when the user operation allows and prohibits the addition;

assigning one type of copy control information to the video signal according to the user operation, the copy control information defining a permitted number of copying of the video signal, the permitted number being larger than when the user operation allows the application of the supplemental information, than when the user operation prohibits the addition of the supplemental information; and outputting the one type of copy control information together with the video signal.

5. A playback method for executing playback of video composed of a plurality of frame images; comprising the steps of:

reading a video stream from a recording medium;

decoding the video stream so as to sequentially obtain and write the frame images on a frame memory of a computer;

generating a video signal from the frame images sequentially written on the frame memory;

accepting a user operating indicating whether to allow or prohibit addition of supplemental information to the video signal;

controlling and outputting the video signal with and without the addition of the supplemental information, respectively when the user operation allows and prohibits the addition;

assigning one type of copy control information to the video signal according to the user operation, the copy control information defining a permitted number of copying of the video signal, the permitted number being larger when the user operation allows the addition of the supplemental information, than when the user operation prohibits the addition of the supplemental information.

* * * * *